Figure 2:
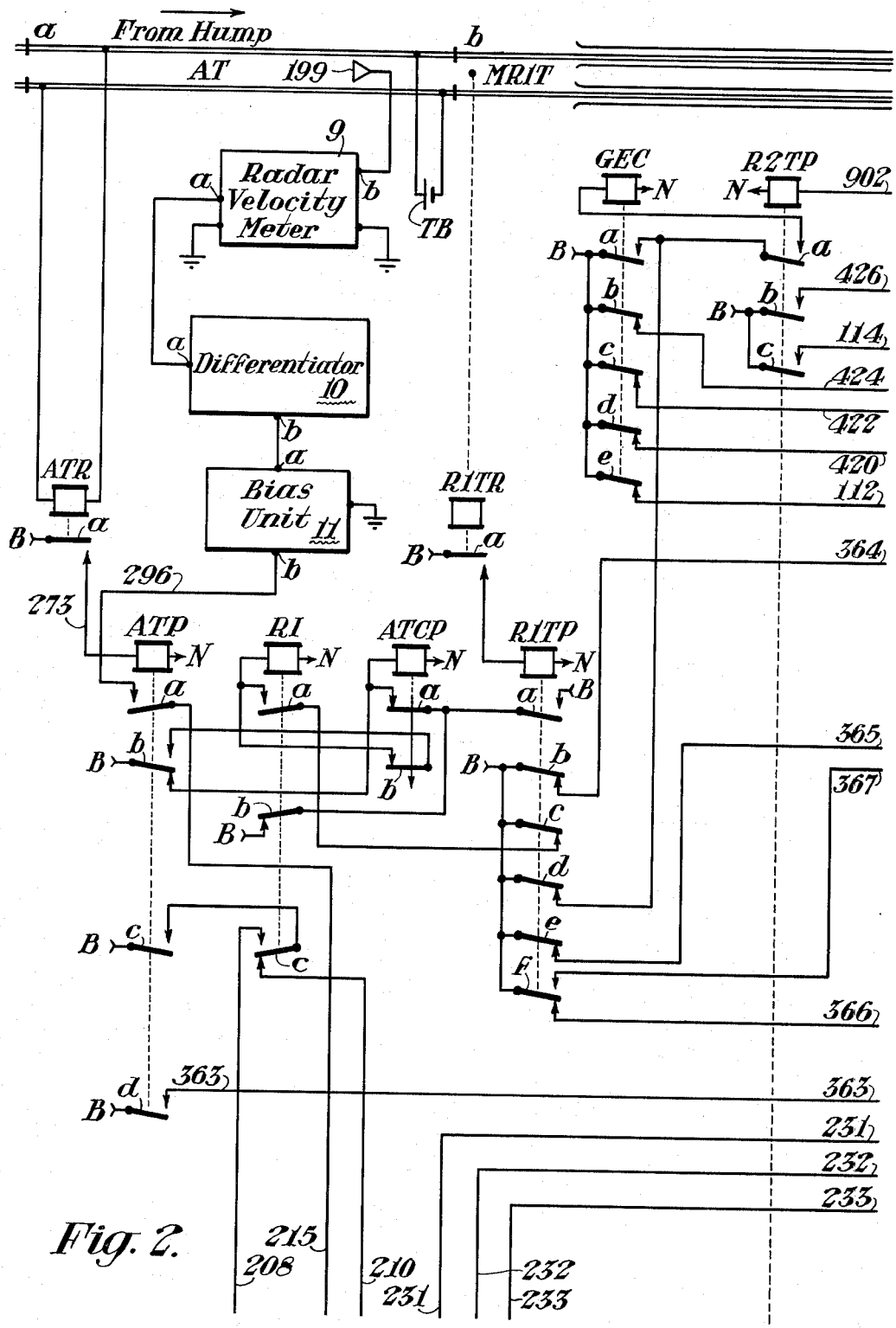

Dec. 21, 1965 W. A. ROBISON, JR 3,225,190
INFORMATION HANDLING SYSTEM
Filed Feb. 26, 1959
33 Sheets-Sheet 1

Fig. 1.

INVENTOR.
William A. Robison Jr.
BY W. L. Stout
HIS ATTORNEY

Dec. 21, 1965   W. A. ROBISON, JR   3,225,190
INFORMATION HANDLING SYSTEM
Filed Feb. 26, 1959   33 Sheets-Sheet 13

Dec. 21, 1965   W. A. ROBISON, JR   3,225,190
INFORMATION HANDLING SYSTEM
Filed Feb. 26, 1959                    33 Sheets-Sheet 15

*Fig. 15.*

Dec. 21, 1965 W. A. ROBISON, JR 3,225,190
INFORMATION HANDLING SYSTEM
Filed Feb. 26, 1959 33 Sheets-Sheet 25

INVENTOR.
William A. Robison Jr.
BY W. L. Stout
HIS ATTORNEY

United States Patent Office 3,225,190
Patented Dec. 21, 1965

3,225,190
INFORMATION HANDLING SYSTEM
William A. Robison, Jr., Pittsburgh, Pa., assignor to Westinghouse Air Brake Company, Wilmerding, Pa., a corporation of Pennsylvania
Filed Feb. 26, 1959, Ser. No. 795,672
21 Claims. (Cl. 246—4)

My invention relates to an information handling system, and in particular to apparatus for the storage and transfer of information for use in automatic control or indication.

There is shown in my copending application for Letters Patent of the United States Serial No. 728,230, filed April 14, 1958 for an Information Handling System, now Patent No. 3,162,405, issued December 22, 1964, an information storage and transfer system for storing and transferring voltages or signals of the continuous or analog variety. A modification of the system covered by this prior patent is shown in copending application for Letters Patent of the United States Serial No. 728,316, filed April 14, 1958, by Edward C. Falkowski for Storage Checking Apparatus, now Patent 2,958,073, issued October 25, 1960. These patents are assigned to the assignee of my present application.

There is also shown in copending application for Letters Patent of the United States Serial No. 676,730, filed August 7, 1957 by David P. Fitzsimmons and William A. Robison, Jr. for an Automatic Control System for Railway Classification Yards, which is also assigned to the assignee of my present application, a system for automatically routing cuts of one or more railway cars to selected storage or classification track destinations while at the same time controlling the speed at which the cuts couple with preceding cars on the storage tracks. The speed of the cuts is controlled in accordance with certain information such as the weight of the cars, correct leaving velocity, and rolling resistance. The weight and correct leaving velocity information is associated with each cut at predetermined points in the yard and is transferred along with each cut as it progresses through the yard to a computer, which correlates the information and derives a leaving speed for each cut leaving the group retarders. These last mentioned items of information are in digital form and are transferred along with their associated cuts by means of the automatic switching arrangement of said control system. However, the rolling resistance information for the cuts of cars is in analog form, and, in said application Serial No. 676,730, is stored in, and transferred from, centrally located storage panels, at the proper time, by the information handling system shown in my aforesaid Patent 3,162,405. The modification shown in Patent 2,958,073 is also included in the information storage and transfer system employed in the system of copending application Serial No. 676,730.

It is readily apparent that an economic advantage can be obtained by employing but one information storage and transfer system rather than two such systems as described above, and it is, accordingly one object of my invention to provide a single information storage and transfer system capable of storing and transferring bits of information in both analog and digital forms.

It is another object of my invention to provide a novel routing arrangement, or switch control storage and transfer arrangement, for automatically controlling the track switches in a classification yard to align the routes to the preselected storage tracks for the cuts of cars being classified in the yard.

It is the third object of my invention to provide a novel route storage and transfer control system for automatically controlling track switches in a railway track layout to align the routes for trains moving through said track layout.

Other objects and characteristic features of my invention will become apparent as the description proceeds.

In accomplishing the foregoing objects of my invention, I employ the apparatus shown in the aforesaid Patents 3,162,405 and 2,958,073. The apparatus shown in these patents has been modified to store, in digital form, information such as cut weight information, "yes-no" bits of information for the correct leaving velocity of cuts, and the switching or routing information for cuts of cars in a classification yard, in addition to the rolling resistance measurements previously stored in analog form in said apparatus. The system has been arranged to "read-out" of the storage apparatus, at the proper time, the desired information.

I shall describe one form of apparatus embodying my invention and shall then point out the novel features thereof in claims.

I have illustrated an embodiment of my invention which is adapted to be employed in a classification yard of the type disclosed in the above copending application Serial No. 676,730. Only those components of the system disclosed in said copending application which are necessary to make my disclosure complete and to an understanding of my invention have been illustrated, and in several instances these components have been illustrated in block diagram form. However, the correspondence between schematically illustrated components and those shown in detail in the said copending application will be readily apparent to those skilled in the art as the description proceeds.

In order to simplify the illustration of the circuits employed in my invention, I have not shown the necessary power supplies in detail. One of these power supplies is a conventional source of D.C. voltage having positive and negative terminals, connections to which are schematically indicated on the drawings by the reference characters B and N, respectively, associated with arrow symbols indicating connections to the battery terminals. The additional power supplies required are shown schematically by a control lead carried from component to component and a ground lead which is returned to a common ground as conventionally indicated. The circuits so shown will be readily identified with those shown in detail in the copending application.

In the drawings,

FIG. 1 comprises a chart showing the manner in which FIGS. 2 through 33 should be arranged in order to disclose in detail one embodiment of my invention.

FIGS. 2 through 33, when arranged in the manner shown in FIG. 1, comprise a schematic wiring diagram of one embodiment of my invention.

Figure 6:
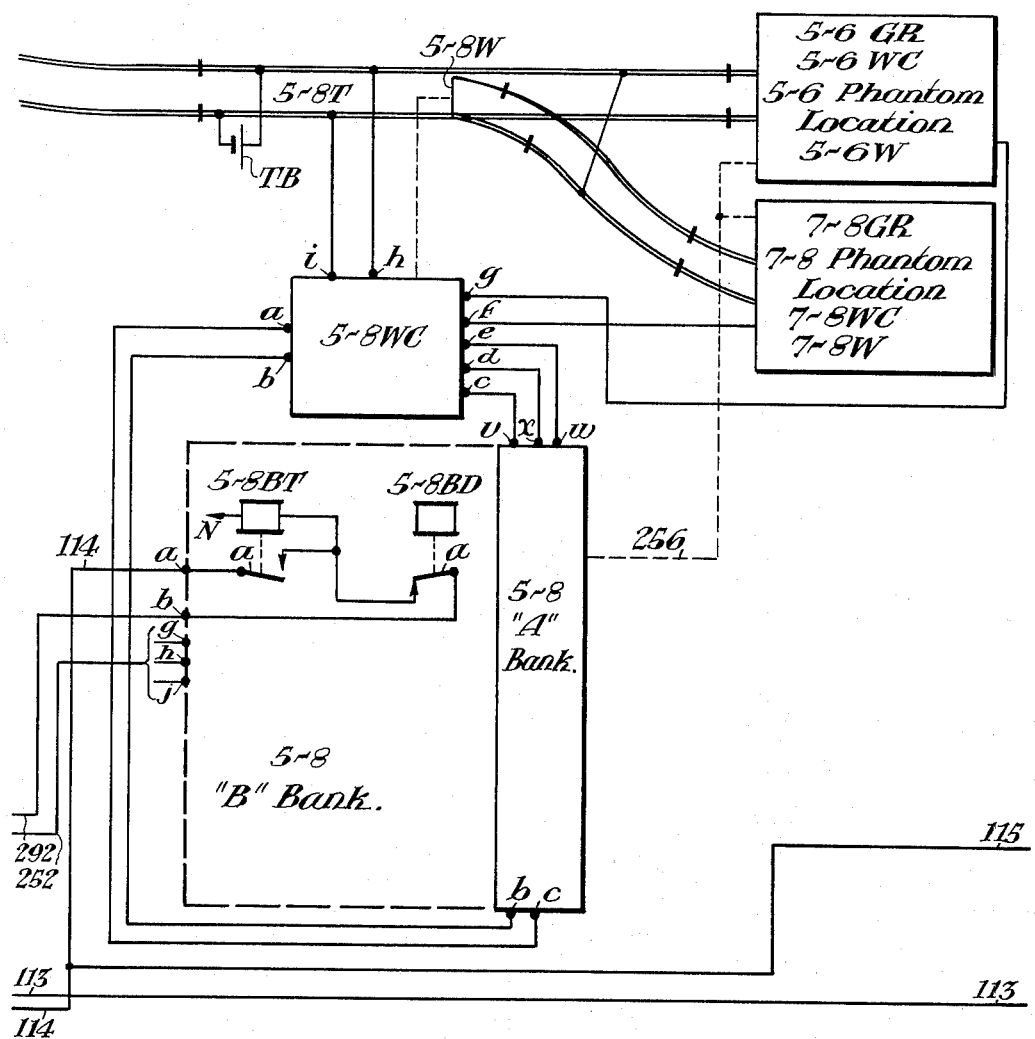
Figure 7:
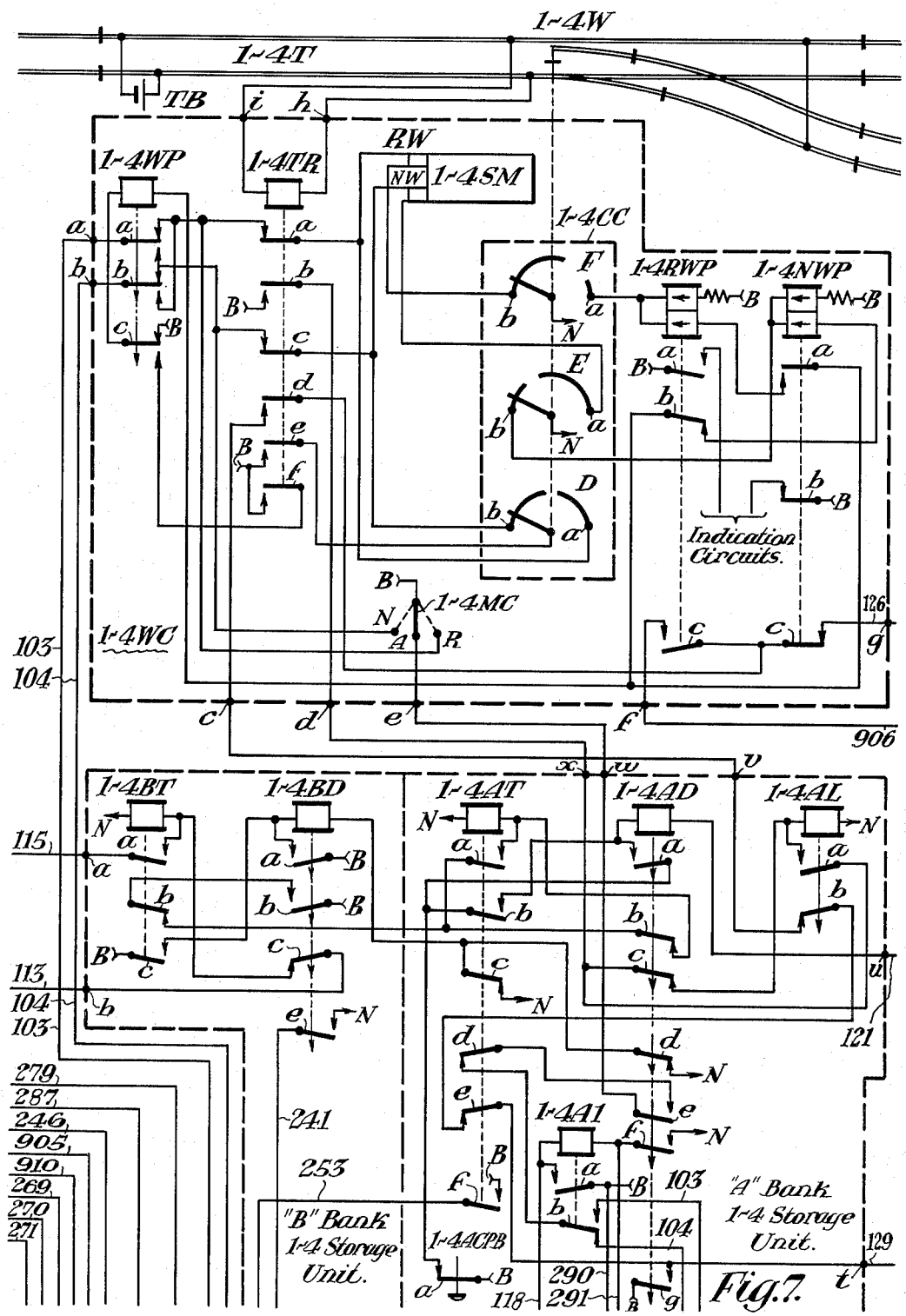
Figure 8:
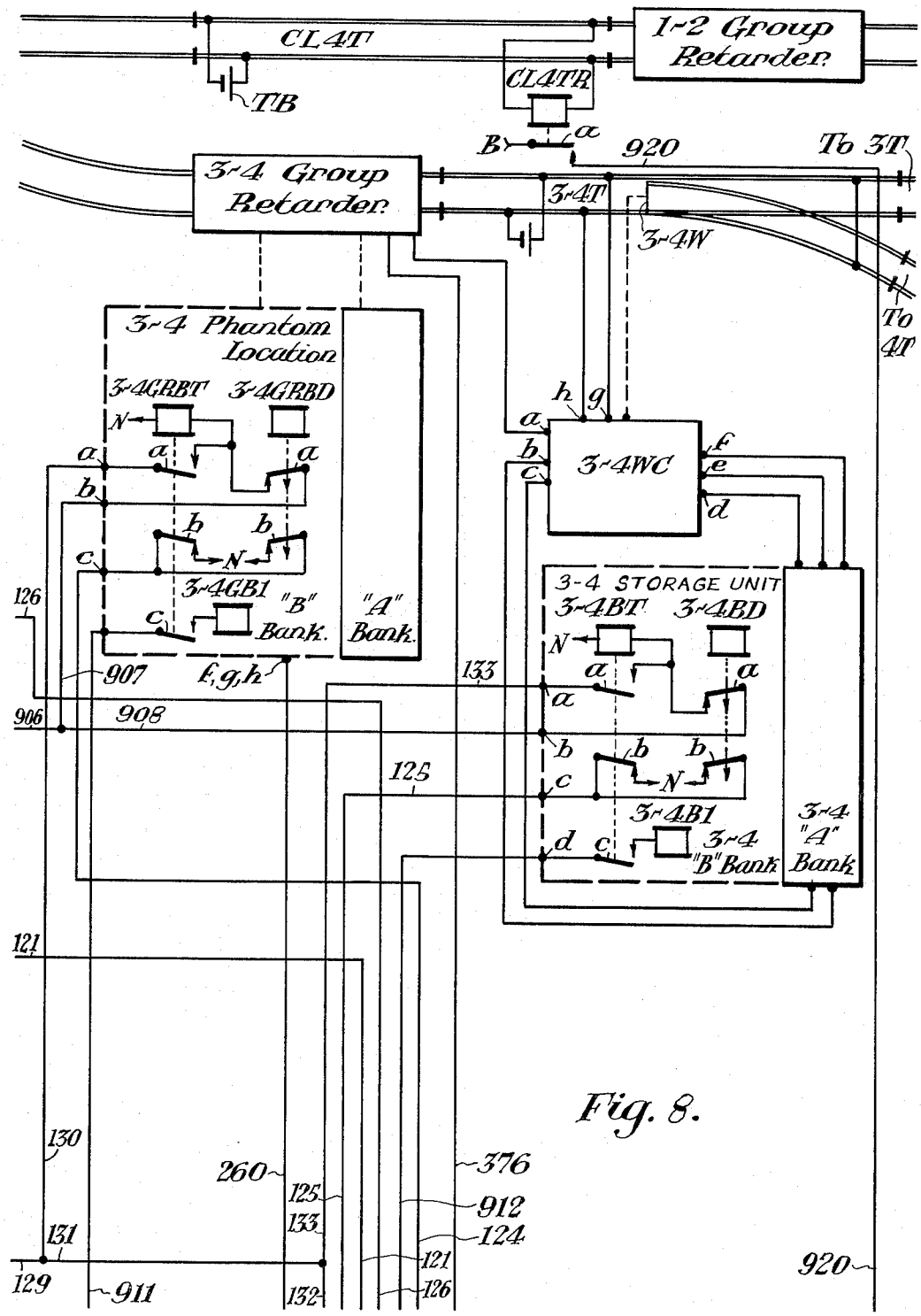
Figure 9:
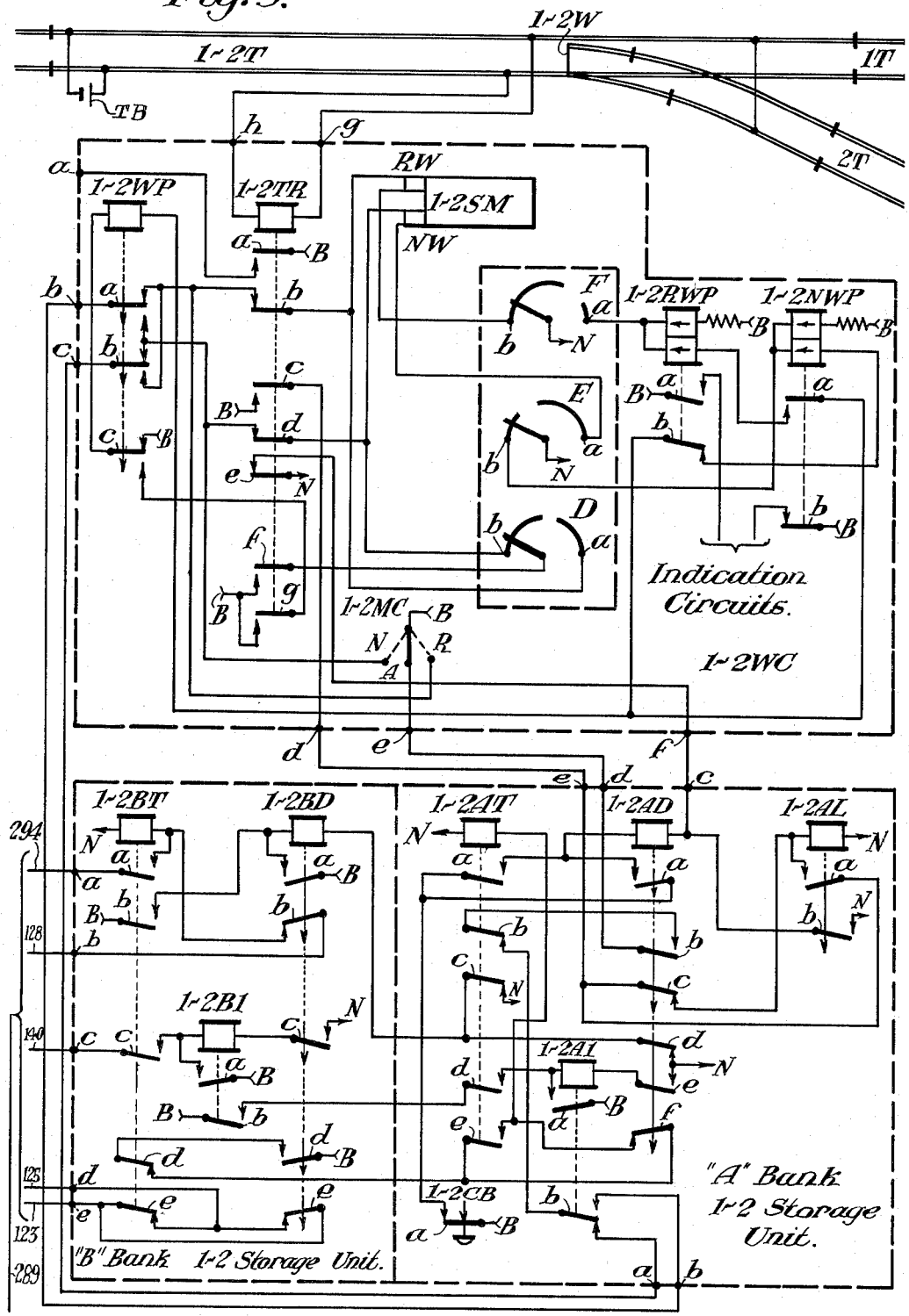

Referring now to the drawings, I have illustrated several routes in a classification yard. These routes are approached from a common route comprising an entrance and including a hump and an approach track section AT, as shown in FIG. 2. Following approach track section AT is a master retarder comprising two track sections MR1T and MR2T (FIGS. 2 through 5). Following the master retarder is a switch designated 1–8W (FIG. 5) which is provided with a detector track section 1–8T. Following switch 1–8W are two track switches designated 1–4W and 5–8W and provided with detector track sections 1–4T and 5–8T, respectively (FIGS. 7 and 6). Following switch 1–4 are shown two group car retarders resignated 1–2GR and 3–4GR (FIG. 8). Retarder 1–2GR is followed by a track switch 1–2W provided with a detector track section designated 1–2T (FIG. 9). Retarder 3–4GR is followed by a track switch 3–4W provided with a detector track section designated 3–4T (FIG. 8). Track switches 1–8W, 1–4W, 5–8W, 1–2W and 3–4W control the routes to storage tracks 1 through 8, 1 through 4, 5 through 8, 1 and 2, and 3 and 4, respectively.

As pointed out in the above-mentioned copending application Serial No. 676,730, a number of track sections will normally be provided between each group retarder and the preceding switch. However, for the sake of simplicity I have shown only a single approach track section in the approach to a group retarder. This track section is shown in the approach to group retarder 1–2GR and is designated CL4T (FIG. 9).

Each of the track sections just described is, in practice, provided with track circuits in the manner fully disclosed in the said copending application Serial No. 676,730. Since the majority of these track circuits are not involved in the operation of this embodiment of my invention, only the track relays in the track circuits associated with track sections AT, MR1T, MR2T, 1–8T, 1–4T, CL4T and 1–2T are shown. These track relays are designated ATR, R1TR, R2TR, 1–8TR, 1–4TR, CL4TR and 1–2TR, respectively, and are controlled by conventional D.C. track circuits, including the rails of their respective track sections, in a manner well known in the art, such that the relays are picked up when their respective track sections are unoccupied and released when their respective sections are occupied. The circuits controlled by these track relays will be discussed in detail below.

Figure 10:
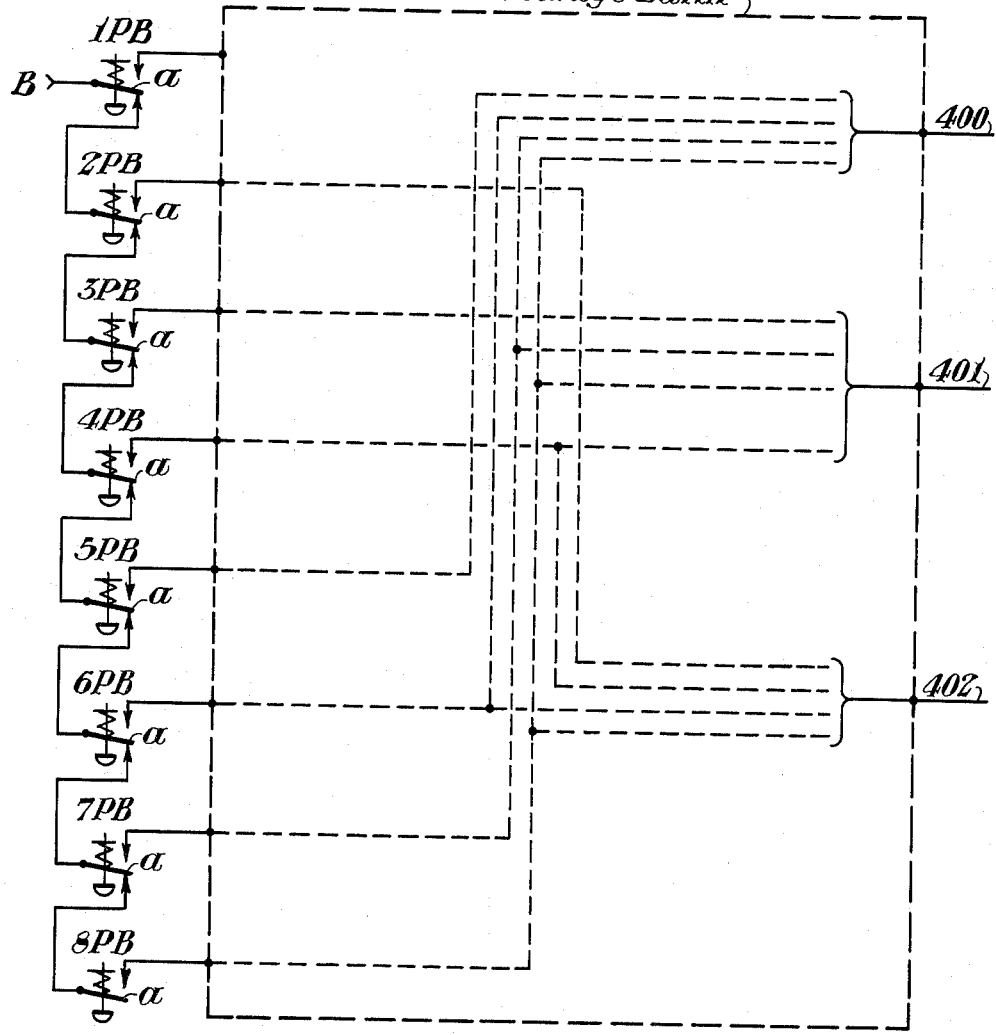

Referring now to FIG. 10 there is shown a track selection panel for the classification yard, by which the operator selects the proper storage or classification track for each cut of cars moving over the hump. This panel is represented by the push buttons shown on the left hand portion of FIG. 10, and designated as track selection push buttons. Each of these eight push buttons is designated by a reference character PB prefixed by a number corresponding to the classification track with which the particular button is associated. In general, the route identity for each cut of cars is initiated in the track selection panel or push button bank and progresses through the initial storage banks shown in FIG. 10 as described in Letters Patent of the United States No. 2,863,991, issued on December 9, 1958, to Benjamin Mishelevien for the Automatic Control of Railway Classification Yard Track Switches which is assigned to the assignee of my present application. For example, the depressing of push button 1PB establishes in the initial storage banks, a storage of the route to classification track 1, while the depressing of push button 2 establishes a similar storage of the route to classification track 2. The proper route for each cut of cars is selected by the operator pushing, in the same sequence that cuts of cars are to move over the hump, the correct push button for the destination of each cut.

While I have illustrated the use of a track selection panel and an initial storage bank for the selection and storage of the routes for the cuts of cars moving through the yard as shown and described in said United States Patent No. 2,863,991, it is to be understood that the route for each cut of cars may be stored by other means and transferred to the proper storage panel at the proper time. This route information could be inserted by tape means or other desired programming equipment if so desired. For example, the system disclosed in Letters Patent of the United States No. 2,826,360, issued March 11, 1958 to Sih Hsuin Tsiang for Automatic Circuit Selector which is assigned to the assignee of my present application, could be employed.

Referring now to FIG. 2, there is shown in block diagram form a radar velocity meter 9 whose output terminal $a$ is connected to the input terminal $a$ of a differentiator 10. The input terminal $b$ of velocity meter 9 is connected to an antenna 199 located at the exit end of approach track section AT. Velocity meter 9 supplies a velocity signal to differentiator 10 which in turn supplies, from its output terminal $b$, an acceleration signal to input terminal $a$ of a bias unit 11. This unit serves to bias by 100 volts the measured value of acceleration supplied to its input terminal $a$. This bias is required since the electronic storage units employed in the illustrated embodiment of my invention are adapted to store only positive voltages. Reference is made to above-mentioned copending applications Serial No. 676,730 and Serial No. 728,230 (Patent 3,162,405) for a full understanding of the operation of said apparatus as they form no part of my present invention. It is sufficient for the purposes of this description to point out that the voltage output from terminal $b$ of bias unit 11 is representative of the tangent track rolling resistance measurements to be stored and transferred by the apparatus of my invention. These measurements are proportional to the acceleration of cars moving in the path of antenna 199 of velocity meter 9.

The output signal from terminal $b$ of bias unit 11 is supplied over a front contact $a$ of a relay ATP to the first empty electronic storage unit of a series of such units located in a series of storage panels as hereinafter described. Said relay ATP is a back contact repeater relay of track relay ATR and is picked up when track section AT is occupied and released when track section AT is unoccupied. The number of storage units necessary depends on the number of cuts of cars which can be in the yard between track section AT and the group retarder, but for the purposes of this description I have shown six such units as described below.

In addition to relays ATR and ATP there are also shown in FIG. 2 of the drawings track repeater relays R1TP and R2TP, and control relays RI, ATCP and GEC. Relay ATP is energized by a circuit extending from terminal B of the battery over back conact $a$ of relay ATR, and through the winding of relay ATP to terminal N of the battery. Relays R1TP and R2TP are back contact repeaters of track relays R1TR and R2TR, respectively, and are energized by circuits extending from terminal B of the battery over back contacts $a$ of their associated track relays and through the windings of the repeater relays to terminal N of the battery. These track repeater relays are accordingly picked up when their respective track sections are occupied and are released when said sections are unoccupied. Relay RI has a pickup circuit which extends from terminal B of the battery over the front point of contact $b$ of relay ATP, front contact $b$ of relay ATCP and through the winding of relay RI to terminal N of the battery. Relay RI has a stick circuit which extends from terminal B of the battery over back contact $c$ of relay R1TP, its own front contact $a$, and through the winding of the relay to battery terminal N. Relay ATCP has a pickup circuit which extends from terminal B of the battery over the back point of contact $b$ of relay ATP and through the winding of the relay to terminal N of the battery. Relay ATCP has a first stick circuit which extends from terminal B of the battery over back contact $b$ of relay RI, its own front contact $a$, and through the winding of the relay to terminal N of the battery. Relay ATCP has a second stick circuit which extends from terminal B of the battery over fron contact $a$ of relay R1TP, its own front contact $a$, and through the winding of the relay to terminal N of the battery. It is, therefore, apparent that relay RI is normally released and relay ATCP normally picked up. The purpose and operation of these relays will become apparent as this description proceeds.

End of cut relay GEC is picked up when track section MR1T is vacated by a cut of cars and remains up as long as track section MR2T is occupied by the cut. The pickup circuit for relay GEC extends from terminal B of the battery over back contact $d$ of relay R1TP, front contact $a$ of relay R2TP and through the winding of the relay to battery terminal N. Relay GEC also has a stick circuit which extends from terminal B of the battery over front contact $a$ of relay GEC, front contact $a$ of relay R2TP and through the winding of the relay to terminal N of the battery. It is thus apparent that relay GEC picks up when section MR2T is occupied and section MR1T is unoccupied, and is held up as long as section MR2T is occupied.

Figure 3:
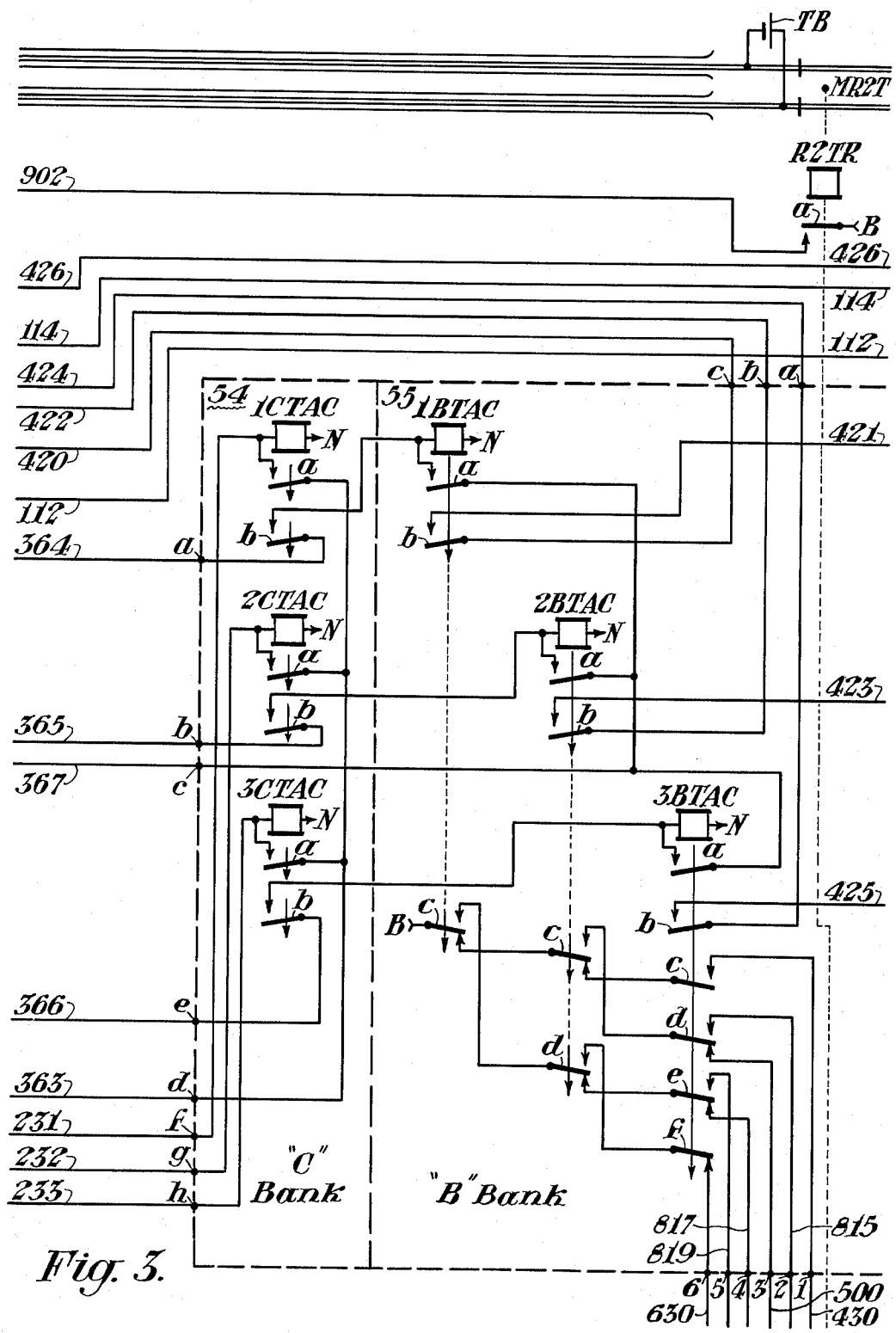
Figure 4:
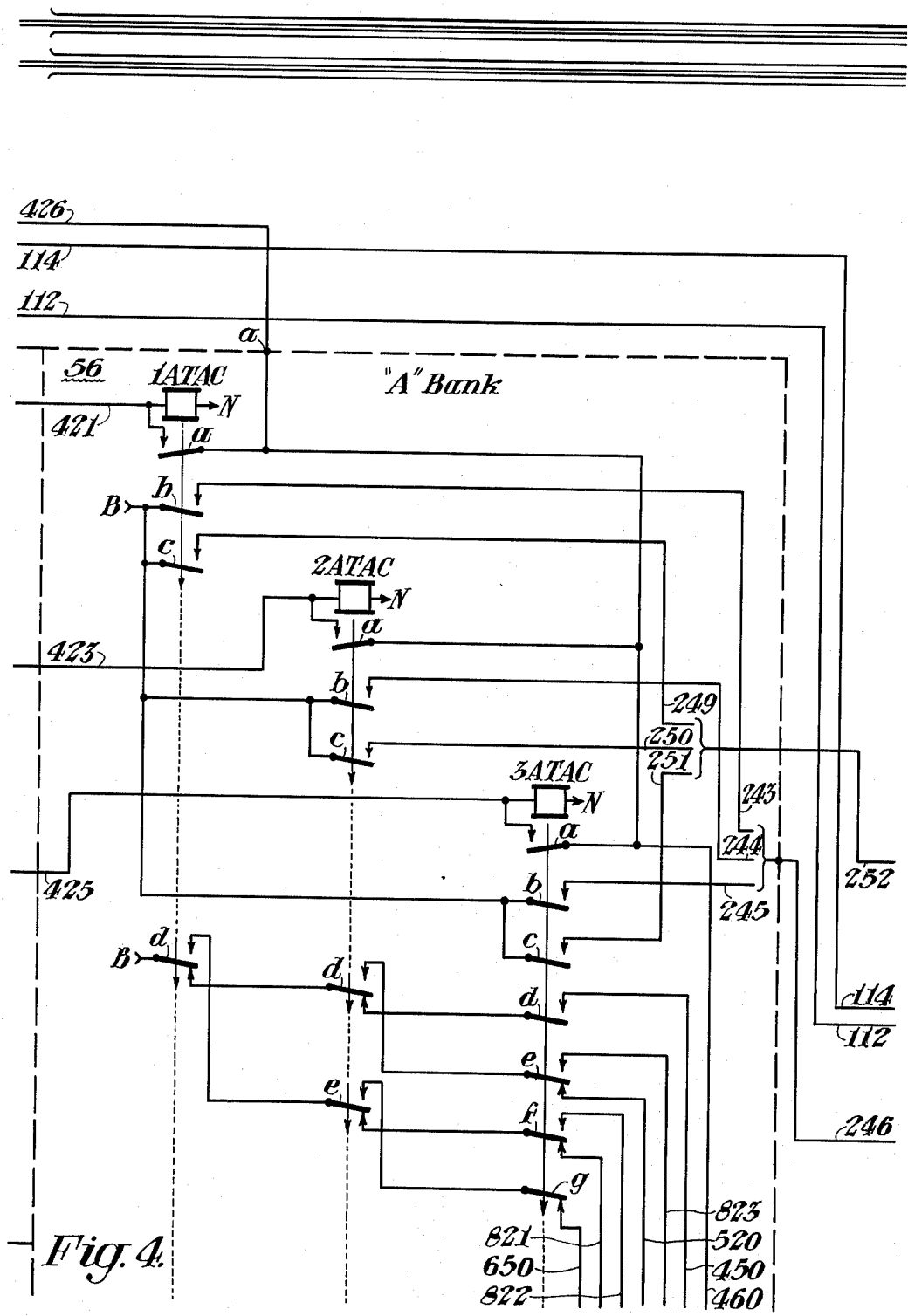
Figure 16:
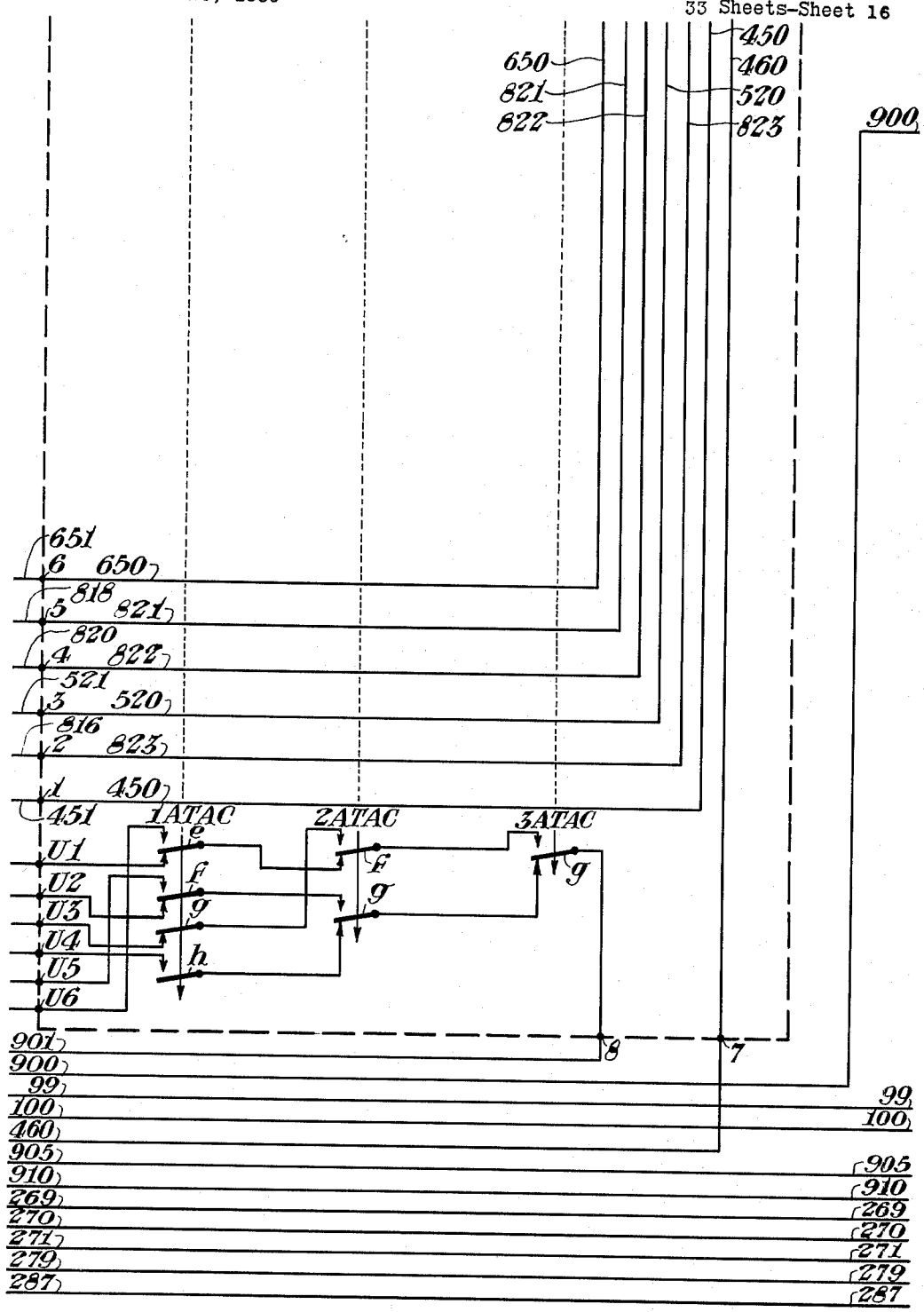

It will be convenient at this point to discuss the tangent acceleration code (TAC) storage banks associated with the master retarder. These storage banks are shown in FIGS. 3, 4 and 16 and are designated by the reference characters 54, 55 and 56. The C bank 54 of the TAC storage unit associated with the master retarder comprises three storage relays 1CTAC, 2CTAC and 3CTAC (FIG. 3). These relays are energized from leads 231, 232 and 233, respectively, in a manner to be hereinafter described. Each of these relays is made slightly slow to release to insure that the circuits controlled by the relays will be closed for a sufficient length of time to perform their functions. Storage relays 1CTAC through 3CTAC have stick circuits including a common lead 363 from terminal B of the battery over front contact d of relay ATP (FIG. 2), and individual paths extending from this common lead over front contact a of each of the relays and through the winding of the relay to terminal N of the battery.

The B bank 55 of the TAC storage unit associated with the master retarder comprises three relays 1BTAC, 2BTAC and 3BTAC (FIG. 3). Each of these relays is made slightly slow to release in order to insure that its transfer circuit is closed for a sufficient time, as will appear. Each of these relays has a similar pickup circuit extending from terminal B of the battery over a back contact of relay R1TP (FIG. 2) and a front contact of the corresponding storage relay in the C bank previously described. For relay 1BTAC, the pickup circuit includes back contact b of relay R1TP, lead 364, and front contact b of relay 1CTAC. For relay 2BTAC, the pickup circuit includes back contact e of relay R1TP, lead 365, and front contact b of relay 2CTAC. The circuit for relay 3BTAC includes the back point of contact f of relay R1TP, lead 366, and front contact b of relay 3CTAC. Relays 1BTAC, 2BTAC and 3BTAC have similar stick circuits including a common path extending from terminal B of the battery over the front point of contact f of relay R1TP (FIG. 2), lead 367, and individual paths over front contacts a of each relay and through the winding of each relay to terminal N of the battery.

The A bank 56 (FIG. 4) of the TAC unit associated with the master retarder comprises three relays 1ATAC, 2ATAC and 3ATAC. Relay 1ATAC has a pickup circuit extending from terminal B of the battery over back contact d of relay GEC (FIG. 2) lead 420, front contact b of relay 1BTAC, lead 421, and through the winding of relay 1ATAC to terminal N of the battery. Relay 2ATAC has a pickup circuit extending from terminal B of the battery over back contact c of relay GEC, lead 422, front contact b of relay 2BTAC, lead 423, and through the winding of relay 2ATAC to terminal N of the battery. Relay 3ATAC has a pickup circuit extending from terminal B of the battery over back contact b of relay GEC, lead 424, front contact b of relay 3BTAC, lead 425, and through the winding of relay 3ATAC to terminal N of the battery. Relays 1ATAC through 3ATAC each have two similar stick circuits the first including a common path extending from terminal B of the battery over the front contact b of relay R2TP (FIG. 2), lead 426 and thence over the respective front contact a and through the windings of the relays to terminal N of the battery. The second stick circuit for relays 1ATAC, 2ATAC and 3ATAC includes a common path which extends from terminal B of the battery over front contact g of relay CLV (FIG. 14), to be discussed, lead 460, and thence over the respective front contacts a of the relays and through the windings of the relays to terminal N of the battery.

The storage apparatus employed in my invention is located in storage panels 1RP through 6RP as shown in FIGS. 11, 12, 23, 24, 29, 30, 32 and 33. Since these storage panels, which include the electronic storage units, the storage relays; and the storage selection, code generating, storage interrogating and storage cancellation circuits, are substantially identical, only the first, second and last of the six panels are shown in detail. The details of panels 3RP through 5RP may be identical with panel 2RP except for an obvious progressive change in the generated code identifying the panel, as will be described. In panels 1RP, 2RP and 6RP, the storage units such as 1ES, 2ES and 6ES are shown in block form and the storage units in the remaining panels are not shown since they would be identical. For complete details of this storage unit, reference may be had to the copending application for Letters Patent of the United States Serial No. 634,000 for Electronic Storage Device, filed January 14, 1957 by James A. Cook, Jr., assigned to the assignee of my present application, and now Patent No. 2,914,750, issued November 24, 1959. For present purposes, however, it is sufficient to note that terminals a, b, c and d on each of the storage units 1ES through 6ES are respectively identical. The voltage to be stored is applied between terminal a and grounded terminal d. When it is desired to complete the storage, the corresponding one of the relays 1H through 6H included in storage units 1ES through 6ES, respectively, is energized from terminal B of the battery over external circuitry to be described and through the winding of the selected relay 1H through 6H to terminal N of the battery. The stored voltage may be read out of the unit between output terminal c and ground terminal d.

Storage panel 1RP (FIGS. 11, 12, 23 and 24) comprises said electronic storage unit 1ES, including relay 1H; and ten additional relays 1A, 1B, 1CR, 1RO, 1WS1, 1WS2, 1WS3, 1RHS, 1RLS and 1CLVS. Relay 1A (FIG. 11) has a pickup circuit extending from terminal B of the battery over front contact c of relay ATP in FIG. 2, the front point of contact c of relay RI, lead 208 (FIGS. 14, 13 and 12), terminal r of panel 1RP (FIG. 11), the back point of contact b of relay 1B, to be described, lead 326, the front point of contact a of relay 1CR (FIG. 12), to be described, lead 327, and through rectifier 240 (FIG. 11, which serves to prevent sneak circuits, and through the winding of relay 1A to terminal N of the battery. Relay 1A has a first stick circuit extending from terminal B of the battery over an additional back contact d of relay 1H in storage unit 1ES (FIG. 12), lead 328, its own front contact a, and through the winding of the relay to terminal N of the battery. Relay 1A has a second stick circuit extending from terminal B of the battery over the back point of contact c of relay 1B, its own front contact a, and through the winding of the relay to terminal N of the battery.

Relay 1B (FIG. 11) has a first pickup circuit extending from terminal B of the battery over front contact c of relay ATP in FIG. 2, the back point of contact c of relay RI, lead 210 (FIGS. 14, 13 and 12), terminal p of panel 1RP (FIG. 11), the front point of contact c of relay 1A, and through rectifier 211, which serves to prevent sneak circuits, and the winding of relay 1B to terminal N of the battery. Relay 1B has a second pickup circuit extending from terminal B of the battery over back contact a of relay TRCTD (FIG. 11), to be described, to terminal t of panel 1RP, lead 329, over back contact c of relay 1CR (FIG. 12), the front point of contact e of relay 1H, lead 330, the back point of contact of relay 1A, through rectifier 211, and through the winding of relay 1H, lead 330, the back point of contact c of a third pickup circuit which extends from terminal B of the battery over front contact b of relay 1CR (FIG. 12), the back point of an additional contact e of relay 1H, lead 330, back contact c of relay 1A, through rectifier 211, and through the winding of relay 1B to terminal N of the battery. Relay 1B has a fourth pick-up circuit which extends from terminal a of panel 1RP (FIG. 11), through rectifiers 241 and 211, and through the winding of relay 1B to terminal N of the battery. The circuit of relay 1H, lead 330, the back point of contact c of panel 1RP will be described later in this description. Relay 1B has a stick circuit which extends from terminal B of the battery over back contact b of relay 1RO (FIG. 11), to be described, its own front contact a, and through the winding of the relay to terminal N of the battery.

Relay 1CR (FIG. 12) has a pickup circuit extending from output terminal c of storage unit 1ES over leads 212 and 213, through the winding of relay 1CR, and over lead 331, back contact f of relay 1B (FIG. 11), and lead 332 to ground. Relay 1CR is therefore picked up whenever a voltage stored in unit 1ES appears at output terminal c of that unit.

Relay 1H (FIG. 12) has a first pickup circuit extending from terminal B of the battery in FIG. 2, over front contact c of relay ATP, the front point of contact c of relay RI, lead 208 (FIGS. 14, 13 and 12), terminal r of panel 1RP (FIG. 11), the back point of contact b of relay 1B, lead 326, the back point of contact a of relay 1CR (FIG. 12), lead 333, back contact b of relay 1A (FIG. 11), lead 334, terminal b of storage unit 1ES (FIG. 12), and through the winding of relay 1H to terminal N of the battery. Relay 1H has a second pickup circuit extending from terminal B of the battery over front contact d of relay 1B (FIG. 11) and lead 334 to terminal b of storage unit 1ES and through the winding of relay 1H to terminal N of the battery.

Electronic storage unit 1ES (FIG. 12) has a first input circuit extending from ground through a 100 volt battery 214 (FIG. 11) and over the back point of contact e of relay 1A and lead 335 to terminal a of unit 1ES, and thence through the unit to ground at grounded terminal d of unit 1ES. Storage unit 1ES has a second input circuit extending from terminal b of bias unit 11, in FIG. 2, previously described, lead 296, over front contact a of relay ATP (FIG. 2), lead 215 (FIGS. 14, 13 and 12), terminal q of panel 1RP (FIG. 11) and over the front point of contact e of relay 1A and lead 335 to terminal a of electronic storage unit 1ES and through the unit to ground at grounded terminal d. Electronic storage unit 1ES has an output circuit between grounded terminal d and terminal c and extending from terminal c over leads 212 and 216 to front contact g of relay 1B (FIG. 11) and thence over lead 336 to output terminal k of panel 1RP (FIG. 12).

Relays 1WS1, 1WS2, and 1WS3 in control panel 1RP (FIGS. 11 and 12) are switch control storage relays for storing controls for switches 1–8W, 1–4W, 5–8W, 1–2W and 3–4W which, as previously set forth, control the routes to storage tracks 1 through 8, 1 through 4, 5 through 8, 1 and 2, and 3 and 4, respectively. Each of the control panels 2RP through 6RP includes a similar set of relays. These relays are employed to control the alignment of the routes for each cut of cars associated with each storage panel.

Referring again to FIG. 10 it will be noted that the depressing of push button 1PB does not supply energy to any circuit. The depressing of push button 2PB supplies energy from terminal B of the battery over the back point of contact a of 1PB and the front point of contact a of 2PB, through the initial storage bank to lead 402. The depressing of push button 3PB supplies energy from terminal B of the battery over the back points of contacts a of 1PB and 2PB and the front point of contact a of 3PB, through the initial storage bank to lead 401. The depressing of push button 4PB supplies energy from terminal B of the battery over the back points of contacts a of 1PB through 3PB and the front point of contact a of 4PB to leads 401 and 402. The depressing of push button 5PB supplies energy from terminal B of the battery over the back points of contacts a of 1PB through 4PB and the front point of contact a of 5PB to lead 400. The depressing of push button 6PB supplies energy from terminal B of the battery over the back points of contacts a of 1PB through 5PB and the front point of contact a of 6PB to leads 400 and 402. The depressing of push button 7PB supplies energy from terminal B of the battery over the back points of contacts a of 1PB through 6PB and the front point of contact a of 7PB to leads 400 and 401. The depressing of push button 8PB supplies energy from terminal B of the battery over the back points of contacts a of 1PB through 7PB and the front point of contact a of 8PB to leads 400, 401 and 402. The details of circuits for accomplishing the connections first described, here shown schematically, are shown and described in application Serial No. 676,730, referred to above.

Figure 11:
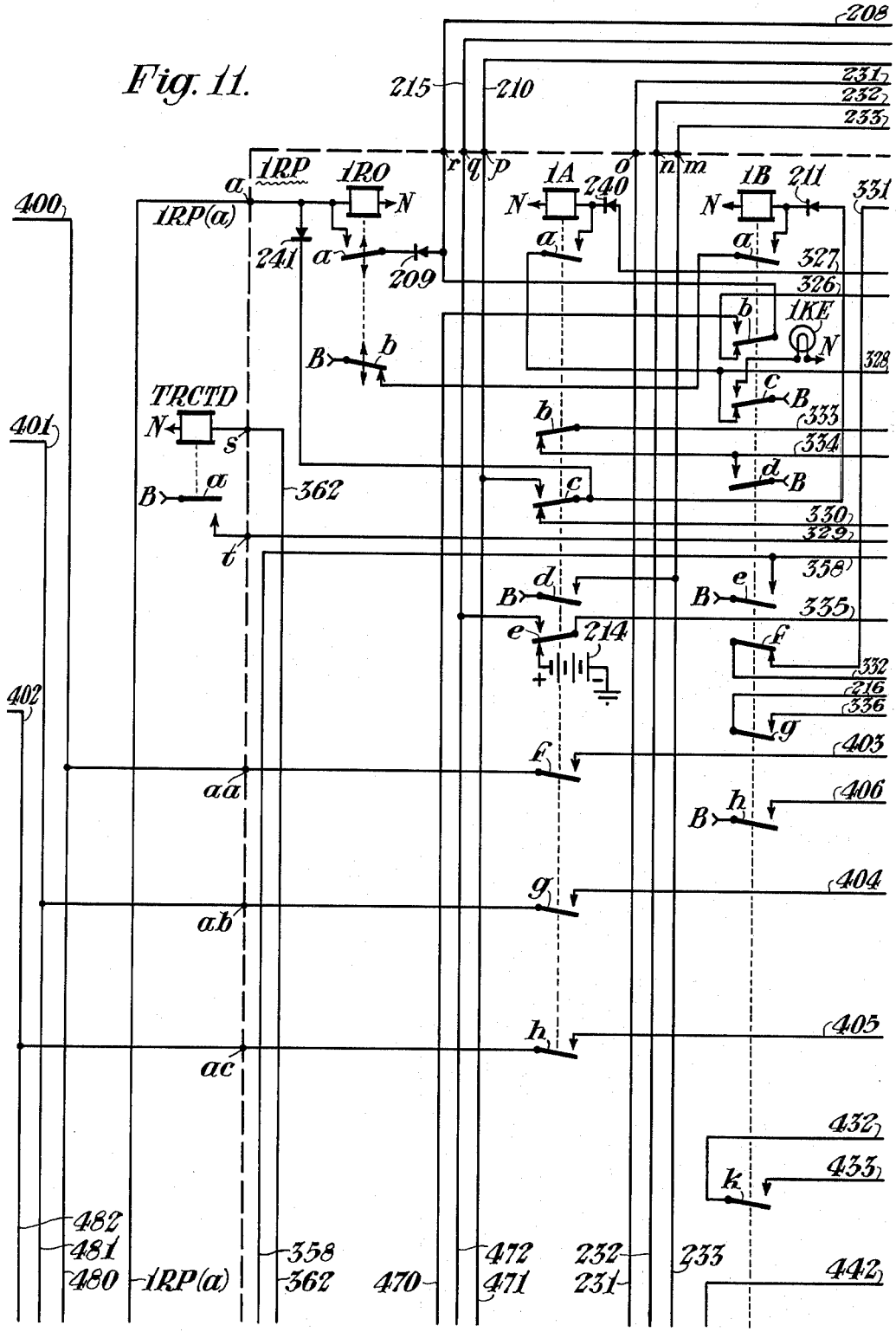
Figure 12:
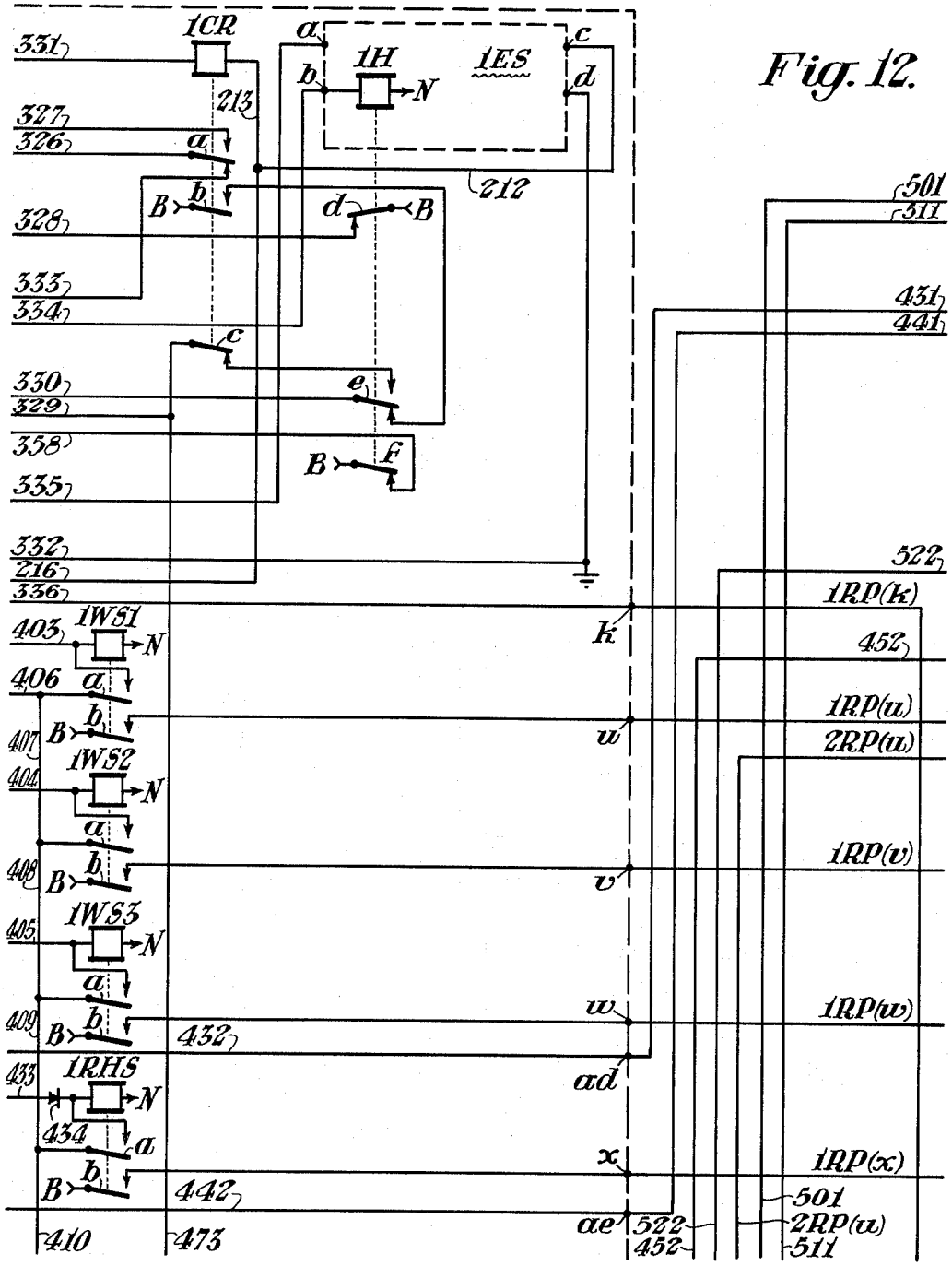

Referring now to FIGS. 10, 11 and 12, relay 1WS1 has a pickup circuit which extends over lead 400 to terminal aa of panel 1RP (FIG. 11), front contact f of relay 1A, lead 403, and through the winding of relay 1WS1 (FIG. 12) to terminal N of the battery. Relay 1WS1 has a stick circuit which extends from terminal B of the battery over front contact h of relay 1B (FIG. 11), lead 406 front contact a of relay 1WS1, and through the winding of relay 1WS1 to terminal N of the battery.

Relay 1WS2 has a pickup circuit which extends over lead 401 (FIG. 10), to terminal ab of panel 1RP (FIG. 11), front contact g of relay 1A, lead 404, and through the winding of relay 1WS2 (FIG. 12) to terminal N of the battery. Relay 1WS2 has a stick circuit which extends from terminal B of the battery over front contact h of relay 1B (FIG. 11), lead 406, lead 407, front contact a of relay 1WS2 and through the winding of relay 1WS2 to terminal N of the battery.

Relay 1WS3 has a pickup circuit which extends over lead 402, terminal ac of panel 1RP (FIG. 11), front contact h of relay 1A, lead 405, and through the winding of relay 1WS3 (FIG. 12) to terminal N of the battery. Relay 1WS3 has a stick circuit which extends from terminal B of the battery over front contact h of relay 1B (FIG. 11), lead 406, lead 407, lead 408, front contact a of relay 1WS3 and through the winding of relay 1WS3 to terminal N of the battery.

By the above description it is apparent that circuits are prepared for the pickup of relay 1WS1 when one of the push buttons 5PB through 8PB is depressed, circuits are prepared for the pickup of relay 1WS2 when one of the push buttons 3PB, 4PB, 7PB and 8PB is depressed, and circuits are prepared for the pickup of relay 1WS3 when one of the push buttons 2PB, 4PB, 6PB or 8PB are depressed.

Referring to FIGS. 2 through 9, it may be seen that three is the maximum number of switches in any route in the route to storage tracks 1 through 8. Therefore, only three switch control storage relays 1WS1, 1WS2 and 1WS3 are required in panel 1RP. This also applies to panels 2RP through 6RP. Relays WS1 in panels 1RP through 6RP are the switch control storage relays for the first switch in any route. Relays WS2 in panels 1RP through 6RP are the switch control storage relays for the second switch in any route. Relays WS3 in panels 1RP through 6RP are the switch control storage relays for the third switch in any route. These WS relays are picked up when their associated switch is to be controlled to a reverse position and are released when their associated switch is to be controlled to a normal position. Therefore, for a route to storage track 1, all switches should occupy their normal positions and it is not necessary that the depressing of push button 1PB of the track selection push buttons energize any WS relays. For a route to storage track 2 only the third or last switch need be controlled to the reverse position and the depressing of push button 2PB need energize only one of the WS3 relays by the supplying of energy to lead 402 (FIG. 10). It is believed that the supplying of energy to one of the leads 400, 401, or 402, or a combination thereof, when any of the push buttons is depressed is readily apparent in view of the above description. This will, however, become more apparent as the description proceeds.

Referring now to FIGS. 11, 12, 23 and 24, there is shown in panel 1RP relays 1RHS, 1RLS and 1CLVS. Relays 1RHS and 1RLS are the weight storage relays in panel 1RP and relay 1CLVS is the correct leaving velocity storage relay for that panel. The purpose of these relays will be brought out later in this description.

Relay 1RHS (FIG. 12) has a pickup circuit which extends from terminal B of the battery over the back point of contact $c$ of relay 1BTAC (FIG. 3), the back point of contact $c$ of relay 2BTAC (FIG. 3), front contact $c$ of relay 3BTAC (FIG. 3), terminal 1 of the B bank 55 of the tangent acceleration code storage banks, previously described, lead 430 (FIGS. 3 and 15), front contact $f$ of relay RH1 (FIG. 14), to be discussed, lead 431 (FIGS. 14, 13 and 12), terminal $ad$ of panel 1RP (FIG. 12), lead 432, front contact $k$ of relay 1B (FIG. 11), lead 433, rectifier 434 (FIG. 12), which serves to prevent sneak circuits, and through the winding of relay 1RHS to terminal N of the battery. Relay 1RHS has a stick circuit which extends from terminal B of the battery over front contact $h$ of relay 1B (FIG. 11), leads 406, 407, 408 and 409 (FIG. 12), front contact $a$ of relay 1RHS and through the winding of relay 1RHS to terminal N of the battery.

Relay 1RLS (FIG. 24) has a pickup circuit which extends from terminal B of the battery over the back point of contact $c$ of relay 1BTAC (FIG. 3), the back point of contact $c$ of relay 2BTAC (FIG. 3), front contact $c$ of relay 3BTAC (FIG. 3), terminal 1 of the B bank 55 of the tangent acceleration code storage banks, previously described, lead 430 (FIGS. 3 and 15), lead 440, front contact $f$ of relay RL1 (FIG. 14), to be discussed, lead 441 (FIGS. 14, 13 and 12), terminal $ae$ of panel 1RP (FIG. 12), lead 442 (FIGS. 12, 11 and 23), front contact $l$ of relay 1B (FIG. 23), lead 443, rectifier 444 (FIG. 24), which serves to prevent sneak circuits, and through the winding of relay 1RLS to terminal N of the battery. Relay 1RLS has a stick circuit which extends from terminal B of the battery over front contact $h$ of relay 1B (FIG. 11), leads 406, 407, 408, 409 and 410 (FIGS. 12 and 24), front contact $a$ of relay 1RLS and through the winding of relay 1RHS to terminal N of the battery.

Relay 1CLVS (FIG. 24) has a pickup circuit which extends from terminal B of the battery over the back point of contact $d$ of relay 1ATAC (FIG. 4), the back point of contact $d$ of relay 2ATAC (FIG. 4), the front point of contact $d$ of relay 3ATAC (FIG. 4), lead 450 (FIGS. 4 and 16), terminal 1 of A bank 56 of the tangent acceleration code storage banks (FIG. 16), previously described, lead 451 (FIGS. 16, 15 and 14), back contact $i$ of relay R2TP (FIG. 14), previously described, front contact $f$ of relay CLV (FIG. 14), to be discussed, lead 452 (FIGS. 14, 13, 12, and 24), terminal $af$ of panel 1RP, lead 453 (FIGS. 24 and 23), front contact $m$ of relay 1B, lead 454 (FIGS. 23 and 24), and through the winding of relay 1CLVS to terminal N of the battery. Relay 1CLVS has a stick circuit which extends from terminal B of the battery over front contact $h$ of relay 1B (FIG. 11), leads 406, 407, 408, 409, 410 and 411 (FIGS. 11, 12 and 24), front contact $a$ of relay 1CLVS, and through the winding of relay 1CLVS to terminal N of the battery.

Figure 14:
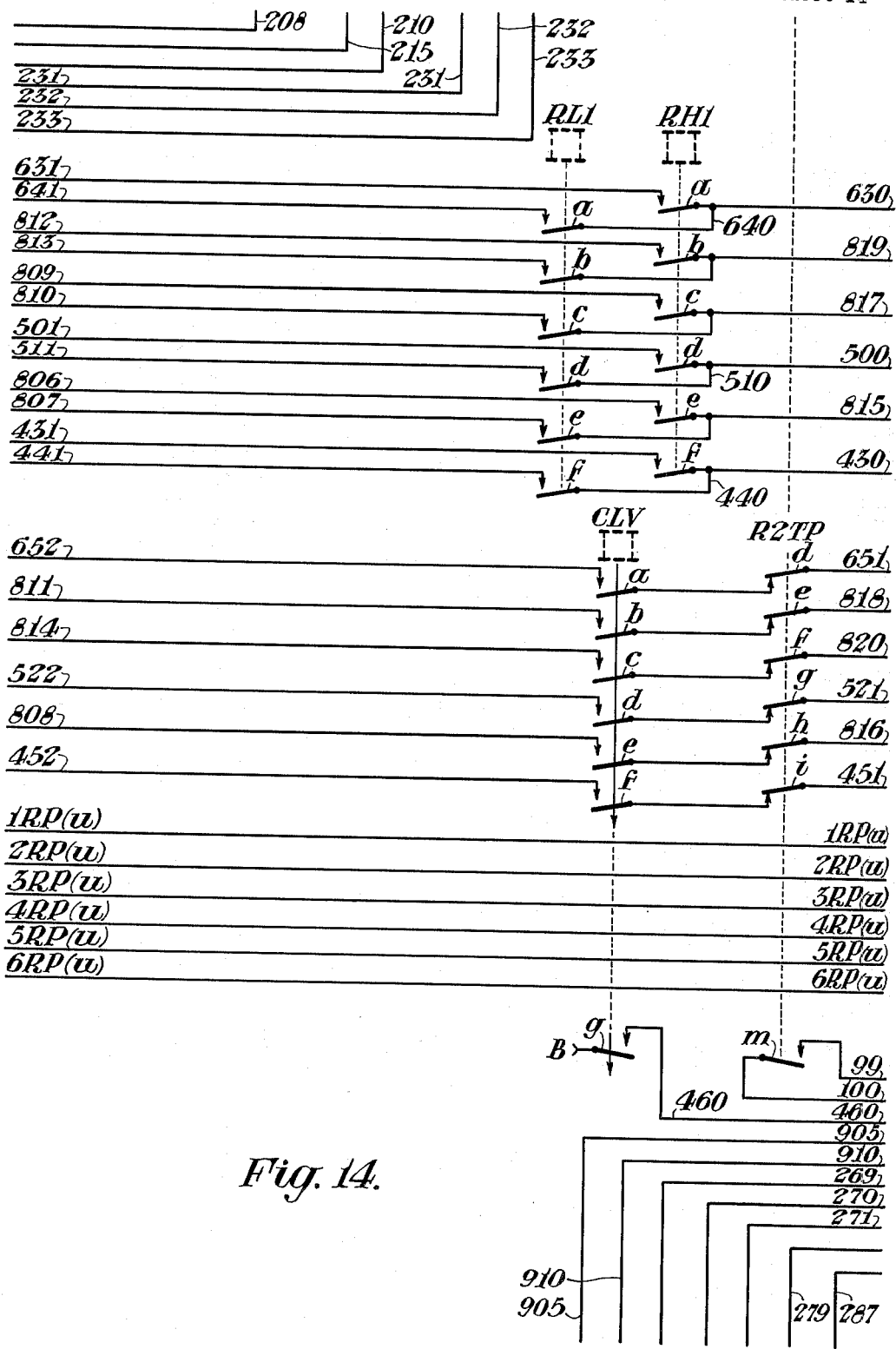

The windings of the above-mentioned relays RH1, RL1 and CLV are shown in FIG. 14 by broken lines as their method of control forms no part of my present invention. Relays RH1 and RL1 are controlled in a manner identical to relays RH1 and RL1 shown in FIG. 1a of Letters Patent of the United States No. 2,819,682, issued January 14, 1958 to Edward C. Falkowski for Car Retarder Speed Control Apparatus, which patent is assigned to the assignee of my present application. It is sufficient for purposes of this description to point out that relays RH1 and RL1 shown in FIG. 14 of my present application are employed to store in the form of a code the weight information for cuts of cars. In particular, for light cars only relay RL1 is picked up, for heavy cars only relay RH1 is picked up, and for medium cars both relays RL1 and RH1 are picked up. Reference is made to the above cited Letters Patent of the United States for a complete description of the control for these relays.

Relay CLV is controlled in the manner identical to relay CLV shown in FIG. 39 of previously mentioned copending application Serial No. 676,730 by David P. Fitzsimmons and William A. Robison, Jr. It is sufficient for purposes of this description to point out that relay CLV is picked up after a cut of cars occupies track section 1–8T, if the velocity of the cut while still traversing the second section of the master retarder agrees with the selected leaving velocity for the cut, and remains released if said velocities do not agree. Relay CLV, therefore indicates what is termed a "yes-no" function and the relay is termed a correct leaving velocity (CLV) relay. Reference is made to above-cited application Serial No. 676,730 for a complete description of the operation of the CLV relay.

Panel 2RP (FIGS. 23, 24, 29 and 30) comprises an electronic storage unit 2ES including a relay 2H; and ten additional relays 2RO, 2A, 2B, 2CR, 2WS1, 2WS2, 2WS3, 2RHS, 2RLS and 2CLVS. Relay 2A (FIG. 23) has a pickup circuit extending from terminal B of the battery over front contact $c$ of relay ATP in FIG. 2, the front point of contact $c$ of relay RI, lead 208 (FIGS. 14, 13 and 12), terminal $r$ of panel 1RP (FIG. 11), from terminal $r$ of panel 1RP over the front point of contact $b$ of relay 1B, lead 470, to terminal $d$ of panel 1RP (FIG. 23), from terminal $d$ of panel 1RP to terminal $r$ of panel 2RP, over the back point of contact $b$ of relay 2B, to be described, lead 337, the front point of contact $a$ of relay 2CR (FIG. 24), lead 338, rectifier 235 (FIG. 23), which serves to prevent sneak circuits, and through the winding of relay 2A to terminal N of the battery. Relay 2A has a first stick circuit extending from terminal B of the battery over back contact $d$ of relay 2H (FIG. 24), lead 339, front contact $a$ of relay 2A (FIG. 23), and through the winding of the relay to terminal N of the battery. Relay 2A has a second stick circuit which extends from terminal B of the battery over the back point of contact $c$ of relay 2B (FIG. 23), front contact $a$ of relay 2A, and through the winding of the relay to terminal N of the battery.

Relay 2B (FIG. 23) has four pickup circuits. The first extends from terminal B of the battery over front contact $c$ of relay ATP in FIG. 2, the back point of contact $c$ of relay RI, lead 210 (FIGS. 14, 13 and 12), terminal $p$ of panel 1RP (FIG. 11), lead 471, terminal $f$ of panel 1RP (FIG. 23), terminal $p$ of panel 2RP, the front point of contact $c$ of relay 2A, through rectifier 219, which serves to prevent sneak circuits, and through the winding of relay 2B to terminal N of the battery. The second pickup circuit for relay 2B extends from terminal B of the battery over front contact $b$ of relay 2CR (FIG. 24), the back point of contact $e$ of relay 2H, lead 340, the back point of contact $c$ of relay 2A (FIG. 23), through rectifier 219, and through the winding of relay 2B to terminal N of the battery. Relay 2B has a third pickup circuit extending from terminal B of the battery over back contact $a$ of relay TRCTD (FIG. 11), to be described, to terminal $t$ of panel 1RP, lead 329, lead 473 (FIG. 12), terminal $j$ of panel 1RP (FIG. 24), terminal $l$ of panel 2RP, over back contact $c$ of relay 2CR, the front point of contact $e$ of relay 2H, lead 340, the back point of contact $c$ of relay 2A, and through rectifier 219 and the winding of relay 2B to terminal N of the battery. Relay 2B has a fourth pickup circuit extending from terminal $a$ of panel 2RP (FIG. 23), through rectifiers 234 and 219 and through the winding of relay 2B to terminal N of the battery. The circuits for connecting terminal B of the battery to terminal $a$ of panel 2RP will be described later in this description. Relay 2B has a stick circuit extending from terminal B of the battery over back contact $b$ of relay 2RO (FIG. 23), to be described, front contact $a$ of relay 2B, and through the winding of the relay to terminal N of the battery.

Relay 2CR (FIG. 24) has a pickup circuit extending from output terminal $c$ of storage unit 2ES over leads 220 and 221, through the winding of relay 2CR, over lead 341, over back contact $f$ of relay 2B (FIG. 23), and over lead 342 to ground. Relay 2CR is accordingly picked up whenever a stored voltage appears between terminal $c$ of unit 2ES and ground terminal $d$.

Relay 2H (FIG. 24) has two pickup circuits. The first extends from terminal B of the battery over front contact $c$ of relay ATP in FIG. 2, the front point of contact $c$ of relay RI, lead 208 (FIGS. 14, 13 and 12), terminal $r$ of panel 1RP (FIG. 11), from terminal $r$ of panel 1RP over the front point of contact $b$ of relay 1B, lead 470, to terminal $d$ of panel 1RP (FIG. 23), from terminal $d$ of panel 1RP to terminal $r$ of panel 2RP, over the back point of contact $b$ of relay 2B, lead 337, the back point of contact $a$ of relay 2CR (FIG. 24), lead 343, back contact $b$ of relay 2A (FIG. 23), lead 344, terminal $b$ of unit 2ES (FIG. 24), and through the winding of relay 2H to terminal N of the battery. The second pickup circuit for relay 2H extends from terminal B of the battery over front contact $d$ of relay 2B (FIG. 23) and lead 344 to terminal $b$ of unit 2ES (FIG. 24) and through the winding of relay 2H to terminal N of the battery.

Figure 23:
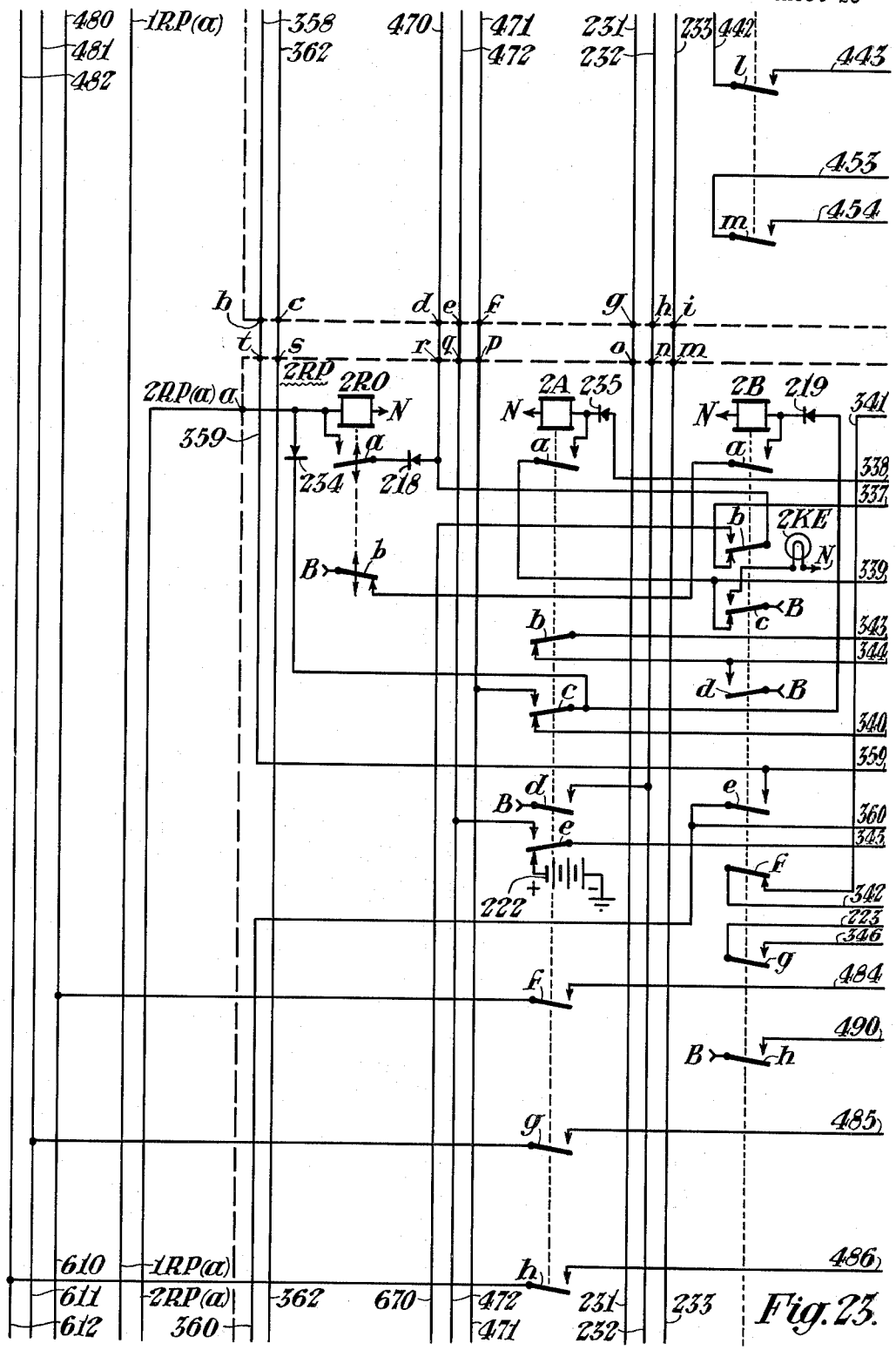
Figure 24:
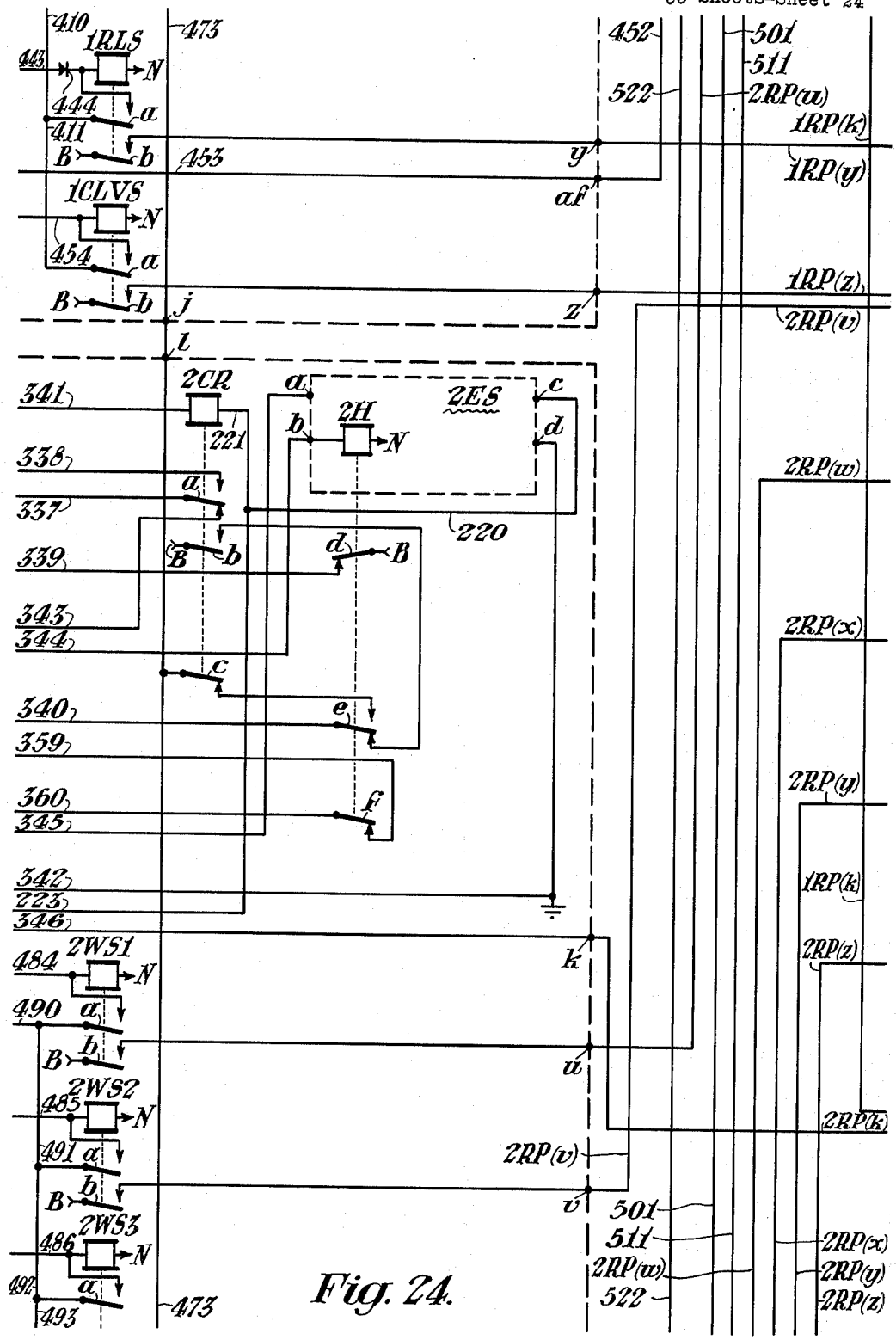

Storage unit 2ES (FIG. 24) has two input circuits, the first extending from ground through battery 222 (FIG. 23) over the back point of contact $e$ of relay 2A and lead 345 to input terminal $a$ of storage unit 2ES and through the unit to grounded terminal $d$, and the second extending from ground through bias unit 11 in FIG. 2 to terminal $b$ of unit 11, over lead 296, front contact $a$ of relay ATP, lead 215 (FIGS. 14, 13 and 12), terminal $q$ of panel 1RP (FIG. 11), lead 472, terminal $e$ of panel 1RP (FIG. 23,) terminal $q$ of panel 2RP, and over the front point of contact $e$ of relay 2A and lead 345 to input terminal $a$ of unit 2ES (FIG. 24). Storage unit 2ES has an output circuit extending from ground terminal $d$ through the unit to output terminal $c$, and over leads 220 and 223, front contact $g$ of relay 2B (FIG. 23) and lead 346 to output terminal $k$ of panel 2RP (FIG. 24).

Relays 2WS1, 2WS2 and 2WS3 in control panel 2RP (FIG. 24), as previously mentioned, correspond to relays 1WS1, 1WS2 and 1WS3, respectively, previously discussed in the description of panel 1RP. These relays are the switch control storage relays for controlling the alignment of routes for cuts of cars for which panel 2RP has been selected, as hereinafter described, as the storage panel for information concerning said cuts.

It has previously been set forth how energy from terminal B of the battery is supplied to leads 400, 401 or 402 (FIGS. 10 and 11), or a combination thereof, in accordance with the selected route for each cut of cars. Referring now to FIGS. 11, 23 and 24, relay 2WS1 has a pickup circuit which extends from lead 400 (FIG. 11) to lead 480, front contact $f$ of relay 2A (FIG. 23), lead 484, and through the winding of relay 2WS1 to terminal N of the battery. Relay 2WS1 has a stick circuit which extends from terminal B of the battery over front contact $h$ of relay 2B (FIG. 23), lead 490, front contact $a$ of relay 2WS1 and through the winding of relay 2WS1 to terminal N of the battery.

Relay 2WS2 has a pickup circuit which extends from lead 401 (FIG. 11) to lead 481, front contact $g$ of relay 2A (FIG. 23), lead 485, and through the winding of relay 2WS2 (FIG. 24) to terminal N of the battery. Relay 2WS2 has a stick circuit which extends from terminal B of the battery over front contact $h$ of relay 2B (FIG. 23), leads 490 and 491 (FIG. 24), front contact $a$ of relay 2WS2, and through the winding of the relay to terminal N of the battery.

Relay 2WS3 has a pickup circuit which extends from lead 402 (FIG. 11) to lead 482, front contact $h$ of relay 2A (FIG. 23), lead 486, and through the winding of relay 2WS3 (FIG. 24) to terminal N of the battery. Relay 2WS3 has a stick circuit which extends from terminal B of the battery over front contact $h$ of relay 2B (FIG. 23), leads 490, 491 and 492 (FIG. 24), front contact $a$ of relay 2WS3, and through the winding of relay 2WS3 to terminal N of the battery.

Figure 29:
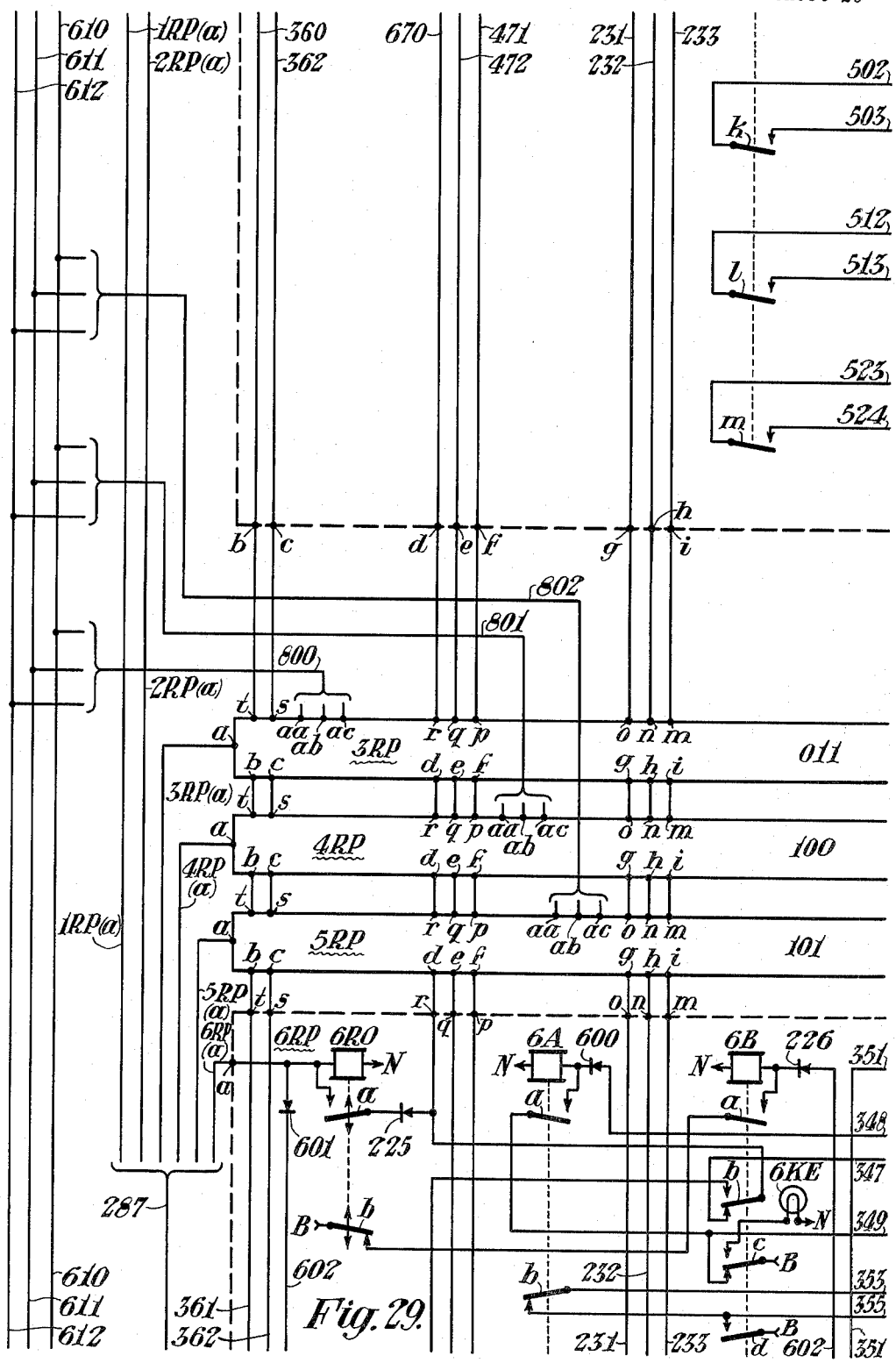
Figure 30:
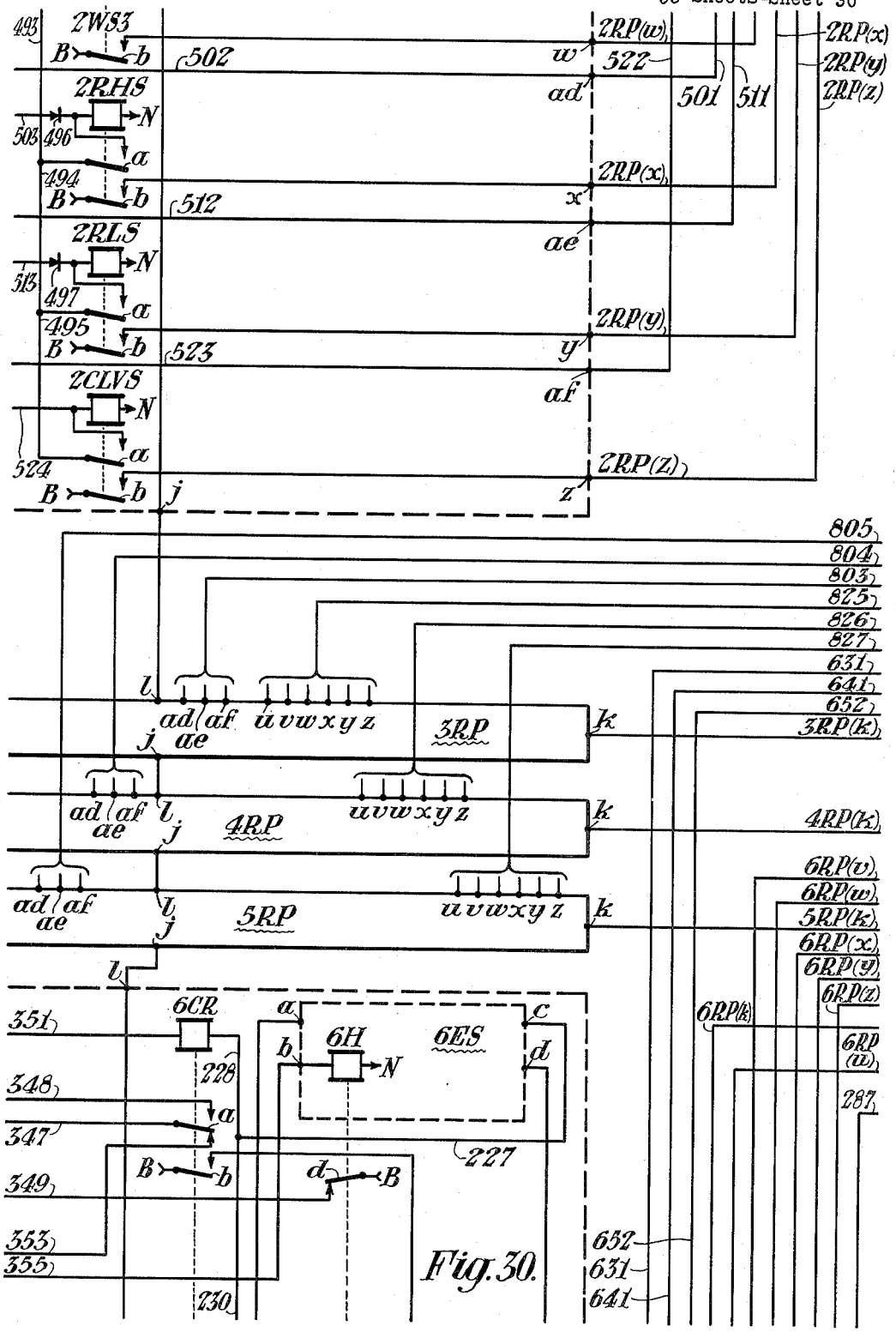
Figure 31:
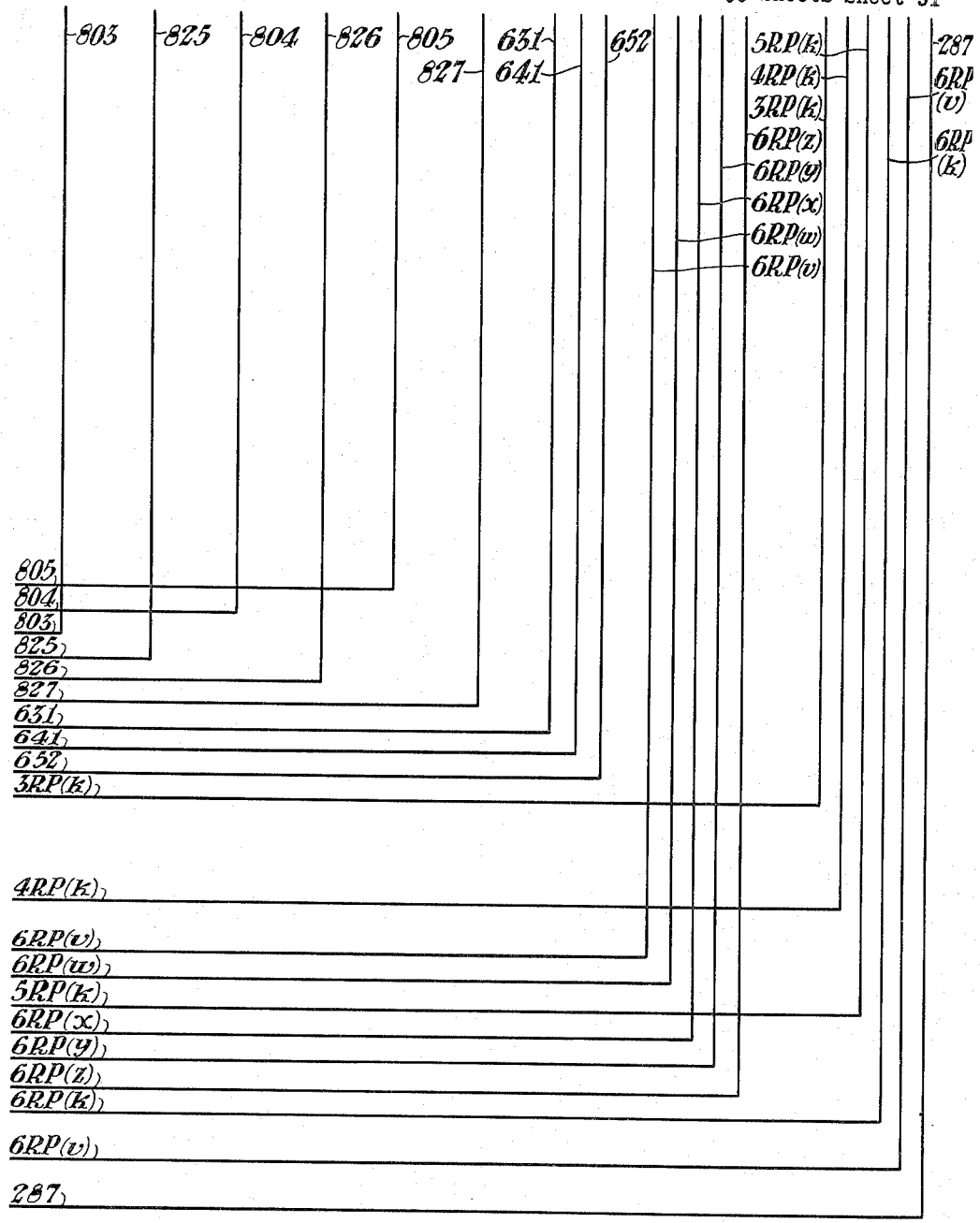
Figure 32:
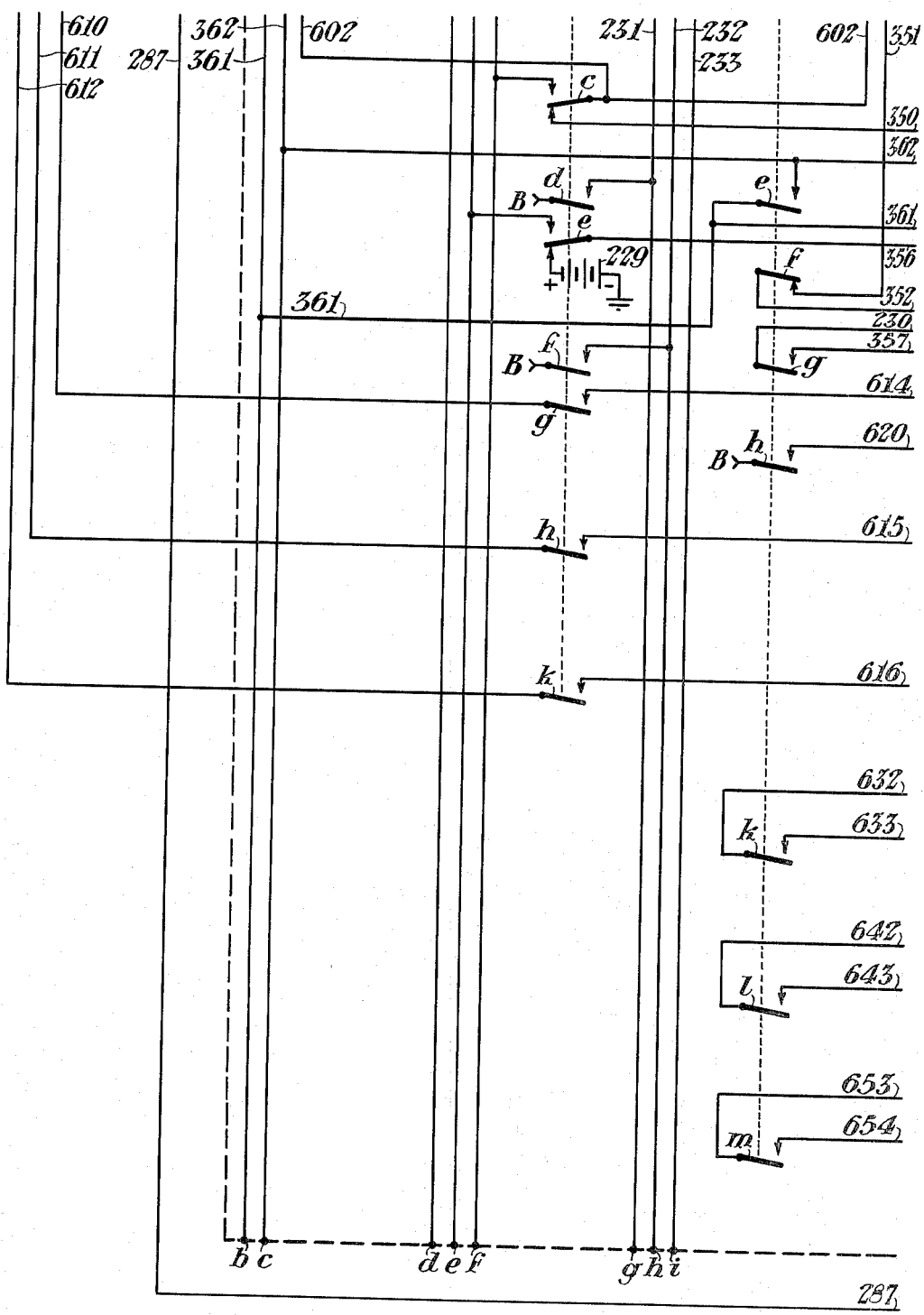

Referring now to FIGS. 29 and 30, there is shown in panel 2RP, relays 2RHS, 2RLS and 2CLVS. Relays 2RHS and 2RLS are the weight storage relays in panel 2RP and relay 2CLVS is the correct leaving velocity storage relay for that panel. The purpose of these relays will be brought out later in this description.

Relay 2RHS (FIG. 30) has a pickup circuit which extends from terminal B of the battery over the back point of contact $c$ of relay 1BTAC (FIG. 3), front point of contact $c$ of relay 2BTAC, back point of contact $d$ of relay 3BTAC, terminal 3 of B bank 55 of the tangent acceleration code storage banks, previously described, lead 500 (FIGS. 15 and 14), front contact $d$ of relay RH1 (FIG. 14), previously discussed, lead 501 (FIGS. 13, 12 and 24), terminal $ad$ of panel 2RP (FIG. 30), lead 502 (FIG. 29), front contact $k$ of relay 2B (FIG. 29), lead 503, rectifier 496 (FIG. 30), which serves to prevent sneak circuits, and through the winding of relay 2RHS to terminal N of the battery. Relay 2RHS has a stick circuit which extends from terminal B of the battery over front contact $h$ of relay 2B (FIG. 23), leads 490, 491, 492 and 493 (FIGS. 24 and 30), front contact $a$ of relay 2RHS, and the winding of relay 2RHS to terminal N of the battery.

Relay 2RLS (FIG. 30) has a pickup circuit which extends from terminal B of the battery over the back point of contact $c$ of relay 1BTAC (FIG. 3), front point of contact $c$ of relay 2BTAC, back point of contact $d$ of relay 3BTAC, terminal 3 of B bank 55 of the tangent acceleration code storage banks, previously described, lead 500 (FIGS. 15 and 14), lead 510 (FIG. 14), front contact $d$ of relay RL1 (FIG. 14), previously discussed, lead 511 (FIGS. 13, 12 and 24), terminal $ae$ of panel 2RP (FIG. 30), lead 512 (FIG. 29), front contact $l$ of relay 2B (FIG. 29), lead 513, rectifier 497 (FIG. 30), which serves to prevent sneak circuits, and through the winding of relay 2RLS to terminal N of the battery. Relay 2RLS has a stick circuit which extends from terminal B of the battery over front contact $h$ of relay 2B (FIG. 23), leads 490, 491, 492, 493 and 494 (FIGS. 24 and 30), front contact $a$ of relay 2RLS, and the winding of relay 2RLS to terminal N of the battery.

Relay 2CLVS (FIG. 30) has a pickup circuit which extends from terminal B of the battery over the back point of contact $d$ of relay 1ATAC (FIG. 4), the front point of contact $d$ of relay 2ATAC, the back point of contact $e$ of relay 3ATAC, lead 520 (FIG. 16), terminal 3 of A bank 56 of the tangent acceleration code storage banks, previously described (FIG. 16), lead 521 (FIGS. 15 and 14), back contact $g$ of relay R2TP (FIG. 14), previously described, front contact $d$ of relay CLV (FIG. 14), previously discussed, lead 522 (FIGS. 13, 12, 24 and 30), terminal $af$ of panel 2RP (FIG. 30), lead 523, front contact $m$ of relay 2B (FIG. 29), lead 524, and through the winding of relay 2CLVS (FIG. 30) to terminal N of the battery. Relay 2CLVS has a stick circuit which extends from terminal B of the battery over front contact $h$ of relay 2B (FIG. 23), leads 490, 491, 492, 493, 494 and 495 (FIGS. 23, 24 and 30), front contact $a$ of relay 2CLVS, and the winding of relay 2CLVS to terminal N of the battery.

Panels 3RP through 5RP (FIGS. 29 and 30) are similar to panel 2RP just described, their internal circuitry corresponding to the circuits connected to terminals $d$ through $r$ in panel 2RP, with the exception to be noted hereinafter concerning the tangent acceleration code which has an individual combination for each panel. The energization of the relays RHS, RLS and CLVS in panels 3RP through 5RP is accomplished over different combinations of the TAC relays in the tangent acceleration code storage banks, in different picked up or released positions than those described for panels 1RP and 2RP. This will become apparent as the description proceeds.

Panel 6RP (FIGS. 29, 30, 32 and 33) comprises an electronic storage unit 6ES (FIG. 30), including a relay 6H; and ten additional relays 6RO, 6A, 6B, 6CR, 6WS1, 6WS2, 6WS3, 6RHS, 6RLS and 6CLVS.

Relay 6A (FIG. 29) has a pickup circuit extending from terminal B of the battery over front contact c of relay ATP in FIG. 2, the front point of contact c of relay RI, lead 208, terminal r of panel 1RP, over the front point of contact b of relay 1B to terminal d of panel 1RP; from terminal d of panel 1RP to terminal r of panel 2RP, from terminal r to terminals d of each of panels 2RP through 5RP over a front contact of the B relay in each panel; for example, the front point of contact b of relay 2B in panel 2RP; from terminal d of panel 5RP to terminal r of panel 6RP (FIG. 29), over the back point of contact b of relay 6B (FIG. 29), to be described, lead 347, the front point of contact a of relay 6CR (FIG. 30), lead 348, rectifier 600 (FIG. 29), which serves to prevent sneak circuits, and through the winding of the relay to terminal N of the battery. Relay 6A has a first stick circuit extending from terminal B of the battery over back contact d of relay 6H (FIG. 30), lead 349, front contact a of relay 6A, and through the winding of the relay to terminal N of the battery. Relay 6A has a second stick circuit extending from terminal B of the battery over the back point of contact c of relay 6B (FIG. 29), front contact a of relay 6A, and through the winding of the relay to battery terminal N.

Relay 6B (FIG. 29) has four pickup circuits. The first extends from terminal B of the battery over front contact c of relay ATP in FIG. 2, the back point of contact c of relay RI, lead 310, terminal p of panel 1RP, lead 471 and thence over a continuous lead including terminal f of panel 1RP, and terminals p and f of each of panels 2RP through 5RP, terminal p of panel 6RP (FIG. 29), the front point of contact c of relay 6A (FIG. 32), lead 602, through a rectifier 226 (FIG. 29), included to prevent sneak circuits, and through the winding of relay 6B to terminal N of the battery. Relay 6B has a second pickup circuit extending from terminal B of the battery over front contact b of relay 6CR (FIG. 30), the back point of contact e of relay 6H (FIG. 33), lead 350, the back point of contact c of relay 6A (FIG. 32), lead 602, and through rectifier 226 and the winding of relay 6B (FIG. 29) to terminal N of the battery. Relay 6B has a third pickup circuit extending from terminal B of the battery over back contact a of relay TRCTD (FIG. 11) to terminal t of panel 1RP, lead 329, and thence over a continuous lead including terminals j of panel 1RP, and l and j of panels 2RP through 5RP, to terminal l of panel 6RP (FIG. 30), and thence over back contact c of relay 6CR (FIG. 33), the front point of contact e of relay 6H, lead 350, the back point of contact c of relay 6A (FIG. 32), and through rectifier 226 and the winding of relay 6B (FIG. 29) to terminal N of the battery. Relay 6B has a fourth pickup circuit extending from terminal a of panel 6RP (FIG. 29) through rectifier 601, lead 602 (FIG. 32), rectifier 226 (FIG. 29), and through the winding of relay 6B to terminal N of the battery. The circuit for connecting terminal B of the battery to terminal a of panel 6RP will be described later in the description. Relay 6B has a stick circuit extending from terminal B of the battery over back contact b of relay 6RO (FIG. 29), to be described, front contact a of relay 6B, and through the winding of the relay to terminal N of the battery.

Relay 6CR (FIG. 30) has a pickup circuit extending from output terminal c of storage unit 6ES over leads 227 and 228, through the winding of relay 6CR, lead 351 (FIG. 29), and over back contact f of relay 6B (FIG. 32) and lead 352 to ground. Relay 6CR is accordingly picked up whenever a stored voltage appears between ground terminal d and output terminal c of unit 6ES.

Relay 6H (FIG. 30) has two pickup circuits. The first is a circuit extending from terminal B of the battery over front contact c of relay ATP in FIG. 2, front contact c of relay RI, lead 208, terminal r of panel 1RP, from terminal r to terminal d of panel 1RP over the front point of contact b of relay 1B, from terminal d of panel 1RP to terminal r of panel 2RP, and thence from terminal r to terminal d of each of panels 2RP through 5RP over a path in each panel including a front point of a contact of the B relay in each panel in each path; and from terminal d of panel 5RP to terminal r of panel 6RP (FIG. 29), over the back point of contact b of relay 6B, lead 347, the back point of contact a of relay 6CR (FIG. 30), lead 353, back contact b of relay 6A (FIG. 29), and lead 355 to terminal b of unit 6ES (FIG. 30), and through the winding of relay 6H to terminal N of the battery. The second pickup circuit extends from terminal B of the battery over front contact d of relay 6B (FIG. 29), and lead 355 to terminal b of storage unit 6ES and through the winding of relay 6H to terminal N of the battery.

Figure 33:
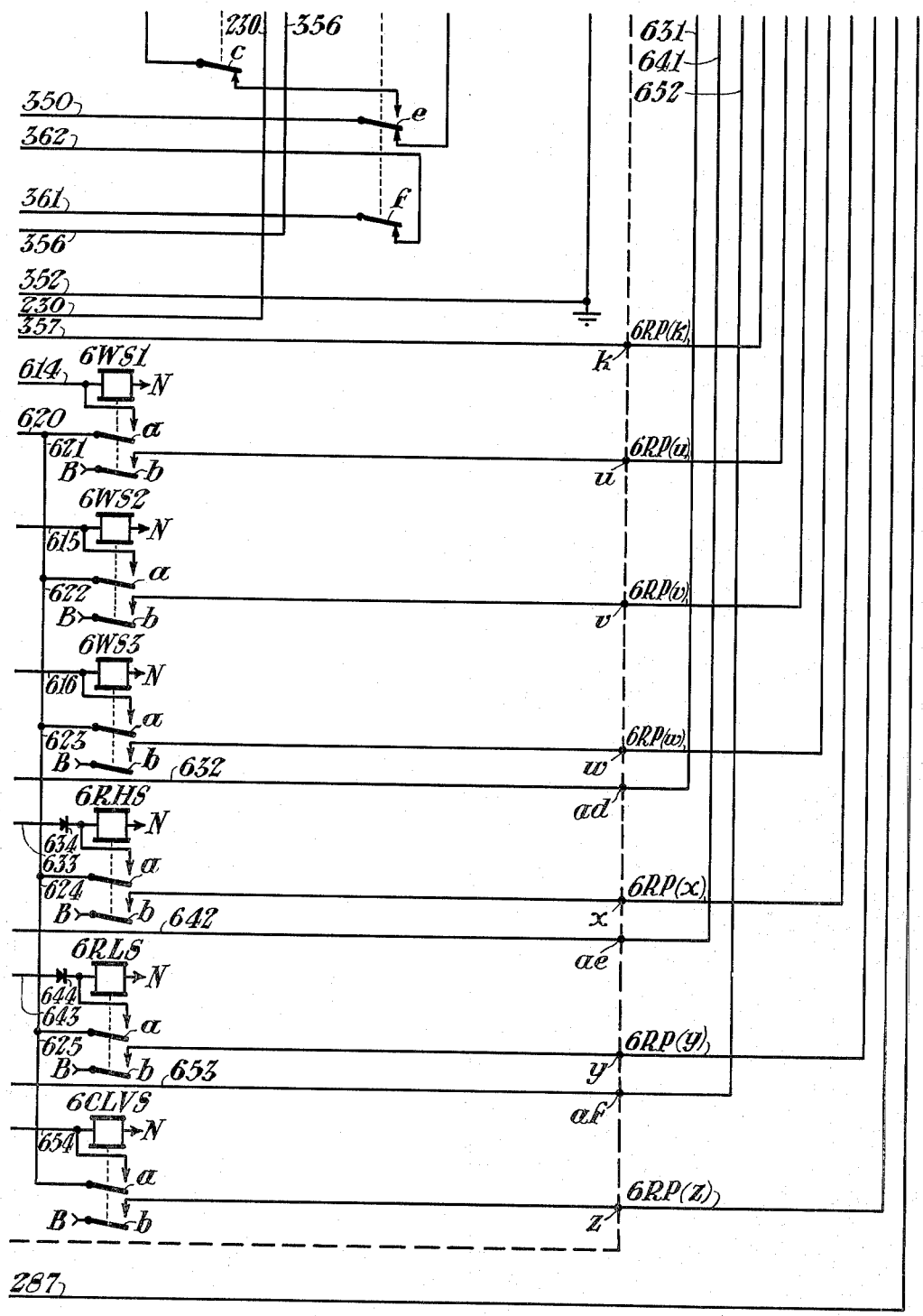

Storage unit 6ES (FIG. 30) has two input circuits. The first input circuit for storage unit 6ES extends from ground in bias unit 11 in FIG. 2 to terminal b of unit 11, lead 296, and thence over front contact a of relay ATP, lead 215, and over a continuous lead including terminals q and e of panels 1RP through 5RP to terminal q of panel 6RP (FIG. 29), and over the front point of contact e of relay 6A (FIG. 32) and lead 356 (FIG. 33) to input terminal a of unit 6ES (FIG. 30) and through the unit to ground terminal d. The second pickup circuit extends from ground through battery 229 (FIG. 32), over the back point of contact e of relay 6A, and thence over lead 356 to input terminal a of unit 6ES and through the unit to grounded terminal d. Unit 6ES has an output circuit extending between grounded terminal d and output terminal c, and from output terminal c over leads 227 and 230 (FIGS. 30 and 33) to front contact g of relay 6B (FIG. 32) and thence over lead 357 to output terminal k of panel 6RP (FIG. 33).

Relays 6WS1, 6WS2 and 6WS3 in control panel 6RP (FIG. 33) as previously mentioned correspond to relays WS1, WS2 and WS3, respectively, previously discussed in the description of panels 1RP and 2RP. These relays are the switch control storage relays for alignment of routes for cuts of cars for which panel 6RP has been selected, as hereinafter described, as the storage panel for information concerning said cuts.

Leads 400, 401 or 402 (FIGS. 10 and 11), or a combination thereof, are supplied with energy from the terminal B of the battery, as previously described, in accordance with the selected route for each cut of cars. Referring now to FIGS. 11, 23, 29, 32 and 33, relay 6WS1 has a pickup circuit which extends from lead 400, lead 480, lead 610, front contact g of relay 6A (FIG. 32), lead 614, and through the winding of relay 6WS1 (FIG. 33) to terminal N of the battery. Relay 6WS1 has a stick circuit which extends from terminal B of the battery over front contact h of relay 6B (FIG. 32), lead 620, front contact a of relay 6WS1, and through the winding of the relay to terminal N of the battery.

Again referring to FIGS. 11, 23, 29, 32 and 33, relay 6WS2 has a pickup circuit which extends from lead 401, lead 481, lead 611 (FIG. 32), front contact h of relay 6A, lead 615, and through the winding of relay 6WS2 (FIG. 33) to terminal N of the battery. Relay 6WS2 has a stick circuit which extends from terminal B of the battery over front contact h of relay 6B (FIG. 32), lead 620, lead 621, front contact a of relay 6WS2 and through the winding of the relay to terminal N of the battery.

Relay 6WS3 has a pickup circuit which extends from lead 402, lead 482, lead 612 (FIGS. 11, 23, 29, 32 and 33), front contact k of relay 6A (FIG. 32), lead 616, and through the winding of relay 6WS3 (FIG. 33) to terminal N of the battery. Relay 6WS3 has a stick circuit which extends from terminal B of the battery over front contact h of relay 6B FIG. 32), lead 620, lead 621, lead 622, front contact a of relay 6WS3, and through the winding of the relay to terminal N of the battery.

As set forth above there is also shown in FIG. 33, relays 6RHS, 6RLS and 6CLVS. Relays 6RHS and 6RLS are the weight storage relays for panel 6RP, and relay 6CLVS is the correct leaving velocity storage relay for said panel. The purpose of these relays will be pointed out later in this description.

Relay 6RHS (FIG. 33) has a pickup circuit (FIGS. 3, 13, 14, 15, 25, 30, 31, 32 and 33) which extends from terminal B of the battery over the front point of contact c of relay 1BTAC (FIG. 3), the front point of contact d of relay 2BTAC, the back point of contact f of relay 3BTAC, terminal 6 of the B bank 55 of the tangent acceleration code storage banks, previously described, lead 630, front contact a of relay RH1 (FIG. 14), lead 631, terminal ad of panel 6RP (FIG. 33), lead 632, front contact k of relay 6B (FIG. 32), lead 633, rectifier 634, which serves to prevent sneak circuits, and through the winding of relay 6RHS to terminal N of the battery. Relay 6RHS has a stick circuit which extends from terminal B of the battery over front contact h of relay 6B (FIG. 32), leads 620, 621, 622 and 623, front contact a of relay 6RHS and through the winding of the relay to terminal N of the battery.

Relay 6RLS (FIG. 33) has a pickup circuit (FIGS. 3, 13, 14, 15, 25, 30, 31, 32 and 33) which extends from terminal B of the battery over the front point of contact c of relay 1BTAC (FIG. 3), the front point of contact d of relay 2BTAC, the back point of contact f of relay 3BTAC, terminal 6 of the B bank 55 of the tangent acceleration code storage banks, previously described, lead 630, lead 640, front contact a of relay RL1 (FIG. 14), lead 641, terminal ae of panel 6RP (FIG. 33), lead 642, front contact 1 of relay 6B (FIG. 32), lead 643, rectifier 644, and through the winding of relay 6RLS to terminal N of the battery. Relay 6RLS has a stick circuit which extends from terminal B of the battery over front contact h of relay 6B (FIG. 32), leads 620, 621, 622, 623 and 624, front contact a of relay 6RLS, and through the winding of the relay to terminal N of the battery.

Relay 6CLVS (FIG. 33) has a pickup circuit (FIGS. 4, 13, 14, 15, 16, 25, 30, 31, 32 and 33) which extends from terminal B of the battery over the front point of contact d of relay 1ATAC (FIG. 4), front point of contact e of relay 2ATAC, back point of contact g of relay 3ATAC, lead 650, terminal 6 of the A bank 56 of tangent acceleration code storage banks (FIG. 16), lead 651, back contact d of relay R2TP (FIG. 14), previously described, front contact a of relay CLV, previously discussed, lead 652, terminal af of panel 6RP (FIG. 33), lead 653, front contact m of relay 6B (FIG. 32), lead 654, and through the winding of relay 6CLVS to terminal N of the battery.

Relay 6CLVS has a stick circuit which extends from terminal B of the battery over front contact h of relay 6B (FIG. 32), leads 620, 621, 622, 623, 624 and 625, front contact a of relay 6CLVS and through the winding of the relay to terminal N of the battery.

Relay TRCTD (FIG. 11) has a pickup circuit network including a multiple path through each of panels 1RP through 6RP. In panel 1RP, two parallel paths are provided to terminal b of panel 1RP (FIG. 23), the first extending from terminal B of the battery over back contact f of relay 1H (FIG. 12) and lead 358 to terminal b of panel 1RP, and the second extending from terminal B of the battery over front contact e of relay 1B (FIG. 11) and lead 358 to said terminal b. Terminal b of panel 1RP is connected to terminal t of panel 2RP (FIG.23). There are two paths from terminal t of panel 2RP to terminal b of panel 2RP. The first of these paths comprises lead 359 and front contact e of relay 2B and lead 360, and the second comprises lead 359 and back contact f of relay 2H (FIG. 24) and lead 360. Terminal b of panel 2RP (FIG. 29) is connected to terminal t of panel 3RP, and in a similar manner panel 3RP is connected to panel 4RP, panel 4RP is connected to panel 5RP, and terminal b of panel 5RP is connected to terminal t of panel 6RP. Each of the paths between terminal t and terminal b in each of the panels 3RP through 5RP has the two paths shown in connection with the similar terminals in panel 2RP. Terminal t of panel 6RP (FIG. 29) is connected to terminal s of panel 6RP (FIG. 29) over leads 361 and 362 in a similar combination of paths, that is, between leads 361 and 362 over a first path including front contact e of relay 6B (FIG. 32), and a second path including back contact f of relay 6H (FIG. 33). Terminal s of panel 6RP (FIG. 29) is connected to one side of the winding of relay TRCTD over a continuous lead including terminals c and s of each of panels 1RP through 5RP. The opposite side of the winding of relay TRCTD is connected to terminal N of the battery as shown. Relay TRCTD is accordingly picked up if, in all of the panels, either the B relay is picked up or the H relay is released.

It will be noted that a group of three leads runs through each of panels 1RP through 6RP. A first lead 231 extends over a path including terminals o and g of panels 1RP through 5RP, and terminal o of panel 6RP. A second lead 232 extends over a path including terminals n and h of panels 1RP through 5RP, and terminal n of panel 6RP. The third lead 233 extends over a path including terminals m and i of panels 1RP through 5RP, and terminal m of panel 6RP. Within each of the panels is included a contact or combination of contacts of the A relay for the panel which energizes leads 231 through 233 in an individual code combination for each panel. In the illustrated embodiment of my invention, since six panels are shown, not all of the energized and deenergized combinations of leads 231, 232 and 233 are required to identify the panels. As illustrated, the panel identifying code chosen is a binary code ranging from binary 1, or 001, to binary 6, or 110, where a 1 indicates an energized line and a 0 indicates a deenergized line in the manner well known in the art. In panel 1RP, as will hereinafter appear, selection of the panel for the storage of a voltage results in the pickup of relay 1A, which energizes lead 233 from terminal B of the battery over the front contact d of relay 1A (FIG. 11) and leaves leads 231 and 232 deenergized to generate the binary code combination 001. Similarly, in panel 2RP front contact d of relay 2A (FIG. 23) connects terminal B of the battery to lead 232 to generate the code sequence 010. Similar contacts of the A relays in panels 3RP through 5RP are used to energize leads 231, 232 and 233 in the respective code sequences 011, 100, and 101, respectively. In panel 6RP, front contacts d and f of relay 6A (FIG. 32) energize leads 231 and 232, respectively, to generate the identifying sequence 110. The code on leads 231, 232 and 233 is called the tangent acceleration code. The circuits and apparatus for receiving, transferring and interpreting this tangent acceleration code will be described hereinafter in this description.

Panels 1RP through 6RP, as previously mentioned, each contain a relay designated 1RO through 6RO respectively. These relays are "read-out" relays and are energized, when all "read-outs" from their associated storage panels are completed, to restore the panel to its normal condition and thereby make it available to store information for another cut of cars moving over the hump.

Relay 1RO (FIG. 11) has a pickup circuit which extends from terminal B of the battery and through a transfer tree, to be described, associated with each group retarder, over one of a set of parallel leads, to be described, to lead 1RP(a) (FIG. 11) and thence to terminal a of panel 1RP, and from terminal a through the winding of relay 1RO to terminal N of the battery. When picked up, relay 1RO completes a stick circuit extending from terminal B of the battery over front contact c of relay ATP in FIG. 2, previously described, the front point of contact c of relay RI, lead 208, terminal r of panel 1RP (FIG. 11), through a rectifier 209, which serves to prevent sneak circuits, and over front contact a of relay 1RO and through the winding of the relay to terminal N of the battery.

Relay 2RO (FIG. 23) has an energizing circuit similar to that described for relay 1RO which extends from terminal B of the battery through a transfer circuit, to be described, which circuit terminates in lead 2RP(a) in FIG. 23 which is connected to terminal a of panel 2RP and thence through the winding of relay 2RO to terminal N of the battery. Relay 2RO has a stick circuit which extends from terminal B of the battery over front contact c of relay ATP in FIG. 2, the front point of contact c of relay RI, lead 208, terminal r of panel 1RP, the front point of contact b of relay 1B (FIG. 11), lead 470, terminal d of panel 1RP (FIG. 23), terminal r of panel 2RP, through a rectifier 218, which serves to prevent sneak circuits, and over front contact a of relay 2RO and through the winding of the relay to terminal N of the battery.

Relay 6RO (FIG. 29) has a pickup circuit extending from terminal B of the battery through selection networks associated with the group retarders, to be hereinafter described, terminating in a lead 6RP(a) to terminal a of panel 6RP, and thence through the winding of relay 6RO to terminal N of the battery. Relay 6RO has a stick circuit extending from terminal B of the battery over front contact c of relay ATP in FIG. 2, the front point of contact c of relay RI, lead 208, terminal r of panel 1RP, from terminal r to terminal d of panel 1RP over the front point of contact b of relay 1B (FIG. 11) and lead 470 from terminal d of panel 1RP to terminal r of panel 2RP, from terminal r to terminal d of panel 2RP over the front point of contact b of relay 2B and lead 670, from terminal d of panel 2RP (FIG. 29) to terminal r of panel 3RP, from terminal r to terminal d of each of panels 3RP through 5RP over paths identical with that traced for panel 2RP, from terminal d of panel 5RP to terminal r of panel 6RP, through rectifier 225 which serves to prevent sneak paths, and over front contact a of relay 6RO and through the winding of the relay to terminal N of the battery.

The operation of the storage equipment described in storing a measurement of tangent track rolling resistance and generating a tangent acceleration code identifying the selected storage panel will now be described.

Initially, all relays concerned in the operation to be described are released, except for track relay ATR (FIG. 2) which is normally picked up over the track circuit associated with section AT; relay ATCP (FIG. 2), which is normally held up over the back point of contact b of relay ATP and also by its previously traced stick circuit including back contact b of relay RI and relay TRCTD (FIG. 11), which is held up over its previously traced circuit extending from terminal B of the battery over back contacts f of each of relay 1H through 6H and through the winding of the relay to terminal N of the battery. Electronic storage units 1ES through 6ES are energized over one of their traced input circuits. In panel 1RP, this circuit includes battery 214 (FIG. 11) and the back point of contact e of relay 1A. In panel 2RP, this circuit includes battery 222 (FIG. 23) and the back point of contact e of relay 2A. Identical circuits are provided in panels 3RP through 5RP. In panel 6RP, this circuit includes battery 229 (FIG. 32) and the back point of contact e of relay 6A. A reference voltage, having a magnitude of, for example, 100 volts, is accordingly applied between input terminal a and grounded terminal d of storage units 1ES through 6ES. However, since relays 1H through 6H are down at this time, no output voltage appears across terminals c and d of the storage units 1ES through 6ES at this time.

Now, assume that a car rolling down the hump enters track section AT and shunts track relay ATR (FIG. 2), closing its back contact a and causing relay ATP (FIG. 2) to pick up over its previously traced pickup circuit. With relay ATP picked up, and with the car rolling in section AT in the path of antenna 199 of radar velocity meter 9, the output of radar velocity meter 9, which is differentiated in differentiator 10 and biased in bias 11, as previously described, is connected from terminal b of bias unit 11 over lead 296, front contact a of relay ATP and lead 215 to terminal q of panel 1RP and thence through a continuous lead in panels 1RP through 6RP. However, the circuit is interrupted in each of the panels at the open front point of contact e of relays 1A through 6A.

With relay ATP up, relay RI is now picked up over its previously traced circuit including the front point of contact b of relay ATP, and front contact b of relay ATCP, and sticks up over its previously traced stick circuit including back contact c of relay R1TP and front contact a of relay RI. Since relay R1TP is down at this time, when relays ATP and RI are both picked up all the circuits for relay ATCP are interrupted and this relay will release after its time delay, which is adjusted to a small value just sufficient to insure the pickup of relay RI.

With relays ATP and RI picked up, a circuit extends from terminal B of the battery over front contact c of relay ATP and front contact c of relay RI to lead 208 and terminal r of rolling resistance storage unit 1RP. From terminal r, a pickup circuit is then completed for relay 1H which extends from terminal r over the back point of contact b of relay 1B, lead 326, the back point of contact a of relay 1CR, lead 333, back contact b of relay 1A, lead 334, and through the winding of relay 1H to terminal N of the battery.

Relay 1H now picks up and the voltage from battery 214 which is applied to the input circuit of storage unit 1ES, over the circuit previously traced, is stored, thus causing an output voltage to appear between terminals c and d of electronic storage unit 1ES.

With relay 1H picked up, relay TRCTD is released due to the opening of its energizing circuit at the open back point of contact f of relay 1H.

With a stored voltage applied to terminal c of unit 1ES, relay 1CR picks up over its previously traced circuit extending from terminal c of unit 1ES, through the winding of relay 1CR, and over back contact f of relay 1B to ground. As previously pointed out, battery 214 constitutes a source of power of 100 volt potential and relay 1CR requires a 100 volt pickup voltage. As will become apparent as this description proceeds, relay 1CR will fail to pick up if the storage unit 1ES is incapable of storing the 100 volt potential supplied thereto from battery 214, signifying the inoperativeness of the storage unit, and any rolling resistance measurement voltage to be stored will be transferred to the next empty and operative storage unit.

With relay 1CR picked up to indicate that the storage unit is operating properly, the previously traced circuit for relay 1A, which includes front contact c of relay ATP, the front point of contact c of relay RI, lead 208, the back point of contact b of relay 1B, front contact a of relay 1CR, and the winding of relay 1A, is completed and relay 1A picks up.

With relay 1A picked up, the two circuits traced for relay 1H are both open at the open back point of contact b of relay 1A and the open front point of contact d of relay 1B. Relay 1H is accordingly released. With relay 1H released, the stored voltage is removed from terminal c of unit 1ES and relay 1CR is released. However, relay 1A remains up over its two stick circuits previously traced, which include back contacts *d* of relay 1H and *c* of relay 1B in multiple, and front contact *a* of relay 1A. Reference is made to aforementioned Patent 2,914,750 for an understanding of how the stored voltage is removed from terminal *c* of the storage unit when relay 1H is released.

With relay 1A picked up, the second input circuit for storage unit 1ES, from bias unit 11 over lead 296, front contact *a* of relay ATP, and lead 215, is now completed from terminal *q* of panel 1RP over the front point of contact *e* of relay 1A and lead 335 to terminal *a* of storage unit 1ES. The measured value of rolling resistance for the cut in section AT is now continuously applied to the input of electronic storage unit 1ES, but no output voltage appears at terminal *c* of unit 1ES because relay 1H is released.

With relay 1H down, relay TRCTD is again picked up over its previously traced energizing circuit including at this time terminal B of the battery, back contact *f* of relay 1H, lead 358, terminal *b* of panel 1RP, from terminal *b* of panel 1RP to terminal *t* of panel 2RP, from terminal *t* of panel 2RP to terminal *b* of panel 2RP over back contact *f* of relay 2H, and in a similar manner from terminal *t* to terminal *b* of each of panels 3RP through 5RP; from terminal *b* of panel 5RP to terminal *t* of panel 6RP, and thence over lead 361, back contact *f* of relay 6H, and lead 362 to terminal *s* of panel 6RP; from terminal *s* of panel 6RP to terminal *c* of panel 5RP; from terminal *c* to terminal *s* of each of panels 5RP through 2RP, to terminal *c* of panel 1RP; and thence to terminal *s* of panel 1RP and through the winding of relay TRCTD to terminal N of the battery.

As the cut approaches the end of section AT, it is assumed that the rolling resistance measurement has become stabilized and can now be made final and stored. Accordingly, as the cut enters section MR1T (FIG. 2), dropping relay R1TR and causing repeater relay R1TP (FIG. 2) to pick up, the holding circuit for relay RI is opened at the open back point of contact *c* of relay R1TP and relay RI is released.

With relay ATP still up, since at this time the cut is shunting both track sections AT and MR1T, a circuit is completed from terminal B of the battery over front contact *c* of relay ATP, the back point of contact *c* of relay RI, and lead 210 to terminal *p* of panel 1RP, and thence over the front point of contact *c* of relay 1A and through rectifier 211 and the winding of relay 1B to terminal N of the battery. Relay 1B is accordingly picked up and completes the previously described second holding path over its front contact *e* to hold up relay TRCTD.

With relay 1B picked up, the second pickup circuit for relay 1H is completed from terminal B of the battery over front contact *d* of relay 1B and lead 334 to terminal *b* of unit 1ES and through the winding of relay 1H to terminal N of the battery.

Relay 1H will now pick up, interrupting the input circuit for storage unit 1ES and transferring the final value of rolling resistance measurement to the storage circuit of unit 1ES causing an output voltage to appear at terminal *c* of unit 1ES which is proportional to the acceleration of the cut moving in the path of antenna 199 of velocity meter 9.

With relays 1B and 1H up, the previously traced stick circuit for relay 1A is interrupted at the open back point of contact *c* of relay 1B and the open back contact *d* of relay 1H, and relay 1A accordingly releases.

Although there is a voltage at terminal *c* of unit 1ES, relay 1CR does not pick up at the time because its previously traced circuit is interrupted at the open back point of contact *f* of relay 1B.

Relay TRCTD remains up at this time, since its circuit paths through panels 2RP through 6RP have not been affected by the operations up to this point, and its circuit through panel 1RP is maintained over front contact *e* of relay 1B. Relay 1B remains held up over its stick circuit including the back point of contact *b* of relay 1RO and its own front contact *a*. It may now be assumed that the cut clears section AT and then clears section MR1T, restoring the apparatus to its initial condition except that relays 1B and 1H are picked up and storage unit 1ES contains a measured value of rolling resistance.

During the interval that relay 1A was picked up, during the preceding cycle of operations, leads 231, 232 and 233 were energized in the code combination 001, identifying panel 1RP, by the connection of terminal B of the battery to lead 233 over front contact *d* of relay 1A. The utilization of this code will be described later.

The storage sequence just described is adapted to be repeated for any number of measurements up to 6, and the storage will be made in the first vacant unit in the series from 1RP to 6RP. As will appear from the above description of panel 1RP, in any available unit each of the RO, A, B and H relays is released. In any unit in which a voltage has been stored, the B and H relays are energized and the RO and 1A relays are released.

To give an example of the manner in which the circuits of my invention seek the first available storage unit, assume that panels 1RP, and 3RP through 6RP are occupied with storages, and hence have their B and H relays picked up, and that panel 2RP is unoccupied and hence has all of its relays released. Now assume that a train enters section AT, causing a rolling resistance measurement to appear at terminal *b* of bias unit 11 and causing relay ATR to drop and relay ATP to pick up.

When relay ATP picks up, relay RI is picked up over the circuits previously described and lead 208 is energized from terminal B of the battery over front contact *c* of relay ATP and the front point of contact *c* of relay RI (FIG. 2). Since relay 1B in panel 1RP (FIG. 11) is picked up, lead 208 is connected to terminal *r* of panel 2RP over a circuit extending from terminal *r* of panel 1RP over the front point of contact *b* of relay 1B, lead 470, to terminal *d* of panel 1RP and hence to terminal *r* of panel 2RP. A circuit is now completed from terminal *r* of panel 2RP over the back point of contact *b* of relay 2B, lead 337, the back point of contact *a* of relay 2CR, lead 343, back contact *b* of relay 2A, lead 344, and through the winding of relay 2H to terminal N of the battery.

When relay 2H picks up it transfers the value of voltage from battery 222 to the storage circuit within unit 2ES, and if the unit is operating properly, relay 2CR will pick up. With relay 2CR picked up, relay 2A can pick up over a circuit including the front point of contact *a* of relay 2CR, and back contact *b* of relay 2B to energized terminal *r*. When relay 2A picks up, the code designation 010 is applied to leads 231, 232 and 233 by energizing lead 232 over front contact *d* of relay 2A. At the same time, due to the pickup of relay 2CR, relay 2H is released as previously described. With relay 2A up, the measured value of rolling resistance from terminal *b* of unit 11 can be applied to terminal *a* of unit 2ES over the previously traced circuit including front contact *e* of relay 2A, lead 472, lead 215, and front contact *a* of relay ATP. As soon as the cut enters section MR1T, relay RI will release and relay 2B will be picked up over its previously traced circuit including front contact *c* of relay ATP, the back point of contact *c* of relay RI, lead 210, lead 471, and the front point of contact *c* of relay 2A. With relay 2B up, relay 2H is picked up over its previously traced circuit, completing the storage cycle, and panel 2RP will then be in the same condition as panels 1RP and 3RP through 6RP.

The transfer of the tangent acceleration code generated on leads 231, 232 and 233 in the storage cycle of panels 1RP through 6RP, as described above, operates as follows. Referring to FIG. 3, it will be seen that the tangent acceleration code represented by the energized condition of leads 231, 232 and 233 is first transferred to the three previously mentioned tangent acceleration code storage banks 54, 55 and 56 (FIGS. 3 and 4). The C bank 54 of the TAC storage unit associated with the master retarder comprises three previously mentioned storage relays 1CTAC, 2CTAC and 3CTAC (FIG. 3). These relays are energized from leads 231, 232 and 233, respectively, in an obvious manner by connecting the respective leads to one terminal of the winding of the respective relays and the other terminal of the relay windings to terminal N of the battery. The stick circuits for these relays, and the pickup and stick circuits for relays 1BTAC, 2BTAC and 3BTAC (FIG. 3), and for relays 1ATAC, 2ATAC and 3ATAC (FIG. 4), located in banks 55 and 56, respectively, have been previously described.

The "read-in" of the switch control or route into the proper storage panels 1RP through 6RP will now be described. As previously discussed, the route or switch control storages for each cut of cars to move over the hump is first stored in the initial storage banks, shown in FIG. 10, in the order that the cuts of cars are to move over the hump. Therefore, the route storages in the initial storage banks will be available for "read-out" of the initial storage banks and for "read-in" to the storage panels in the same order. Assuming that a cut of cars destined for storage track 4 proceeds over the hump and enters track section AT. The A relay in the first available storage panel 1RP through 6RP is picked up in the manner previously described. For purposes of this explanation I will assume that panel 1RP is occupied by storage for a previous cut of cars and panel 2RP is unoccupied. Relay 2A in panel 2RP will, therefore, be picked up when the cut of cars enters track section AT.

Referring to FIGS. 2 through 8 it may be seen that the route from the hump to storage track 4 requires that the first switch 1–8W in the route be in the normal position, the second switch 1–4W in the route be in the reverse position, and the third and last switch 3–4W in the route be in the reverse position. Referring again to FIG. 10 it is apparent that the depressing of push button 4PB of the track selection push buttons stored in the initial storage banks a storage for energization of leads 401 and 402. When relay 2A is energized, by the aforesaid cut of cars destined for track 4 entering track section AT as set forth above, circuits are completed for the pickup of relays 2WS2 and 2WS3 (FIGS. 11, 23 and 24). The circuit for the pickup of relay 2WS2, as previously described, includes leads 401, 481, front contact g of relay 2A and lead 485. The circuit for the pickup of relay 2WS3, as previously described, includes leads 402, 482, front contact h of relay 2A and lead 486. When relay 2B in panel 2RP picks up, as previously described, the previously traced stick circuits for relays 2WS2 and 2WS3, including front contact h of relay 2B, leads 490 and 491, and front contacts a of each respective relay, are completed and these relays will be maintained picked up until relay 2B is released as hereinafter to be described.

It is desired to point out that the energization of leads 401 and 402 could not, at this time, operate to pick up the WS2 or WS3 relays in other storage panels as the A relays in these panels are released. Relay 1A in panel 1RP is released due to the panel containing storages for a previous cut of cars and its pickup circuit being open, therefore, at the back point of contact b of relay 1B. Relays 3A through 6A in panels 3RP through 6RP, respectively, are released due to either one of two reasons. First any of these panels may contain storages for previous cuts of cars, similarly to panel 1RP. Secondly, relay 2B must be picked up to complete the energizing circuit, over the front point of its contact b, to the following panels. It is to be noted that no energy is supplied over the front point of contact c of relay 2A to pick up relay 2B, until energy is removed from lead 470 connected to contact b of relay 2B. This cycling operation is accomplished by contact c of relay RI (FIG. 2). The prevention of storages in any following panel, when there is an empty preceding panel, is accomplished by a similar operation of the circuits.

The "read-in" of the weight storage or storages into the proper storage panel will now be described. In order to simplify this part of the description it will be assumed that panel 1RP is available for storages, and a cut of cars has entered track section AT and relay 1A in panel 1RP has been picked up. It has previously been pointed out how the pickup of relay 1A (FIG. 11) and the consequential closing of its front contact d, affected, in a code combination, leads 231, 232 and 233; that is, leads 231 and 232 are deenergized at this time and lead 233 is energized to produce the code combination 001. Referring to FIG. 3, it will be seen that this code combination picks up relay 3CTAC over a circuit previously described, and relays 1CTAC and 2CTAC remain released. The pickup of relay 3CTAC closes the previously described pickup circuit for relay 3BTAC including the back point of contact f of relay R1TP (FIG. 2), lead 366, terminal e of C bank 54, and front contact b of relay 3CTAC. The pickup of relay 3BTAC closes the previously described pickup circuit for relay 3ATAC including back contact b of relay GEC (FIG. 2), lead 424, front contact b of relay 3BTAC, and lead 425 to relay 3ATAC (FIG. 4). The pickup of relay 3BTAC completes the previously described pickup circuit for relays 1RHS, 1RLS or both. For purposes of this part of the description, it will be assumed that the weight of the aforesaid cut of cars which entered track section AT is light and, therefore, relay RL1 (FIG. 14) has picked up, and relay RH1 (FIG. 14) is released. Reference is again made to previously cited Letters Patent of the United States 2,819,682 for a complete understanding of the operation of relays RH1 and RL1. The weight of the cut of cars being light, as stated, only the circuit for picking up relay 1RLS will be closed. This circuit includes the back point of contact c of relay 1BTAC, the back point of contact c of relay 2BTAC, front contact c of relay 3BTAC, terminal 1 of B bank 55, lead 430, lead 440, front contact f of relay RL1 (FIG. 14), lead 441, terminal ac of storage bank 1RP (FIG. 12), lead 442, front contact l of relay 1B, lead 443, and rectifier 444. Relay 1RLS picks up and completes its stick circuit over its own front contact a and front contact h of relay 1B. Relay 1RLS will thus be picked up and maintained picked up until relay 1B is released.

I will now describe the "read-in" of the correct leaving velocity information into panel 1RP for a cut of cars traversing track sections AT and MR1T. As previously pointed out, relay CLV (FIG. 13) is controlled in the manner shown and described in copending application, Serial No. 676,730 and indicates a "yes-no" function, that is, the relay picks up when the cut occupies track section 1–8T, if the velocity of the cut of cars leaving the master retarder agrees with the selected leaving speed for the cut, indicating "yes"; and remains released if the two speeds do not agree, indicating "no." The correct leaving velocity storage relays CLVS in panels 1RP through 6RP are controlled over contacts of the ATAC relays in the A bank 56 of the tangent acceleration code storage banks previously described. These ATAC relays are maintained picked up by their previously described stick circuits including front contact b of relay R2TP (FIG. 2) and their own respective front contacts a, or their previously described stick circuits including front contact g of relay CLV and their own respective front contacts a. It is therefore, apparent that once picked up any of the ATAC relays will remain so as long as track section MR2T is occupied, or, if relay CLV picks up to indicate a correct leaving velocity, the picked-up ATAC relays will remain in that position so long as relay CLV remains picked up keeping its front contact g closed. Back contacts of relay R2TP (as shown in FIG. 14) are employed in series with the front contacts of the CLV relay in the pickup circuit for the CLVS relays in panels 1RP through 6RP in order to prevent the picking up of a CLVS relay and completing its stick circuit before section MR2T is vacated by a cut of cars. This insures that the correct velocity for a cut of cars is not made final and stored in one of the storage panels until the associated cut of cars vacates track section MR2T. The control circuits for relay CLV, as set forth in said copending application Serial No. 676,730, being opened when relay R2TP releases, relay CLV is made a slow release relay, as shown in the conventional manner by the arrow through the contacts of the relay pointed in the downward direction. This insures the completion of one of the circuits over back contacts of relay R2TP to one of the CLVS relays before relay CLV opens its front contacts.

The pickup circuit for relay 1CLVS in panel 1RP (FIG. 24), as previously described, includes the back point of contact d of relay 1ATAC, the back point of contact d of relay 2ATAC, front contact d of relay 3ATAC, which is picked up as previously described; lead 450, terminal 1 of A bank 56 of the tangent acceleration code storage banks (FIG. 16), lead 451, back contact i of relay R2TP, front contact f of relay CLV, lead 452, terminal af of panel 1RP (FIG. 24), lead 453, front contact m of relay 1B, and lead 454. It is thus seen that if the cut of cars for which storages are stored in panel 1RP attains the proper leaving velocity, while traversing track section MR2T, when it leaves track section MR2T relay 1CLVS is picked up. Once picked up the relay is maintained in that position by its previously described stick circuit including front contact h of relay 1B, and its own front contact a. However, if the proper velocity is not attained before the cut vacates MR2T, relay 1CLVS will remain released to indicate "no" as to the attainment of the proper leaving velocity. The purpose of these "yesno" indications will be discussed later in this description.

From the description above it will be readily understood that the "read-in" of the weight classifications and correct leaving velocity information into the proper storage panels for cuts of cars is controlled by a picked-up or released combination of the TAC relays in the tangent acceleration code storage banks 55 and 56. The combination of the BTAC relays (FIG. 3) for storage panel 1RP whose code is 001 is discussed above. Similarly, the "read-in" combinations for panels 2RP through 6RP whose codes are 010, 011, 100, 101 and 110, respectively, is as follows:

Panel 2RP—Relay 1BTAC released, relay 2BTAC picked up, and relay 3BTAC released.

Panel 3RP—Relay 1BTAC released, and relays 2BTAC and 3BTAC picked up.

Panel 4RP—Relay 1BTAC picked up and relays 2BTAC and 3BTAC released.

Panel 5RP—Relay 1BTAC picked up, relay 2BTAC released, and relay 3BTAC picked up.

Panel 6RP—Relays 1BTAC and 2BTAC picked up and relay 3BTAC released.

The combinations of the 1ATAC, 2ATAC and 3ATAC relays in A bank 56 is similar to the combinations of the respective relays in the B bank 55 and no detailing of the combinations is considered necessary.

For purposes of simplification of this description, the "read-in" circuits for switch control storages to terminals aa, ab and ac of panels 3RP, 4RP and 5RP are shown in FIG. 29 by the multiple conductor cables 800, 801 and 802, connected to said terminals of panels 3RP, 4RP and 5RP, resepectively. In view of the prior description of the switch control storage circuits for panels 1RP, 2RP and 6RP, no detailing of these circuits for panels 3RP through 5RP is considered necessary.

Similarly, the "read-in" circuits for the weight classification and correct leaving velocity information to terminals ad, ae and af of panels 3RP, 4RP and 5RP are shown in FIG. 30 by the multiple conductor cables 803, 804 and 805, connected to said terminals of panels 3RP, 4RP and 5RP, respectively. These cables extend through FIGS. 30, 31 and 25, in that order, to FIG. 13 where the cables branch into individual leads and thence to contacts of the respective controlling devices for the "read-in" circuits. Cable 803 branches into leads 806, 807 and 808 which connect to front contacts e of relays RH1, RL1 and CLV, respectively (FIG. 14). Cable 804 branches into leads 809, 810 and 811 which connect to front contacts c of relays RH1 and RL1, and front contact b of relay CLV, respectively. Cable 805 branches into leads 812, 813 and 814 which connect to front contacts b of relays RH1 and RL1, and front contact c of relay CLV, respectively. Leads 806 and 807 converge in FIG. 14 to lead 815 which connects to terminal 2 of B bank 55 (FIG. 3), and thence the circuit path extends through the proper combination of relay BTAC contacts for the code 011 for storage panel 3RP. Similarly, lead 808 connects to lead 816 (FIG. 14) which connects to terminal 2 of A bank 56 (FIG. 16), and thence the circuit path extends over lead 823 (FIGS. 16 and 4) and over the proper combination of relay ATAC contacts for the code 011 for storage panel 3RP. Leads 809 and 810 converge in FIG. 14 to lead 817 which connects to terminal 4 of B bank 55 (FIG. 3), and thence the circuit path extends through the proper combination of relay BTAC contacts for the code 100 for storage panel 4RP. Similarly, lead 811 connects to lead 818 (FIG. 14) which connects to terminal 5 of A bank 56 (FIG. 16), and thence the circuit path extends over lead 821 (FIGS. 16 and 4) and over the proper combination of relay ATAC contacts for the code 100 for storage panel 4RP. Leads 812 and 813 converge in FIG. 14 to lead 819 which connects to terminal 5 of B bank 55 (FIG. 3), and thence the circuit path extends through the proper combination of relay BTAC contacts for the code 101 for storage panel 5RP. Similarly, lead 814 connects to lead 820 (FIG. 14) which connects to terminal 4 of A bank 56 (FIG. 16), and thence the circuit path extends over lead 822 (FIGS. 16 and 4) and over the proper combination of relay ATAC contacts for the code 101 for storage panel 5RP.

By the preceding brief description it is thus seen that the "read-in" circuits for storing weight classifications and correct leaving velocity information in panels 3RP through 5RP operate similarly to those circuits described in detail for panels 1RP, 2RP and 6RP.

It would appear that, relays ATAC in the A bank 56 of the TAC storage banks being slow release, the second stick circuit over front contact g of relay CLV (FIG. 14) to the windings of the ATAC relays is unnecessary because the ATAC relays would remain picked up for a sufficient period of time, after the opening of their first stick circuit at front contact b of relay R2TP, to complete a correct leaving velocity "read-in" circuit over the back contacts of relay R2TP (FIG. 14). The stick circuit for relays ATAC, over front contact g of relay CLV, is provided for another reason, however. The "read-in" circuits being over a combination of front and back contacts of the ATAC relays, if any of the ATAC relays are inadvertently slower to release than the other or others, there is the possibility that an improper combination of closed front and back contacts may momentarily occur during the release of the relays, and close a circuit for the pickup of a CLVS relay in the improper storage panel. For an example, I will assume that cut of cars associated with storage panel 3RP and having a correct leaving velocity, vacates track section MR2T, thereby opening the stick circuits over front contact b of relay R2TP to relays 2ATAC and 3ATAC. Assuming that relay 2ATAC is quicker in releasing than relay 3ATAC, there is the possibility that relay 2ATAC may close the back point of its contact $d$ before relay 3ATAC opens its front contact $d$, thereby producing the tangent acceleration code 001 for panel 1RP. Further assuming that panel 1RP contains storages for a preceding cut of cars having an incorrect leaving velocity storage, it is apparent that the described circuit momentarily completed would pickup relay 1CLVS in panel 1RP to give an improper "yes" function for the preceding out of cars. By providing the stick circuit to the ATAC relays over front contact $g$ of relay CLV it is readily apparent that the described improper operation cannot occur, because the circuits for pickup of the CLVS relays in the storage panels are opened at front contacts $a$ through $f$ inclusive of relay CLV (FIG. 14) at the same time the stick circuit over front contact $g$ of relay CLV to the ATAC relays is opened. The said pickup circuits for the CLVS relays are therefore opened prior to the time when the ATAC relays release.

*Switch control circuits*

The switch control circuits employed in the illustrated embodiment of my invention are substantially conventional and are shown principally to avoid confusion in understanding the timing of certain operations in the control apparatus.

Figure 5:
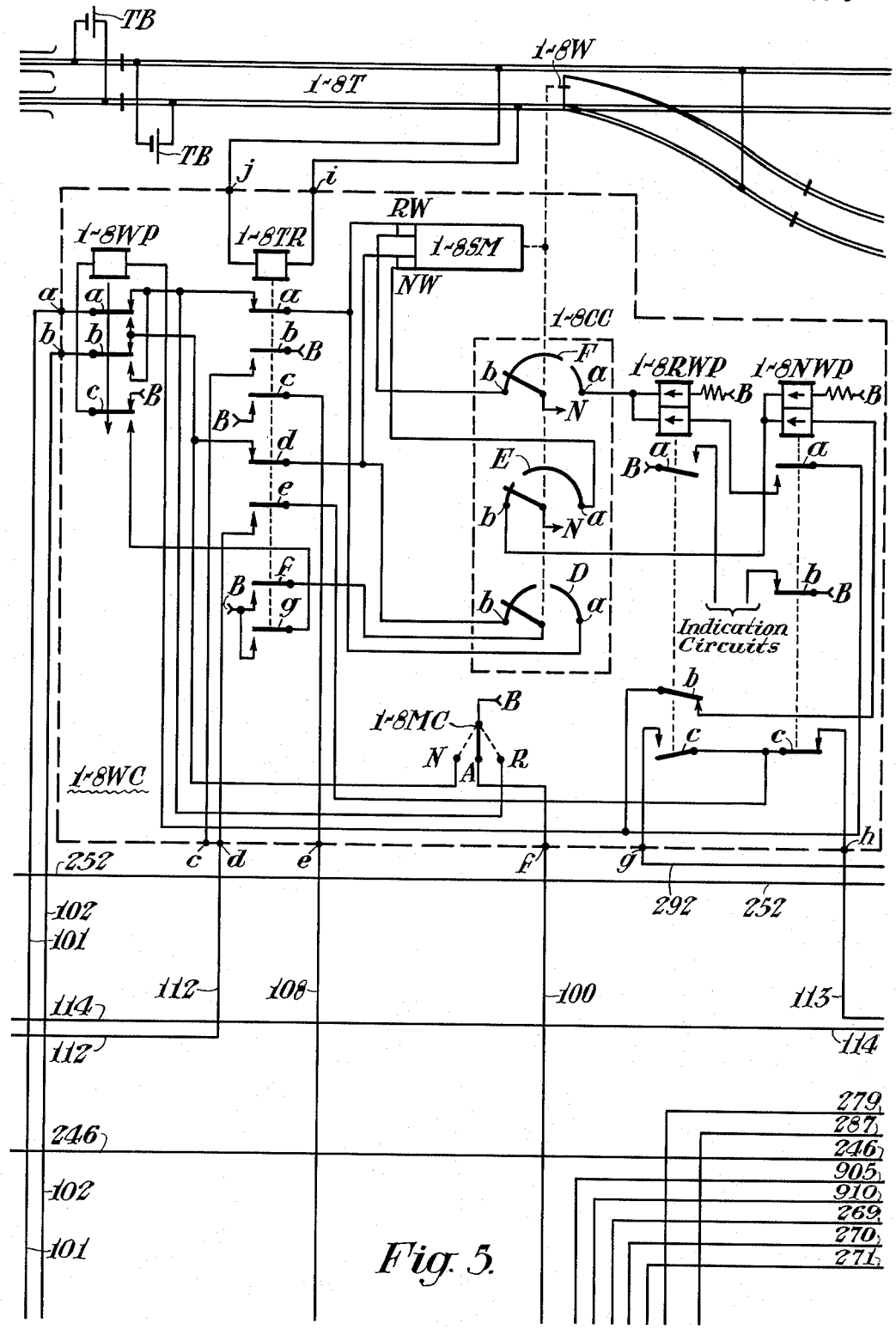

Referring first to switch control 1–8WC, as shown in FIG. 5, the unit comprises a switch mechanism 1–8SM which may be of conventional construction and which is controlled to actuate switch 1–8W to its normal or reverse positions by actuating magnets NW or RW, respectively. The details of this apparatus form no part of my present invention and accordingly are not shown.

The switch control also includes a circuit controller unit 1–8CC which includes three circuit controllers D, E and F. Each of these circuit controllers comprises a contact arm which is moved by the switch machine 1–8SM in accordance with the movement of the points of switch 1–8W, as indicated schematically by dotted lines. The arm of circuit controller F engages a contactor attached to terminal $a$ over a small arc of travel with the switch in and adjacent its reverse position, and engages a contactor connected to its terminal $b$ over an arc including the normal position of the switch substantially as shown, with an open position between the contactors over a short range of travel of the switch towards the reverse position as shown. The switch arm of circuit controller E is electrically connected to its terminal $a$ over a long range of movement including the reverse position of the switch, and to its terminal $b$ over a short range of movement including the normal position of the switch, with a relatively small arc of open travel adjacent the normal position as shown. Circuit controller D has its switch arm electrically connected to its terminal $b$ over a range of movement including the normal position of the switch, and to its terminal $a$ over a range of movement including the reverse position of the switch, with a short interval of open travel in the central position of the switch as shown.

The switch control unit further includes normal and reverse repeater relays 1–8NWP and 1–8RWP, respectively, which may be conventional double coil directional relays of a type well known in the art. These relays each have two windings, either winding serving to pick up the contacts of the relay upon current flow therethrough in the direction of the arrow.

Relay 1–8NWP has a pickup circuit extending from terminal B of the battery through a suitable voltage dropping resistor, the upper winding of the relay, over terminal $b$ of circuit controller E and its associated switch arm in the normal position of switch 1–8W to terminal N of the battery. A second circuit for relay 1–8NWP, which serves to hold up the relay and in addition forms a stick circuit for relay 1–8WP, to be described, extends from terminal B of the battery over the front point of contact $c$ of relay 1–8WP, through the winding of relay 1–8WP, over back contact $b$ of relay 1–8RWP, through the lower winding of relay 1–8NWP and over terminal $b$ of circuit controller E and its associated switch arm in the normal position of the switch to terminal N of the battery.

Relay 1–8RWP has a pickup circuit which extends from terminal B of the battery through a suitable voltage dropping resistor as shown, through the upper winding of relay 1–8RWP, and over terminal $a$ of circuit controller F and its associated switch arm in the reverse position of the switch to terminal N of the battery. Relay 1–8RWP has a second circuit which serves to hold up the relay and also serves as a second stick circuit for relay 1–8WP which extends from terminal B of the battery over the front point of contact $c$ of relay 1–8WP, through the winding of relay 1–8WP, over back contact $a$ of relay 1–8NWP, through the lower winding of relay 1–8RWP, and over terminal $a$ of circuit controller F and its associated switch arm in the reverse position of the switch to terminal N of the battery.

Contacts $a$ of relay 1–8RWP and $b$ of relay 1–8NWP may be used to actuate suitable indication circuits, as indicated schematically. The indication circuits may be conventional, and as they do not form a part of my present invention, they will not be shown in detail.

Relay 1–8WP is a repeater relay which is energized in either extreme position of switch 1–8W. It has a pickup circuit extending from terminal B of the battery over back contact $g$ of track relay 1–8TR in the occupied condition of track section 1–8T, the back point of contact $c$ of relay 1–8WP, through the winding of relay 1–8WP, and over alternative paths, depending on the position of switch 1–8W, the first including back contact $b$ of relay 1–8RWP, the lower winding of relay 1–8NWP, and over terminal $b$ of circuit controller E and its associated switch arm in the normal position of the switch to terminal N of the battery, and the second extending over back contact $a$ of relay 1–8NWP, through the lower winding of relay 1–8RWP, and over terminal $a$ of circuit controller F and its associated switch arm in the reverse position of the switch to terminal N of the battery. Relay 1–8WP has a pair of stick circuits which correspond to the second circuits described for relays 1–8NWP and 1–8RWP, and which extend from terminal B of the battery over the front point of contact $c$ of relay 1–8WP, through its winding, and through the two alternative paths previously traced for the pickup circuit.

The switch control unit 1–8WC further includes a manual controller 1–8MC which has three terminals N, A and R and a lever arm connected to battery terminal B as shown. With the lever in position R, the switch is controlled to the reverse position by a circuit extending from terminal B of the battery over terminal R of controller 1–8MC, front contact $a$ of track relay 1–8TR, to the upper side of the winding of reverse control magnet RW, and through the winding to terminal $b$ of circuit controller F, and its associated switch arm over a range extending from the normal position of the switch into a position on the reverse side of the mid-position to terminal N of the battery. When the switch has moved to the position in which circuit controller F is open, a spring within switch mechanism 1–8SM completes the movement of the switch, in a manner well known in the art, and reverse repeater relay 1–8RWP is picked up over its circuit previously traced. With lever 1–8MC in its normal or N position, a circuit extends from terminal B of the battery over terminal N of the lever and front contact $d$ of track relay 1–8TR, through normal magnet NW, and over terminal $a$ of circuit controller E and its associated arm in the reverse position of the switch to terminal N of the battery. When the switch moves sufficiently so that the circuit controller E is open, the switch movement is completed by spring action and normal repeater relay 1–8NWP is picked up by its previously traced circuit.

It an attempt is made to move the switch and during the switch movement track section 1–8T becomes occupied, releasing relay 1–8TR, circuit controller D operates to return the switch to its nearest extreme position. For example, if the switch is on the normal side of the mid-position, a circuit extends from terminal B of the battery over back contact $f$ of relay 1–8TR, over the arm of circuit controller D to terminal $b$ of circuit controller D, through normal magnet NW and through terminal $a$ of circuit controller E and its associated arm to terminal N of the battery. If the switch is in its normal position or within the range of adjustment at which circuit controller E is open, the switch will automatically be returned to its normal position by a spring action. Similarly, if the switch is on the reverse side of its mid-position but not within the range in which it will be automatically spring-restored to the reverse position, a circuit will extend from terminal V of the battery over back contact $f$ of relay 1–8TR, the arm of circuit controller D and terminal $a$ of circuit controller D, through the reverse magnet RW, and over terminal $b$ and the associated arm of circuit controller F to terminal N of the battery until the switch is moved sufficiently toward the reverse position to open circuit controller F, at which time the spring action of switch machine 1–8SM will complete the movement of the switch toward its reverse position. It will be noted that at all times during which the detector section 1–8T is occupied, the other circuits to magnets RW and NW are opened at contacts $a$ and $d$, respectively, of track relay 1–8TR.

With manual lever 1–8MC in its automatic or A position, a circuit extends from terminal B of the battery, over terminal A of manual controller 1–8MC, terminal $f$ of 1–8WC, lead 100, front contact $m$ of relay R2TP (FIG. 14), lead 99, and over the front or back point of contact $b$ of relay 1–8A1 (FIG. 17), to be described, over lead 101 or 102 (to FIG. 5) to terminals $a$ or $b$ of 1–8WC and contact $a$ or contact $b$ of relay 1–8WP, respectively, in accordance with the energized or released condition of relay 1–8A1. Relay 1–8WP is sufficiently slow releasing to bridge the normal operation of the switch and is accordingly normally energized unless, due to a failure, the switch is stored in some intermediate position. Accordingly, if relay 1–8A1 is picked up and the previously traced circuit is completed to contact $a$ of relay 1–8WP, the circuit is continued over the front point of contact $a$ of relay 1–8WP and front contact $a$ of relay 1–8TR, through reverse magnet RW and through circuit controller F to terminal N of the battery until circuit controller F becomes open and the switch movement to the reverse position is completed by the spring action of switch machine 1–8SM. On the other hand, if relay 1–8A1 is down to direct a normal setting of switch 1–8W, the previously traced circuit is completed over front contact $b$ of relay 1–8WP, frmnt contact $d$ of relay 1–8TR, through the winding of normal magnet NW and through circuit controller E to terminal N of the battery until the switch has been moved sufficiently close to its normal position so that circuit controller E is open and the switch movement is completed by spring action of switch machine 1–8SM.

In the event of a failure which would cause relay 1–8WP to be deenergized, a reverse action will take place. That is, the circuit previously traced over front contact $a$ of relay 1–8WP to call for a reverse movement of the switch will now be completed over the back point of contact $a$, front contact $d$ of relay 1–8TR, and through normal magnet NW and circuit controller E to cause movement of the switch to its normal position. Similarly, if relay 1–8A1 is deenergized with relay 1–8WP down, the switch operating circuit will be completed over the back point of contact $b$ of relay 1–8WP and front contact $a$ of relay 1–8TR through the reverse magnet RW and circuit controller F to direct a reverse movement of the switch. The purpose of this circuitry is to provide for the case in which the switch is physically blocked from completing its movement in one direction, and to attempt to position it in the other direction so that it will be in one or the other of its extreme positions when occupied and will not derail a car.

The circuits which include terminals $d$, $e$, $g$ and $h$ of switch control 1–8WC will be described later in connection with other units.

Switch control 1–4WC in FIG. 7 is substantially similar to switch control 1–8WC in most respects. The circuits for relays 1–4RWP, 1–4NWP, 1–4WP, the operating circuits for magnets RW and NW, the operation of switch machine 1–4SM, and the operation of circuit controller 1–4CC are identical with those described for switch control 1–8WC and this description will not be repeated. The operation of switch control 1–4WC in the N and R positions of lever 1–4MC is the same as that just described for switch control 1–8WC.

The switch control circuit in the automatic position of lever 1–4MC extends from terminal B of the battery over terminal A of lever 1–4MC, terminal $e$ of switch control 1–4WC, terminal $w$ of the A bank of the 1–4 storage unit, front contact $e$ of relay 1–4AD, to be described, back contact $d$ of relay 1–4AT, to be described, and the front or back point of contact $b$ of relay 1–4A1, which as will be described later is picked up to direct a reverse movement of switch 1–4W and is released to direct a normal movement of the switch, over lead 103 or 104, respectively, to terminal $c$ or $b$ of the A bank of the 1–4 storage unit (FIG. 18), and thence over lead 103 or 104 to terminal $a$ or terminal $b$, respectively, of switch control unit 1–4WC (FIG. 7). Under normal conditions, with relay 1–4WP picked up, the circuit may be completed from terminal $a$ of switch control unit 1–4WC, which is energized when relay 1–4A1 is picked up, over front contact $a$ of relay 1–4WP, front contact $a$ of relay 1–4TR, through reverse magnet RW, and through circuit controller F to terminal N of the battery to direct a reverse movement of the switch. If relay 1–4A1 is released, and terminal $b$ of switch control unit 1–4WC is energized over the circuit previously traced, the circuit is completed over front contact $b$ of relay 1–4WP, front contact $c$ of relay 1–4TR, through the normal magnet NW, and through circuit controller E to direct a normal setting of the switch. Under conditions where, due to failure, relay 1–4WP is deenergized, an opposite setting of the switch will be sought by circuits extending from terminal $a$ or $b$ of switch control unit 1–4WC and back contact $a$ or back contact $b$ of relay 1–4WP in the same manner as previously described for switch control 1–8WC.

The circuits including terminals $c$, $d$, $f$ and $g$ of switch control 1–4WC will be described later in connection with other units.

Switch control 5–8WC in FIG. 6 is identical in all respects to switch control 1–4WC and is shown in block form. The circuits connected to terminals $a$ through $i$ of 5–8WC correspond in detail to those shown connected to terminals $a$ through $i$ of switch control 1–4WC and are therefore not shown in detail.

Switch control 1–2WC in FIG. 9 is substantially identical with the previously described switch control units 1–8WC and 1–4WC in that relays 1–2RWP, 1–2NWP, 1–2TR, and 1–2WP have the same control circuits and cooperate with manual control lever 1–2MC and circuit controller 1–2CC to control 1–2SM in the same manner as previously described. Accordingly, these circuits will not be further described in detail.

The switch operating circuit for unit 1–2WC in the automatic position of manual control lever 1–2MC extends from terminal B of the battery over terminal A of lever 1–2MC, terminal $e$ of switch control unit 1–2WC, terminal $d$ of the A bank of the 1–2 storage unit, front contact $b$ of relay 1–2AD, to be described, back contact $b$ of relay 1–2AT, to be described, and the front or back point of contact $b$ of relay 1–2A1, to be described, according as the relay is picked up to direct a reverse movement of the switch or released to direct a normal setting of the switch to terminal b or a of the A bank of the 1–2 storage location, and thence to terminal b or c, respectively, of switch control 1–2WC. The circuits from these terminals to the magnetic RW and NW are identical with those previously described in connection with switch controls 1–8WC and 1–4WC and will not be further described.

Switch control 3–4WC in FIG. 8 is identical with switch control 1–2WC just described, and its terminals a through h are connected to similar circuits as the corresponding terminals of switch control 1–2WC.

Referring to FIGS. 2 through 5 it is seen that there are a series of adjoining track sections from track section AT to track section 1–8T inclusive. The TAC relays in the A, B and C banks of the tangent acceleration code storage banks (FIGS. 3 and 4) are controlled in accordance with the progress of cuts of cars through said track sections, as previously described, so that when the code identifying the storage panel for a cut of cars is supplied to the C bank, this information is transferred to the B bank as soon as that bank becomes vacant and the information or code in the B bank is supplied to the A bank when the A bank is vacated. With the arrangement shown, therefore, there may be separate cuts of cars occupying any adjacent pair of track sections AT, MR1T and MR2T (so long as a preselected minimum spacing between cuts is preserved).

Information from the C bank of the TAC storage unit is supplied to the B bank over back contacts of track repeater relay R1TP which is associated with track section MR1T. Relay R1TP is picked up or released according as section MR1T is occupied or unoccupied. Accordingly, information may transfer from the C bank to the B bank if the B bank is unoccupied and section MR1T is unoccupied.

Tangent acceleration code is supplied from the B bank to the A bank of the master retarder storage unit over back contacts of end of cut relay GEC, which picks up as soon as section MR1T is vacated. This relay has a pickup circuit extending from terminal B of a suitable source of voltage such as a battery, not shown, over back contact d of relay R1TP and front contact a of a track repeater relay R2TP associated with section MR2T, through the winding of relay GEC to terminal N of the battery, and a stick circuit which extends from terminal B of the battery over front contact a of relay GEC, front contact a of relay R2TP, and through the winding of relay GEC to terminal N of the battery. Track repeater relay R2TP is picked up when section MR2T is occupied, and released when this section is unoccupied. Accordingly, relay GEC picks up when section MR2T is occupied and section MR1T is unoccupied and is held up as long as section MR2T is occupied. It is, therefore, apparent that the TAC relays in the tangent acceleration code storage banks retain the code identification for each cut of cars as it progresses towards switch 1–8W and, therefore, it is not necessary to transfer the switch storage information for a cut of cars to storage units at switch 1–8W location, but such information may be retained in the proper storage panel 1RP through 6RP until the cut occupies track section MR2T. However, for other following switch locations there may be only a detector track circuit for each switch with no track circuits provided in the track sections between the switch locations. It is, therefore, necessary to transfer the TAC code to each next switch location when a cut of cars occupies the detector track circuit for the next preceding switch location. Since it is possible for a first cut of cars to be occupying a switch detector track section, a following cut of cars to be in the track section preceding in which no track circuit is provided, and another following cut of cars to be in the switch detector track section next preceding, it is necessary to provide storage units at switch locations following 1–8W switch location. These storage units will now be described.

Figure 13:
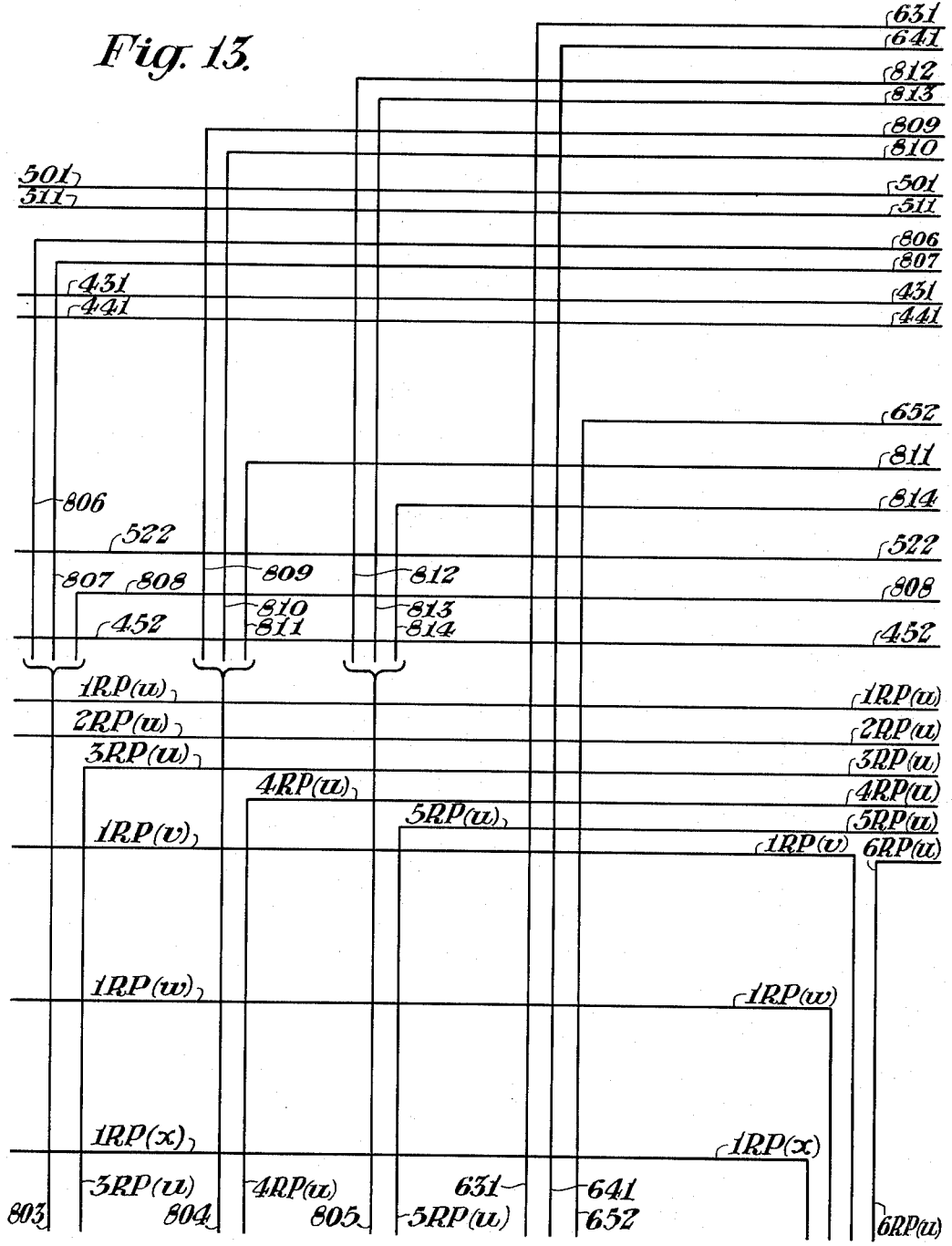
Figure 27:
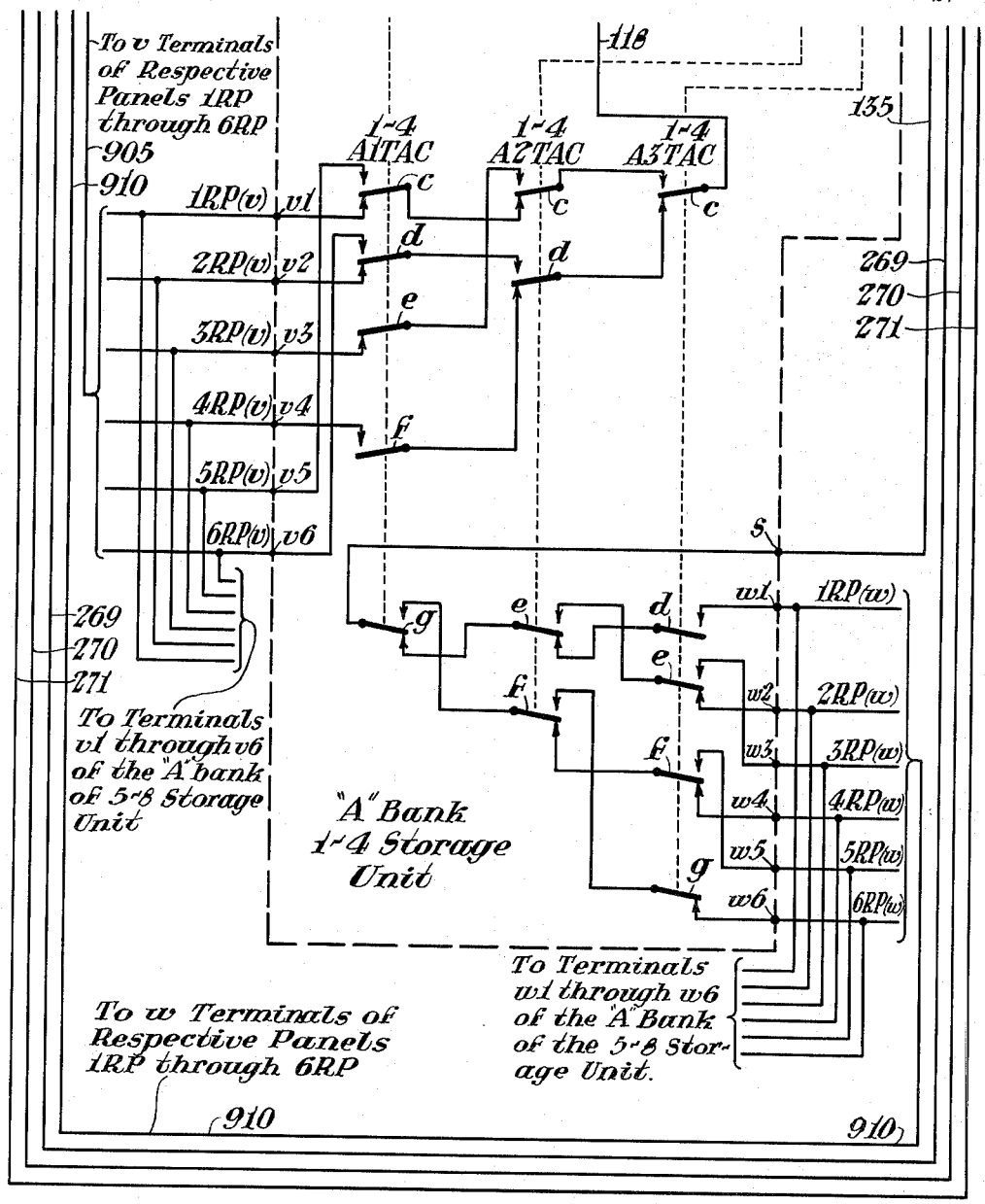

The 1–4 storage unit is shown in FIG. 7, 13 and 27. For purposes of illustration, it is shown as having two banks A and B.

Figure 18:
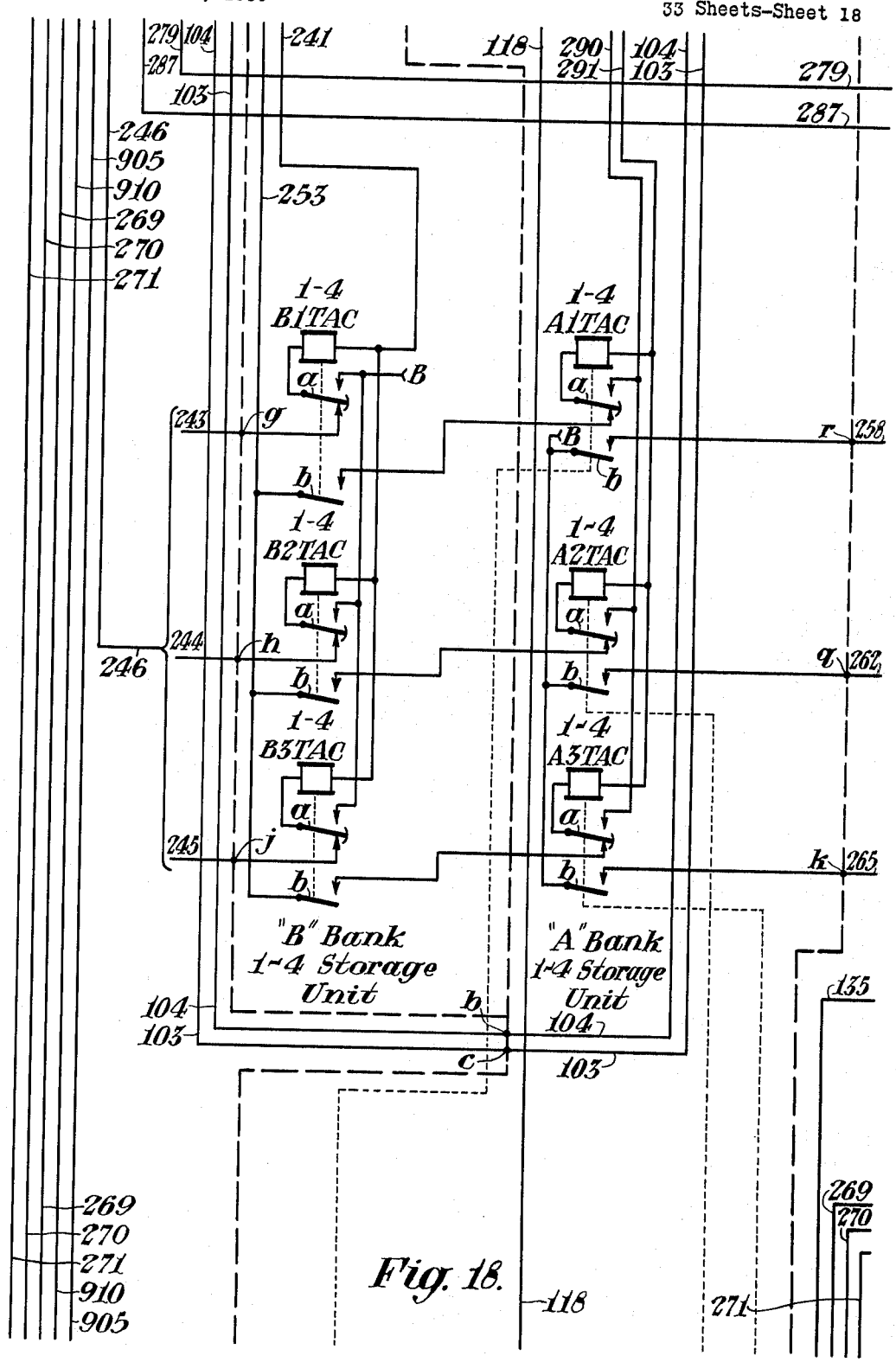
Figure 19:
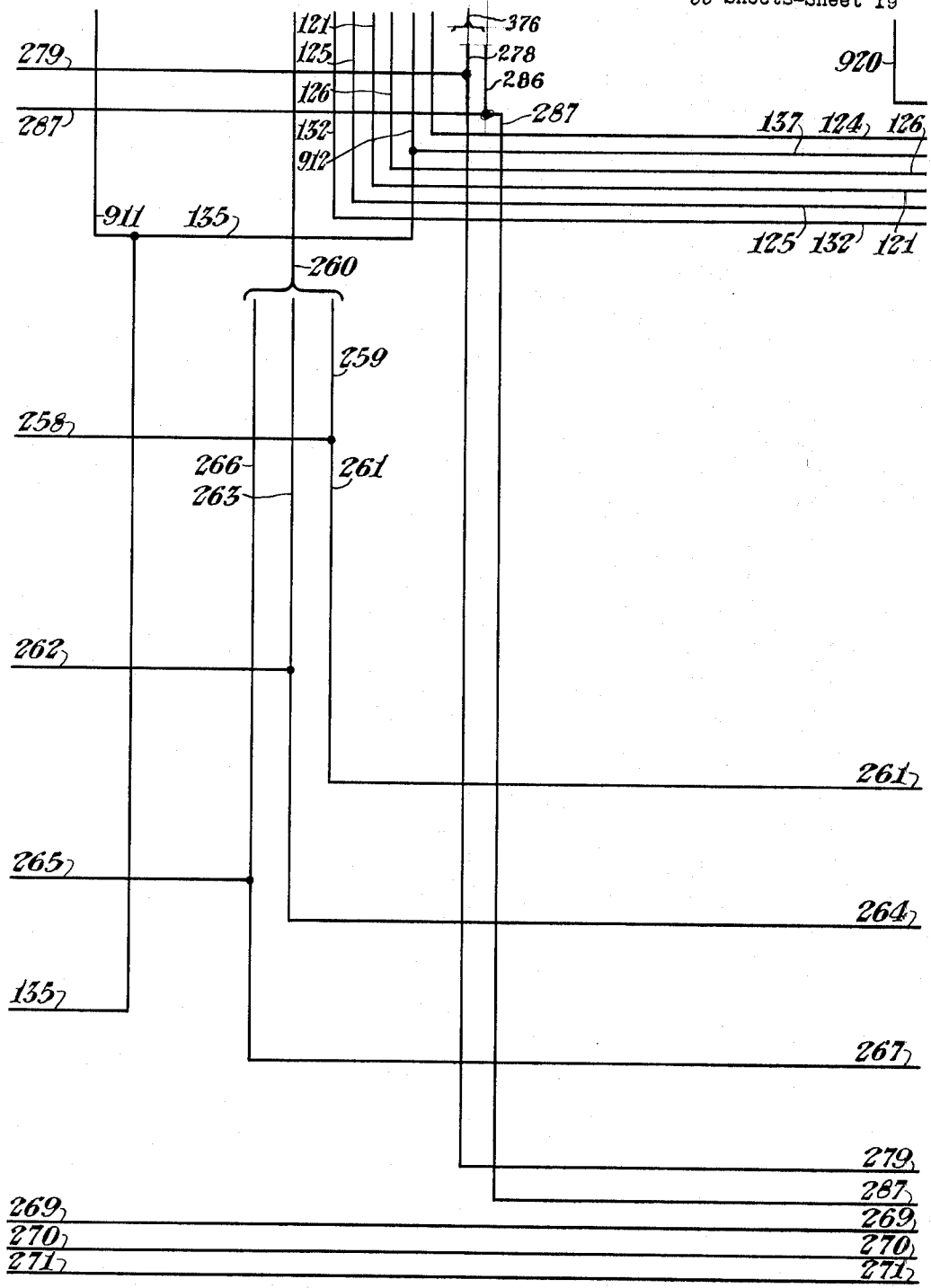

As shown in FIGS. 7 and 18, the B bank of the 1–4 storage unit comprises two control relays 1–4BT and 1–4BD, and three tangent acceleration code storage relays 1–4B1TAC, 1–4B2TAC and 1–4B3TAC.

Relay 1–4BT has a pickup circuit extending from terminal B of the battery over back contact e of relay GEC (FIG. 2), lead 112 (FIGS. 2, 3, 4), terminal d of switch control unit 1–8WC (FIG. 5), back contact e of relay 1–8TR, front contact c of relay 1–8NWP in the normal position of the switch, terminal h of switch control unit 1–8WC, lead 113 (FIG. 6), terminal b of the B bank of the 1–4 storage unit (FIG. 7), back contact c of relay 1–4BD, and through the winding of relay 1–4BT to terimnal N of the battery. Relay 1–4BT has a stick circuit extending from terminal B of the battery over front contact c of relay R2TP (FIG. 2), lead 114 (FIGS. 3, 5, and 6), lead 115, to terminal a of the B bank of the 1–4 storage unit (FIG. 7), over front contact a of relay 1–4BT, and through the winding of the relay to terminal N of the battery.

Relay 1–4BD (FIG. 7) has a pickup circuit extending from terminal B of the battery over front contact c of relay 1–4BT, through the winding of relay 1–4BD, and in multiple over back contact c of relay 1–4AT and back contact d of relay 1–4AD to terminal N of the battery. Relay 1–4BD has a stick circuit which extends from terminal B of the battery over its own front contact a, through the winding of the relay, and in multiple over back contact c of relay 1–4AT and back contact d of relay 1–4AD to terminal N of the battery. Relay 1–4BD is made relatively slow to release as indicated schematically in the drawing. The B1TAC, B2TAC, and B3TAC relays in the B bank of the 1–4 storage unit will be described below.

The A bank of the 1–4 storage unit (FIGS. 7 and 18) comprises three control relays 1–4AT, 1–4AD and 1–4AL, a route storage relay 1–4A1, and three tangent acceleration code storage relays 1–4A1TAC, 1–4A2TAC and 1–4A3TAC.

Relay 1–4AT (FIG. 7) has a pickup circuit extending from terminal B of the battery in the B bank of the 1–4 storage unit over front contact b of relay 1–4BD, back contact b of relay 1–4BT, back contact b of relay 1–4AD, and through the winding of relay 1–4AT to terminal N of the battery. Relay 1–4AT has a stick circuit extending from terminal B of the battery over front contact b of relay 1–4BD in the B bank of the 1–4 storage unit, back contact b of relay 1–4BT, its own front contact a, and through its winding to terminal N of the battery.

Slow release relay 1–4AD (FIG. 7) has a first pickup circuit extending from terminal B of the battery over normally closed contact a of cancellation button 1–4ACPB, front contact b of relay 1–4AT, through the winding of relay 1–4AD, to terminal u of the A bank of the 1–4 storage unit, over lead 121 (FIGS. 8, 19, and 20), lead 122 (FIG. 20), terminal c of the B bank of the 1–2 phantom storage unit associated with group retarder 1–2GR (FIG. 20), to terminal d of the 1–2GR storage unit over either back contact d of the relay 1–2GRBT or back contact d of relay 1–2GRBD, to be described, from terminal d over lead 124 (FIG. 19) to terminal c of the 3–4 phantom storage location (FIG. 8) associated with group retarder 3–4GR, and over either back contact b of relay 3–4GRBT or back contact b of relay 3–4GRBD, to be described, to terminal N of the battery. Relay 1–4AD (FIG. 7) has a second pickup circuit extending from terminal B of the battery over normally closed contact a of cancellation button 1–4ACPB, front contact b of relay 1–4AT, through the winding of relay 1–4AD to terminal $u$ of the A bank of the 1–4 storage unit, over lead 121, lead 123 (FIG. 20) and cable 289 (FIG. 20) to FIG. 9, where lead 123 is produced and connected to terminal $e$ of the B bank of the 1–2 storage location associated with switch 1–2W, over back contact $e$ of relay 1–2BT or back contact $e$ of relay 1–2BD, to be described, to terminal $d$ of the bank of the 1–2 storage location, from terminal $d$ over lead 125 and cable 289 to FIG. 20, where lead 125 is produced, and through FIG. 19 to terminal $c$ of the B bank of the 3–4 storage unit associated with switch 3–4W (FIG. 8), and over back contact $b$ of relay 3–4BT or back contact $b$ of relay 3–4BD to terminal N of the battery. Relay 1–4AD (FIG. 7) has two stick circuits over its own front contact $a$ which shunts contact $b$ of relay 1–4AT in the two pickup circuits previously traced. The remainder of the stick circuits is the same as for the two pickup circuits previously traced.

Transfer control relay 1–4AL (FIG. 7) has a pickup circuit extending from terminal B of the battery in switch control unit 1–4WC, over back contact $b$ of relay 1–4TR, terminal $d$ of switch control unit 1–4WC, terminal $x$ of the B bank of the 1–4 storage unit, over back contact $c$ of relay 1–4AD, and through the winding of relay 1–4AL to terminal N of the battery. Relay 1–4AL has a stick circuit which is the same as its previously traced pickup circuit except that its own front contact $a$ shunts contact $c$ of relay 1–4AD. Relay 1–4AL is made somewhat slow releasing as indicated to insure the proper sequence of operation of the circuits controlled thereby.

Relay 1–4A1 (FIG. 7) has a pickup circuit extending from the movable portion of contact $c$ of relay 1–4A3TAC in FIG. 27 over lead 118 (FIG. 18) and through the winding of relay 1–4A1, and over front contact $f$ of relay 1–4AD to terminal N of the battery. The circuits for supplying energy from terminal B of the battery over a combination of contacts of relays 1–4A1TAC and 1–4A2TAC, shown in FIG. 27, to the front or back point of contact $c$ of relay 1–4A3TAC will be described later in this description. Relay 1–4A1 has a stick circuit extending from terminal B of the battery over its front contact $a$, through the winding of the relay, and over front contact $f$ of relay 1–4AD to terminal N of the battery.

The A1TAC, A2TAC, and A3TAC relays in the A bank of the 1–4 storage unit will be described hereinafter.

The 5–8 storage location associated with switch 5–8W (FIG. 6) is identical with the 1–4 location just described and accordingly only those elements of its circuits which are required to understand the interconnection of the units have been shown, the remainder being indicated schematically in block form.

The 1–2 storage location associated with switch 1–2W is illustrated (FIG. 9) as having two banks B and A. Bank B comprises a transfer control relay 1–2BT, a slow release storage detector relay 1–2BD, and a route storage relay 1–2B1.

Relay 1–2BT has a pickup circuit extending from terminal B of the battery in bank A of the 1–4 storage unit (FIG. 7), over front contact $g$ of relay 1–4AD, back contact $e$ of relay 1–4AT, back contact $b$ of relay 1–4AL, terminal $v$ of the A bank of the 1–4 storage unit, terminal $c$ of unit 1–4WC, back contact $d$ of relay 1–4TR, front contact $c$ of relay 1–4NWP in the normal position of the switch, terminal $g$ of unit 1–4WC, lead 126 (FIGS. 8 and 19), lead 128 (FIG. 20), over cable 289 to FIG. 9, lead 128, terminal $b$ of the A bank of the 1–2 storage unit, back contact $b$ of relay 1–2BD, and through the winding of relay 1–2BT to terminal N of the battery. Relay 1–2BT has a stick circuit extending from terminal B of the battery in storage bank A of the 1–4 storage unit (FIG. 7), front contact $g$ of relay 1–4AD, terminal $t$ of the A bank of the 1–4 storage unit, lead 129, lead 131, lead 132 (FIGS. 8 and 19), lead 294 (FIG. 20), cable 289 to FIG. 9, lead 294, terminal $a$ of the 1–2 storage unit, and over front contact $a$ of relay 1–2BT and through the winding of the relay to terminal N of the battery.

Slow release relay 1–2BD (FIG. 9) has a pickup circuit extending from terminal B of the battery over front contact $b$ of relay 1–2BT, through the winding of relay 1–2BD, and over back contact $c$ of relay 1–2AT and back contact $d$ of relay 1–2AD in multiple to terminal N of the battery. Relay 1–2BD has a stick circuit extending from terminal B of the battery over its own front contact $a$ and through the winding of the relay over back contact $c$ of relay 1–2AT and back contact $d$ of relay 1–2AD in multiple to terminal N of the battery.

Relay 1–2B1 (FIG. 9) has a pickup circuit extending from the movable portion of contact $g$ of relay 1–4A1TAC in the A bank of the 1–4 storage unit (FIG. 27), to terminal $s$ of the A bank of the 1–4 storage unit, lead 135 (FIGS. 18 and 19), lead 137 (FIGS. 19 and 20), lead 140 (FIG. 20), cable 289 to FIG. 9, lead 140, terminal $c$ of the B bank of the 1–2 storage unit, over front contact $c$ of relay 1–2BT, through the winding of relay 1–2B1, and over front contact $c$ of relay 1–2BD to terminal N of the battery. The circuits for supplying energy from terminal B of the battery over a combination of contacts of relays 1–4A2TAC and 1–4A3TAC shown in FIG. 27 to the front or back point of contact $g$ of relay 1–4A1TAC will be described later in this description. Relay 1–2B1 has a stick circuit extending from terminal B of the battery over its own front contact $a$, and through the winding of the relay and over front contact $c$ of relay 1–2BD to terminal N of the battery.

The A bank of the 1–2 storage unit (FIG. 9) comprises a transfer control relay 1–2AT, a slow release storage detector relay 1–2AD, a slow release locking relay 1–2AL, a route storage relay 1–2A1, and a cancellation push button 1–2CB.

Relay 1–2AT (FIG. 9) has a pickup circuit extending from terminal B of the battery in the B bank of the 1–2 storage unit over front contact $d$ of slow release relay 1–2BD, back contact $d$ of relay 1–2BT, back contact $f$ of relay 1–2AD in the A bank of the 1–2 storage unit, and through the winding of relay 1–2AT to terminal N of the battery. Relay 1–2AT has a stick circuit which extends from terminal B of the battery over front contact $d$ of relay 1–2BD, back contact $d$ of relay 1–2BT, front contact $e$ of relay 1–2AT, and through the winding of the relay to terminal N of the battery.

Storage detection relay 1–2AD is a conventional relay, made slightly slow releasing in any conventional manner known in the art. It has a pickup circuit extending from terminal B of the battery over the normally closed contact $a$ of cancellation button 1–2CB, front contact $a$ of relay 1–2AT, through the winding of the relay to terminal $c$ of the A bank of the 1–2 storage unit, terminal $f$ of which control unit 1–2WC, and over front contact $e$ of relay 1–2TR to terminal N of the battery. Relay 1–2AD has a second pickup circuit extending from terminal B of the battery over the normally closed contact of cancellation button 1–2CB, front contact $a$ of relay 1–2AT, through the winding of the relay, and over front contact $b$ of relay 1–2AL to terminal N of the battery. Relay 1–2AD has a pair of stick circuits which are the same as its previously traced pickup circuits except that its own front contact $a$ shunts front contact $a$ of relay 1–2AT.

Locking relay 1–2AL (FIG. 9) is made somewhat slow to release as indicated. It has a pickup circuit extending from terminal B of the battery in switch control unit 1–2WC (FIG. 9), back contact $c$ of relay 1–2TR, terminal $d$ of unit 1–2WC, terminal $e$ of the A bank of the 1–2 storage unit, back contact $c$ of relay 1–2AD, and through the winding of relay 1–2AL to terminal N of the battery. Relay 1–2AL has a stick circuit which is the same as its previously traced pickup circuit except that its own front contact $a$ shunts back contact $c$ of relay 1–2AD in the previously traced circuit.

Relay 1–2A1 (FIG. 9) has a pickup circuit extending from terminal B of the battery in the B bank of the 1–2 storage unit, front contact *b* of relay 1–2B1, front contact *d* of relay 1–2AT, through the winding of relay 1–2A1, and over front contact *e* of relay 1–2AD to terminal N of the battery. Relay 1–2A1 has a stick circuit which extends from terminal B of the battery over its own front contact *a*, through the winding of the relay, and over front contact *e* of relay 1–2AD to terminal N of the battery.

Switch storage units 3–4, 5–6, and 7–8, shown in FIGS. 8 and 6 are identical with the 1–2 storage unit just described, and accordingly no details of these units are shown, except for certain of the interconnecting circuits in the 3–4 storage unit in FIG. 8 which are included to facilitate an understanding of the operation of the apparatus of my invention.

The control circuits for a phantom location associated with a group retarder will now be described. Since all of the phantom locations may be identical, it will suffice to describe the 1–2 phantom location associated with group retarder 1–2GR. The use of the term "phantom" to describe these storage locations was derived from the fact that, previously, classification yard storage units have been associated with switch locations. Since these units are not associated with any switch, it has become customary to refer to them as phantom switch storage locations, or simply phantom locations.

Figure 20:
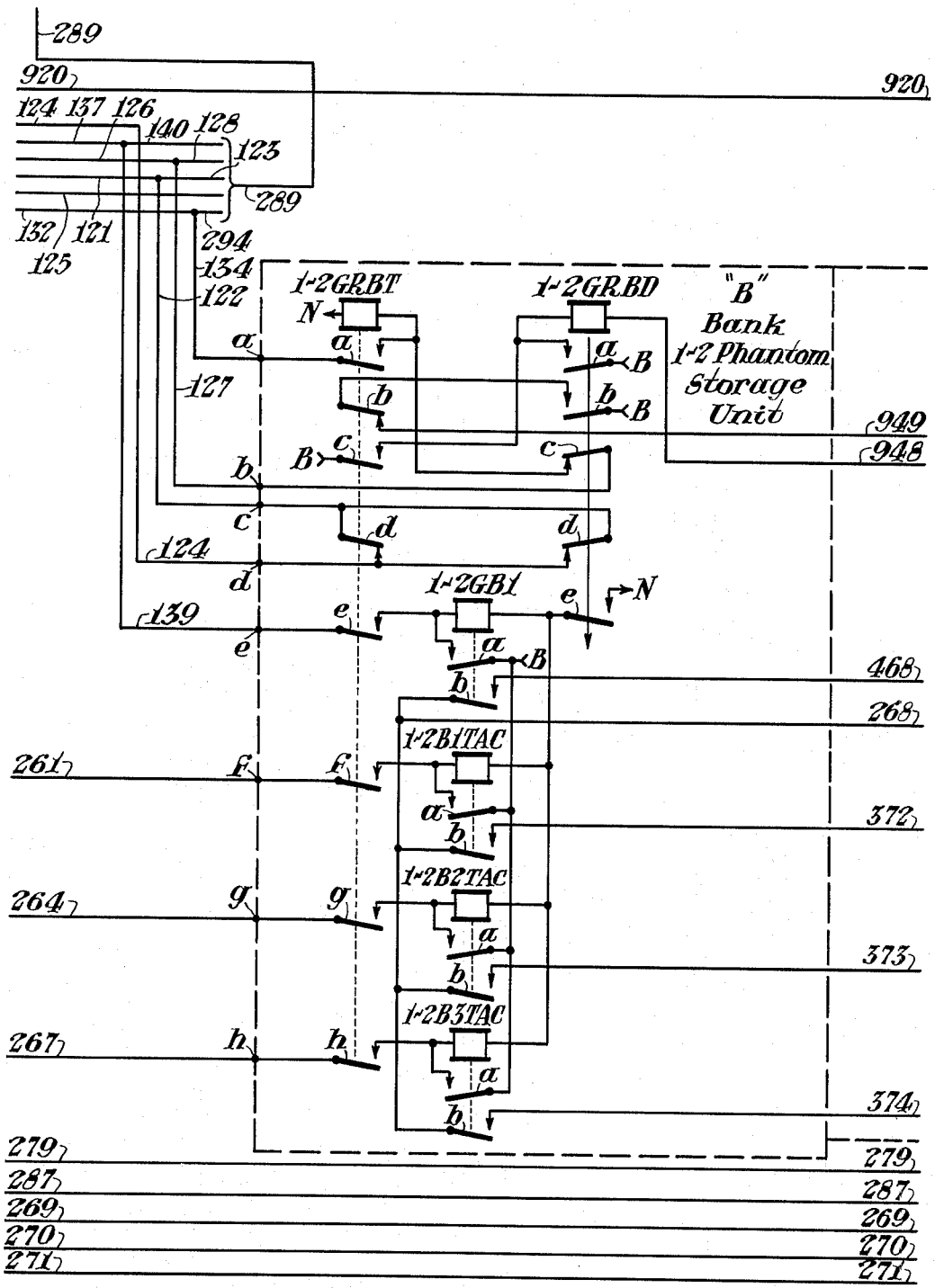
Figure 21:
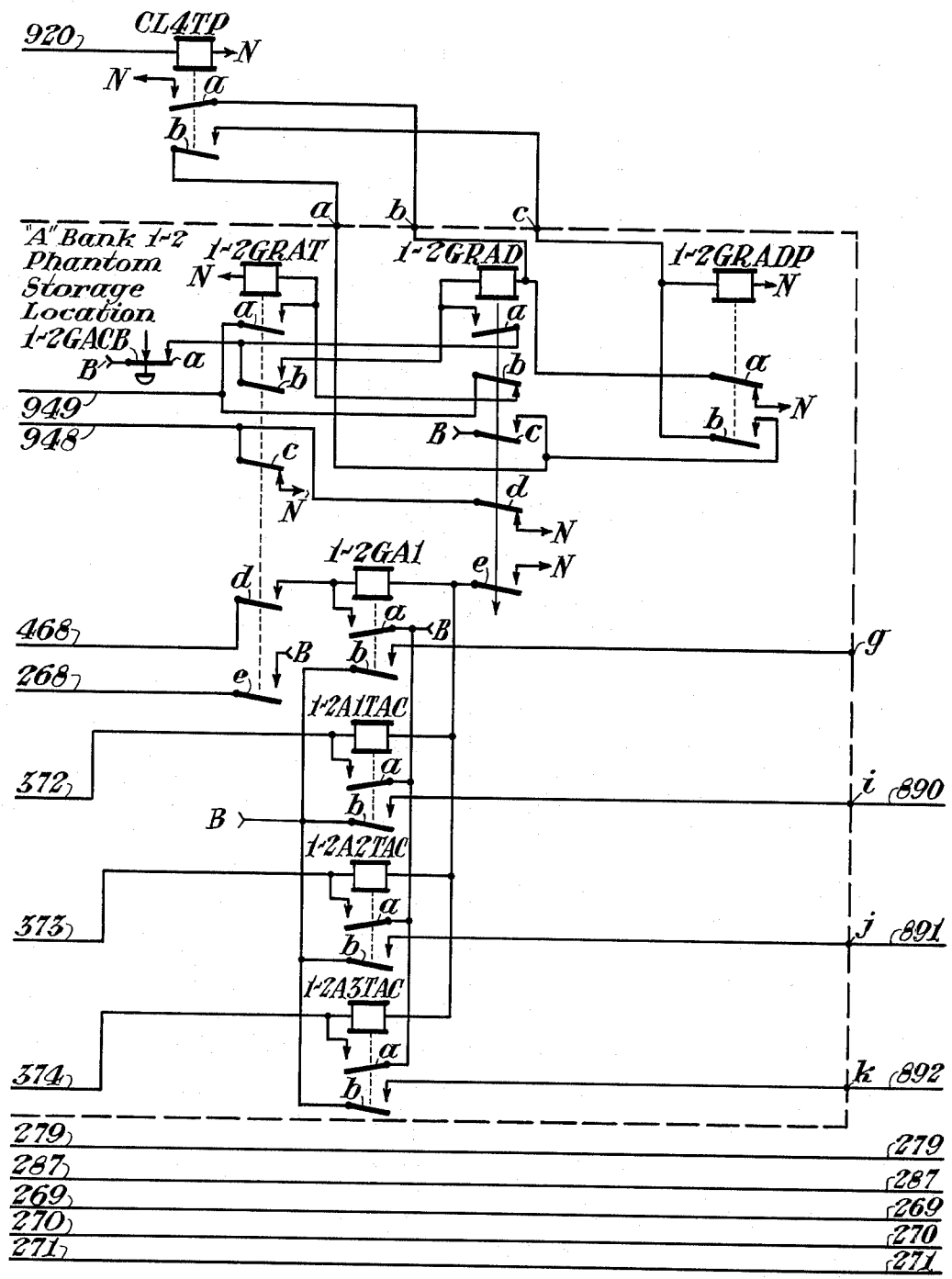

Referring to FIGS. 20 and 21, the 1–2 phantom storage location is seen to comprise two banks, A and B. These banks include control relays operating somewhat similarly to the switch storage location control relays, to receive and store information pertaining to a cut, to transfer it from one bank to the next when the next bank becomes available, and to cancel the information when it is no longer required.

Referring now to FIG. 20, the B bank of the 1–2 phantom location includes two control relays 1–2GRBT and 1–2GRBD. Also included in the B bank is a route storage relay 1–2GB1, and three tangent acceleration code storage relays 1–2B1TAC, 1–2B2TAC, and 1–2B3TAC.

Relay 1–2GRBT (FIG. 20) has a pickup circuit which extends from terminal B of the battery over front contact *g* of relay 1–4AD (FIG. 7), back contact *e* of relay 1–4AT, back contact *b* of relay 1–4AL, terminal *v* of the A bank of the 1–4 storage unit, terminal *c* of switch control unit 1–4WC, back contact *d* of track relay 1–4TR, front contact *c* of normal repeater relay 1–4NWP in the normal position of the switch, terminal *g* of unit 1–4WC, lead 126 (FIGS. 8, 19 and 20), lead 127 (FIG. 20), terminal *b* of the B bank of the 1–2 phantom location, back contact *c* of relay 1–2GRBD, and through the winding of relay 1–2GRBT to terminal N of the battery. Relay 1–2GRBT has a stick circuit which extends from terminal B of the battery over front contact *g* of relay 1–4AD (FIG. 7), terminal *t* of the A bank of the 1–4 storage unit, lead 129, (FIG. 8), lead 131 (FIG. 8), lead 132 (FIGS. 8, 19 and 20), lead 134 (FIG. 20), terminal *a* of the B bank of the 1–2 phantom location, and over front contact *a* of relay 1–2GRBT and through its winding to terminal N of the battery.

Relay 1–2GRBD (FIG. 20) has a pickup circuit which extends from terminal B of the battery over front contact *c* of relay 1–2GRBT, through the winding of the relay, lead 948 (FIGS. 20 and 21), and over back contact *c* of relay 1–2GRAT (FIG. 21) and back contact *d* of relay 1–2GRAD, to be described, in multiple to terminal N of the battery. Relay 1–2GRBD has a stick circuit which extends from terminal B of the battery over its own front contact *a*, through the winding of the relay, lead 948, and over back contact *c* of relay 1–2GRAT and back contact *d* of relay 1–2GRAD in multiple to terminal N of the battery.

Storage relay 1–2GB1 (FIG. 20) has a pickup circuit extending from the movable portion of contact *g* of relay 1–4A1TAC of the 1–4 storage unit (FIG. 27), terminal *s* of the A bank of the 1–4 storage location, lead 135 (FIGS. 18 and 19), lead 137 (FIGS. 19 and 20), lead 139 (FIG. 20), terminal *e* of the B bank of the 1–2 phantom location, front contact *e* of relay 1–2GRBT, through the winding of relay 1–2GB1, and over front contact *e* of relay 1–2GRBD to terminal N of the battery. The circuits for supplying energy from terminal B of the battery over a combination of contacts of relays 1–4A2TAC and 1–4A3TAC, shown in FIG. 27, to the front or back point of contact *g* of relay 1–4A1TAC will be described later in this description. Relay 1–2GB1 has an obvious stick circuit including its own front contact *a* and front contact *e* of relay 1–2GRBD.

The B1TAC, B2TAC and B3TAC relays in the B banks of the 1–2 phantom storage unit will be described below.

From the above description, it will be apparent that relay 1–2GRBT is picked up when the preceding switch 1–4W is in its normal position, detector track section 1–4T is occupied, information is stored in the A bank of the 1–4 storage location, and the B bank of the 1–2 phantom location is available, as indicated by the deenergized condition of relay 1–2GRBD. Once 1–2GBT is picked up, relay 1–2GRBD may be picked up if either there is no information stored in the A bank of the 1–2 phantom location, or information is stored in this bank and its storage has been completed as indicated by the energized condition of relay 1–2GRBD. Once 1–2GRBT is controlled by circuits to be hereinafter described.

The A bank of the 1–2 phantom location (see FIG. 21) includes control relays 1–2GRAT, 1–2GRAD, 1–2GRADP, route storage relay 1–2GA1, and three tangent acceleration code storage relays 1–2A1TAC, 1–2A2TAC, and 1–2A3TAC.

Relay 1–2GRAT (FIG. 21) has a pickup circuit extending from terminal B of the battery over front contact *b* of relay 1–2GRBD (FIG. 20), back contact *b* of relay 1–2GRBT, lead 949, back contact *b* of relay 1–2 GRAD (FIG. 21), and through the winding of relay 1–2GRAT to terminal N of the battery. Relay 1–2 GRAT has a stick circuit extending from terminal B of the battery over front contact *b* of relay 1–2GRBD, back contact *b* of relay 1–2GRBT, lead 949, its own front contact *a*, and through its winding to terminal N of the battery.

Relay 1–2GRAD has a pickup circuit extending from terminal B of the battery over normally closed contact *a* of cancellation button 1–2GACB (FIG. 21), front contact *b* of relay 1–2GRAT, through the winding of 1–2 GRAD, and over alternate paths, a first extending over back contact *a* of relay 1–2GRADP to terminal N of the battery, and a second extending to terminal *b* of the A bank of the 1–2 phantom location and from terminal *b* over front contact *a* of relay CL4TP to terminal N of the battery. Relay 1–2GRAD has a stick circuit which is the same as its previously traced pickup circuit except that it includes its own front contact *a* in shunt around front contact *b* of relay 1–2GRAT.

Relay 1–2GRADP (FIG. 21) has a pickup circuit extending from terminal B of the battery over front contact *c* of relay 1–2GRAD, terminal *a* of the A bank of the 1–2 phantom location, front contact *b* of relay CL4TP, terminal *c* of the A bank of the 1–2 phantom location, and through the winding of relay 1–2GRADP to terminal N of the battery. Relay 1–2GRADP has a stick circuit extending from terminal B of the battery over front contact *c* of relay 1–2GRAD, its own front contact *b*, and through its winding to terminal N of the battery.

Relay 1–2GA1 has a pickup circuit extending from terminal B of the battery over front contact *e* of relay 1–2GRAT (FIG. 21), lead 268, front contact *b* of relay 1–2GB1 (FIG. 20), lead 468, front contact *d* of relay 1–2GRAT (FIG. 21), through the winding of relay 1–2 GA1, and over front contact *e* of relay 1–2GRAD to terminal N of the battery. Relay 1–2GA1 has a stick circuit extending from terminal B of the battery over its own front contact *a*, through its winding, and over front contact *e* of relay 1–2GRAD to terminal N of the battery.

From the above description it will be apparent that relay 1–2GRAT is picked up, if the A bank is available for storage as indicated by the deenergized condition of relay 1–2GRAD, if there is information stored in the B bank, as indicated by the energized condition of relay 1–2GRBD, and if the storage of this information is complete, as indicated by the deenergized condition of relay 1–2GRBT. Relay 1–2GRAD is picked up if relay 1–2GRAT is picked up and relay 1–2GRADP is released, or if section CL4T is occupied. When section CL4T is occupied after relay 1–2GRAD is picked up, relay 1–2GRADP is picked up and is held up as long as relay 1–2GRAD is held up. Relay 1–2GA1 will also be held up as long as relay 1–2GRAD is held up. Since relay 1–2GRAD will remain up as long as section CL4T is occupied, it will be apparent that the information stored in the A bank of the phantom locations is not cancelled until a cut has occupied and then vacated section CL4T.

The A1TAC, A2TAC and A3TAC relays in the A bank of the 1–2 phantom storage unit will be described hereinafter.

Referring again to FIG. 4, the information from the A bank of the storage unit associated with the master retarder is transferred either to the B bank of the 1–4 storage location or the B bank of the 5–8 storage location according as switch 1–8 is set to its normal or to its reverse position. In order to explain the circuit for carrying out this function, reference should be made to the B bank of the 1–4 storage location as shown in FIGS. 7 and 18.

Relays 1–4BT and 1–4BD in the 1–4 storage location, and their associated control circuits, have been described above. The TAC storage relays in this bank, as previously mentioned, are relays 1–4B1TAC, 1–4B2TAC and 1–4B3TAC (FIG. 18).

It should be noted in FIG. 6 that, while all of the circuits in the B bank of the 5–8 storage unit are not shown, they are identical with the circuits for the B bank of the 1–4 storage location and the corresponding terminals *a*, *b*, *g*, *h*, and *j*, are connected to corresponding circuits within the units. The circuits are identical and only the circuits for the 1–4 unit will, therefore, be described.

Relays 1–4B1TAC, 1–4B2TAC and 1–4B3TAC (FIG. 18) have similar pickup circuits extending from terminal B of the battery in FIG. 4 over front contacts *b* of relays 1ATAC, 2ATAC and 3ATAC, respectively, in A bank 56 (FIG. 4) over leads 243, 244 and 245, respectively, which are carried as a cable 246 through FIGS. 5, 6 and 7 to FIG. 18, where cable 246 branches into leads 243, 244, and 245, which connect to terminals *g*, *h* and *j*, respectively of the 1–4B bank, thence over the respective back points of make-before-break contacts *a* of relay 1–4B1TAC through 1–4B3TAC, respectively, through the windings of these relays to common lead 241, and from lead 241 over front contact *e* of relay 1–4BD to terminal N of the battery (FIG. 7). Each of relays 1–4B1TAC through 1–4B3TAC has a similar stick circuit extending from terminal B of the battery over the front point of contact *a* of each of the relays, through the windings of the relays, and over common lead 241 and front contact *e* of relay 1–4BD to terminal N of the battery.

The transfer circuits for the B bank of the 5–8 storage unit are the same as those shown for the B bank of the 1–4 storage location, and they will, therefore, be discussed only generaly. The transfer arrangement for energizing terminals *g*, *h* and *j* of the B bank of the 5–8 unit to supply relays 5–8B1TAC through 5–8B3TAC corresponds to the similar circuit for the B bank of the 1–4 storage unit, and, referring first to FIG. 4, extends from terminal B of the battery over front contacts *c* of relays 1ATAC, 2ATAC and 3ATAC, over leads 249, 250 and 251, respectively, through cable 252, through FIG. 5, to FIG 6 and over the extension of leads 249, 250 and 251 to terminals *g*, *h*, and *j*, of the B bank of the 5–8 storage unit.

The A bank of the 1–4 storage unit includes, as previously mentioned, three TAC storage relays 1–4A1TAC, 1–4A2TAC and 1–4A3TAC (FIG. 18). Relays 1–4A1TAC through 1–4A3TAC have similar pickup circuits extending from terminal B of the battery over front contact *f* of relay 1–4AT (FIG. 7), previously described, a common bus 253, over front contacts *b* of each of the respective relays 1–4B1TAC through 1–4B3TAC (FIG. 18), respectively, over the back point of make-before-break contact *a* of the respective relays 1–4A1TAC through 1–4A3TAC, through the windings of the respective relays, and over common lead 291 and front contact *f* of relay 1–4AD to terminal N of the battery (FIG. 7). Relays 1–4A1TAC through 1–4A3TAC have similar stick circuits extending from terminal B of the battery (FIG. 7) over battery bus 290, over the respective front points of contacts *a* of relays 1–4A1TAC through 1–4A3TAC, and through the winding of the respective relays to common lead 291 and thence over front contact *f* of relay 1–4AD to terminal N of the battery.

The TAC information stored in the A bank of the 1–4 storage unit is transferred to either the 1–2 phantom location or the 3–4 phantom location according as switch 1–4W is set to its normal or to its reverse position. Similarly, the TAC information stored in the A bank of 5–8 location is transferred either to the 5–6 phantom location or to the 7–8 phantom location according as switch 5–8W is set ot its normal or to its reverse position. Since this latter transfer is identical with the transfer from the 1–4 storage location, only the transfer from the 1–4 storage location will be described, the transfer from the 5–8 location being indicated schematically by the dotted line 256 (FIG. 6) connecting the A bank of the 5–8 storage unit to the apparatus for tracks 5 and 6, and 7 and 8 shown in block form.

Referring again to the A bank of the 1–4 storage unit (FIG. 18), the TAC storage output circuits include a common portion extending from terminal B of the battery and individual circuit paths for each of the relays 1–4A1TAC through 1–4A3TAC extending over their respective front contacts *b* to terminals *r*, *q* and *k*, respectively. Terminals *r*, *q*. and *k* are therefore energized or not energized according to the energized or deenergized condition of the respective relays 1–4A1TAC through 1–4A3TAC, respectively.

Terminals *r*, *q* and *k* are connected over parallel paths to terminals *f*, *g* and *h*, respectively, of the B banks of the 1–2 phantom location (FIGS. 20 and 21) and the 3–4 phantom location (FIG. 8). The circuit from terminal *r* extends over leads 258, 259 and cable 260 (FIG. 19) to the B bank of the 3–4 phantom location (FIG. 8) and extends over leads 258, and 261 (FIG. 19) to terminal *f* of the B bank of the 1–2 phantom location (FIG. 20). A circuit from terminal *q* (FIG. 18) extends over leads 262 and 263 to cable 260 (FIG. 19) and thence to the B bank of the 3–4 phantom location (FIG. 8), and over leads 262 and 264 (FIG. 19) to terminal *g* of the B bank of the 1–2 location (FIG. 20). A circuit from terminal *k* (FIG. 18) extends over leads 265 and 266 and cable 260 (FIG. 19) to the B bank of the 3–4 phantom location (FIG. 8), and over leads 265 and 267 to terminal *h* of the B bank of the 1–2 location (FIG. 20).

Relays 1–2GRBT and 1–2GRBD in the B bank of the 1–2 phantom location (FIG. 20) have been previously described. As previously mentioned there are also located in the B bank of this storage unit three TAC storage relays 1–2B1TAC, 1–2B2TAC and 1–2B3TAC.

It will be recalled from the description of the control circuits for relays 1–2GRBT and 1–2GRBD that these relays are energized if switch 1–4W is set to its normal position upon the occupancy of detector section 1–4T. Relays 3–4GRBT and 3–4GRBD (FIG. 8) are energized by a similar circuit over front contact *c* of relay 1–4RWP (FIG. 7), if switch 1–4W is set to its reverse position. Therefore, although the code indications from relays 1–4A1TAC through 1–4A3TAC are applied simultaneously to terminals *f*, *g* and *h* of the 1–2 and 3–4 phantom locations, only the T and D relays of the storage bank selected over front contacts *c* of relay 1–4NWP or 1–4RWP are picked up at this time. Advantage is taken of this fact to route the TAC code to its proper location, as will appear.

Relays 1–2B1TAC through 1–2B3TAC in the B bank of the 1–2 phantom location (FIG. 20) have similar pickup circuits, including front contacts of relays 1–4A1TAC through 1–4A3TAC in the A bank of the 1–4 storage location (FIG. 18) and terminals *f*, *g* and *h*, respectively, of the B bank of the 1–2 phantom location (FIG. 20) as previously described. The pickup circuit for relay 1–2B1TAC (FIG. 20) further includes front contact *f* of relay 1–2GRBT, the winding of the relay, and front contact *e* of relay 1–2GRBD which is connected to terminal N of the battery. Similarly, the circuits for relays 1–2B2TAC and 1–2B3TAC (FIG. 20) are continued from their respective terminals *g* and *h*, over front contacts *g* and *h* respectively, of relay 1–2GRBT, through the windings of the relays, and over front contact *e* of relay 1–2GRBD to terminal N of the battery. Relays 1–2B1TAC through 1–2B3TAC have similar stick circuits, extending from terminal B of the battery over front contact *a* of each relay, through the winding of the relay, and over front contact *e* of relay 1–2GRBD to terminal N of the battery.

Relays 1–2GRAT, 1–2GRAD and 1–2GRADP in the A bank of the 1–2 phantom location (FIG. 21) have previously been described. The A bank also includes three TAC storage relays 1–2A1TAC through 1–2A3TAC. These relays have common pickup circuits extending from terminal B of the battery over front contact *e* of relay 1–2GRAT (FIG. 21), lead 268, over front contacts *b* of relays 1–2B1TAC through 1–2B3TAC and leads 372, 373 and 374, respectively, and through the windings of the respective relays 1–2A1TAC through 1–2A3TAC (FIG. 21) to a common circuit extending over front contact *e* of relay 1–2GRAD to terminal N of the battery. Relays 1–2A1TAC through 1–2A3TAC have similar stick circuits extending from terminal B of the battery over front contacts *a* of the respective relays, through the windings of the relays, and over front contact *e* of relay 1–2GRAD to terminal N of the battery.

Associated with each of the group retarder locations is a group of repeater relays for the tangent acceleration code which respond to this code by selecting the storage panel from the groups 1RP through 6RP in which the tangent track rolling resistance for a particular cut is located, supplying the indication in that panel to the computer associated with the group retarder, and cancelling the storage from the selected panel to make the panel available for further storage. Since this equipment is identical for each of the group retarders, only that associated with group retarder 1–2GR will be described in detail.

Figure 22:
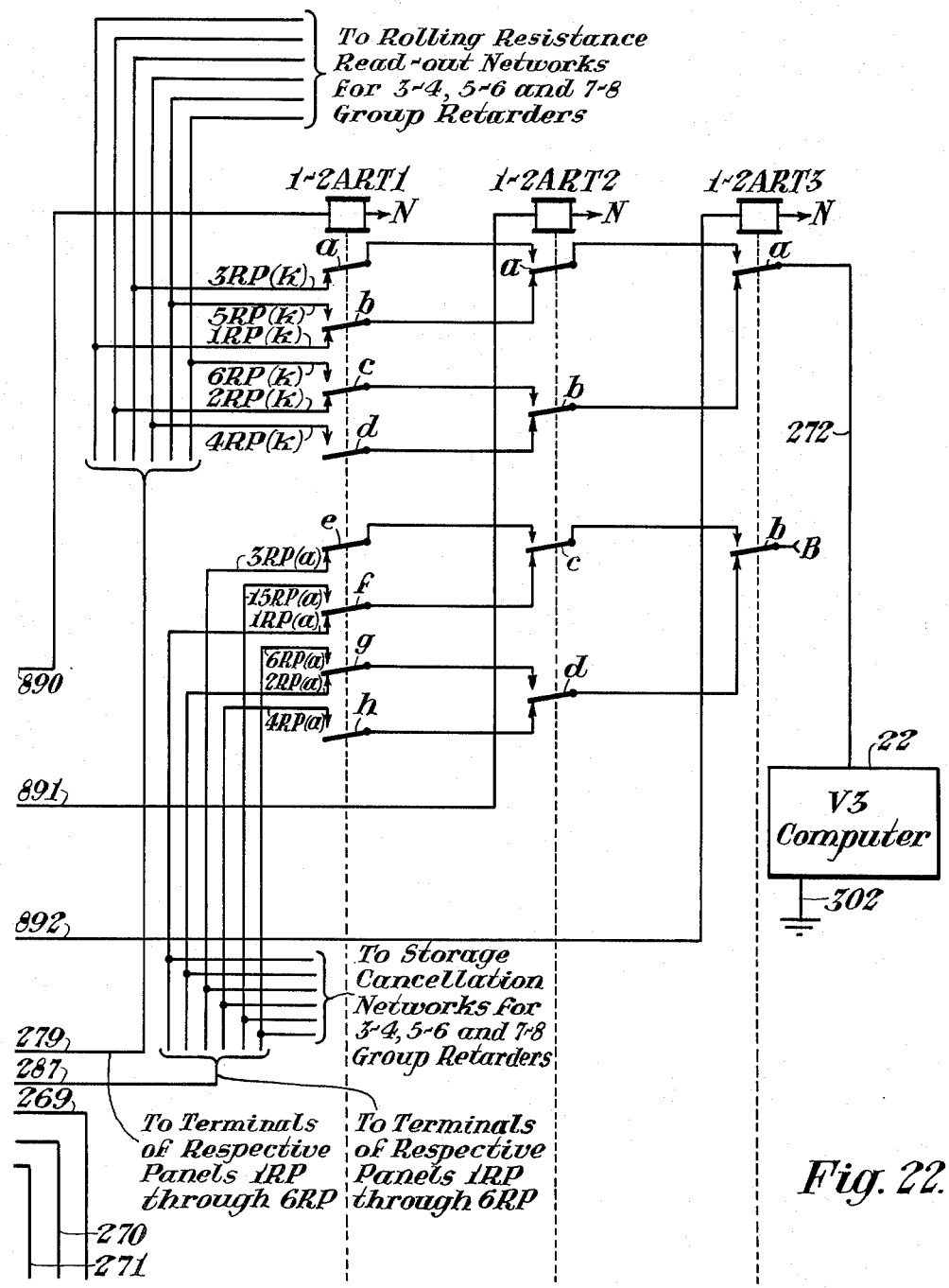

As shown in FIG. 22, three code repeater relays 1–2ART1, 1–2ART2 and 1–2ART3 are associated with group retarder 1–2GR and phantom storage location 1–2. These relays have similar pickup circuits extending from terminal B of the battery over front contacts *b* of relays 1–2A1TAC, 1–2A2TAC and 1–2A3TAC to terminals *i*, *j*, and *k*, respectively, (FIG. 21), and over leads 890, 891 and 892, respectively, to the windings of the relays, and through the windings of the relays to terminal N of the battery. Accordingly, relays 1–2ART1 through 1–2ART3 are direct front contact repeaters of relays 1–2A1TAC through 1–2A3TAC, respectively.

It will be understood that a group of ART relays, similar to that provided for 1–2 group retarder location, will be provided for each group retarder location to control the "read-out" of the tangent acceleration code, the weight storage information, and the correct leaving velocity information, from the storage panels 1RP through 6RP to the proper group retarder location. However, for purposes of simplification, only relays 1–2ART1, 1–2ART2 and 1–2ART3, as shown in FIG. 22, are illustrated in the drawings. The operation of the circuits for the control of these relays will be described more in detail hereinafter in this description, and it will also be understood that the ART relays at the other group retarders are controlled in a similar manner as will be readily apparent.

Relays 1–2ART1 through 1–2ART3 control a first group of circuits for connecting the output voltage of the proper selected one of panels 1RP through 6RP to a utilization device, consisting of a computer 22. This computer is shown only in block diagram form in FIG. 22 as it forms no part of my invention. It is sufficient to point out for purposes of this description that computer 22 shown in FIG. 22 corresponds to V3 computer 22 shown in FIG. 13 of the aforementioned copending application, Serial No. 676,730, and shown in more detail in FIGS. 53, 54, 55, 64, 65 and 66 of said application. In the drawings of my present application the input lead to the computer is lead 272 from contact *a* of relay 1–2ART3 as shown in FIG. 22.

Figure 28:
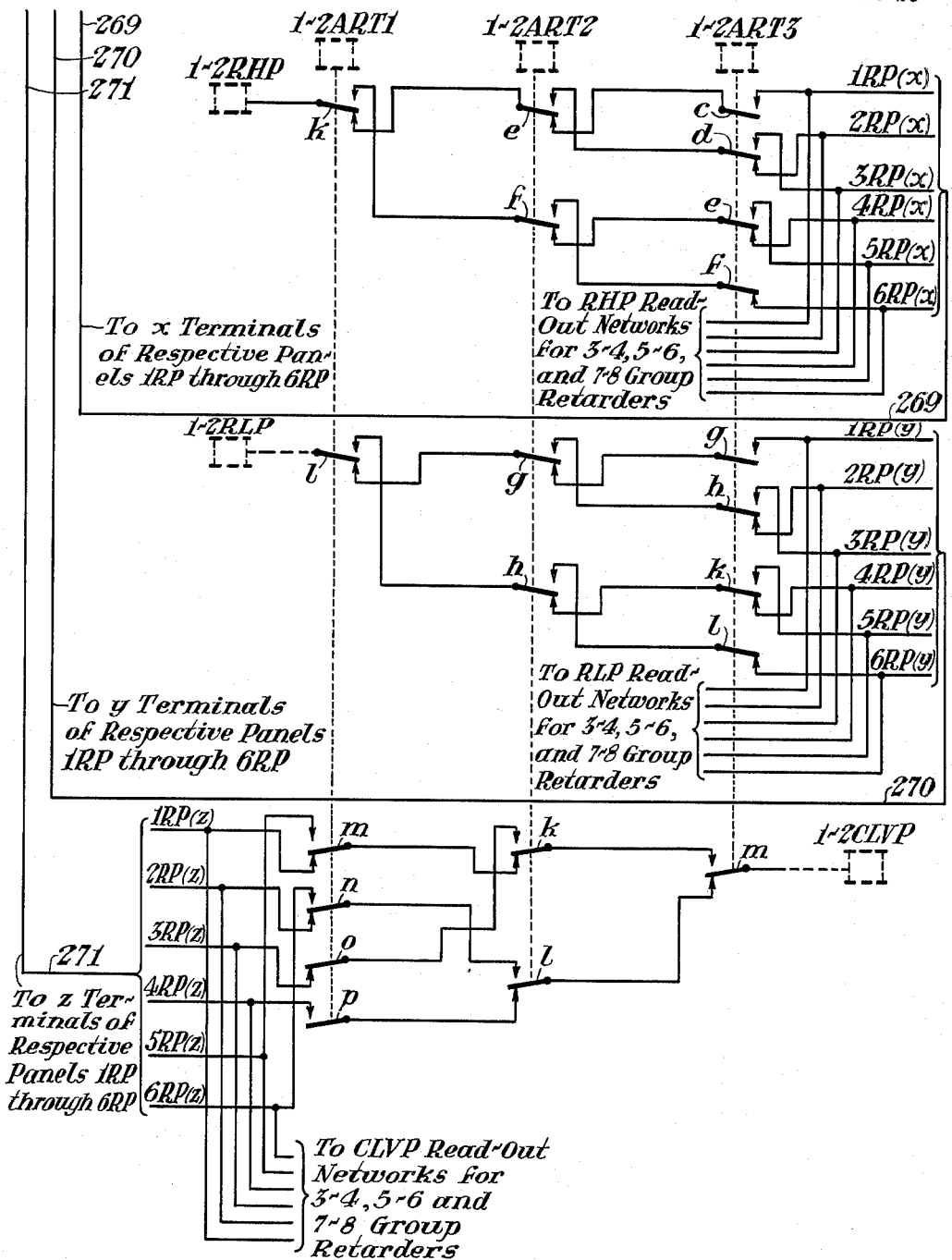

Referring now to FIG. 28 of the drawings, there is shown drawn in dotted lines three relays 1–2RHP, 1–2RLP and 1–2CLVP. These relays are the heavy weight and light weight repeater relays, and the correct leaving velocity repeater relay, respectively, for 1–2 group retarder location, and are employed to repeat the weight and correct leaving velocity information storages in panels 1RP through 6RP for cuts of cars routed to storage tracks 1 and 2, as will be hereinafter described. It will be understood that a group of three similar relays is provided for each group retarder location, but for purposes of simplification, only one said relay group and the "read-out" networks therefor are shown in detail in said FIG. 28. The "read-out" networks for the similar groups of relays for the other group retarder locations are similar to those shown for relays 1–2RHP, 1–2RLP and 1–2CLVP, as is readily apparent. These said networks extend over a combination front and back contacts of the respective ART relays for each group retarder location and connect to their similar respective networks as noted in FIG. 28.

The circuits controlled by relays 1–2RLP, 1–2RHP and 1–2CLVP, for group retarder 1–2, as well as similar groups of relays mentioned as being provided for the other group retarders, form no part of my present invention; and, for purposes of this description, it will suffice to point out that relays 1–2RLP, 1–2RHP and 1–2CLVP correspond, respectively, to relays ALP, AHP and A1VL shown in FIG. 43 of aforementioned copending application, Serial No. 676,730. Reference is made to said copending application for a description of the operation of the circuits and associated apparatus controlled by these relays.

The method by which switch control storages for a cut of cars destined for storage track 4 may be stored in storage panel 2RP has been previously set forth in this description. I will now first describe how "read-outs" of the switch control information to control the switches to their proper positions for the route to track 4 are accomplished as the cut of cars progresses through the yard. The "read-out" of the other information stored in panel 2RP and pertaining to said cut of cars will then be described. It is expedient to describe the "read-out" of switch control storages for the cut of cars routed to storage track 4 as this route requires that switch 1–4W be controlled to its reverse position. However, it is expedient to describe the "read-out" of other storages for a cut of cars destined for storage track 2, and I will later describe this "read-out" in relation to said cut of cars proceeding through the yard and having information in regard thereto stored in panel 2RP.

As mentioned above, I have previously described the operation of the switch control storage "read-in" circuits into storage panel 2RP for a cut of cars proceeding from the hump towards the destined storage track 4. The "read-out" of the switch control storage for switch 1-8W is controlled by relays 1ATAC, 2ATAC and 3ATAC in A bank 56 of the tangent acceleration code storage banks, and takes place when the cut of cars enters track section MR2T thereby releasing relay R2TR (FIG. 3).

Figure 17:
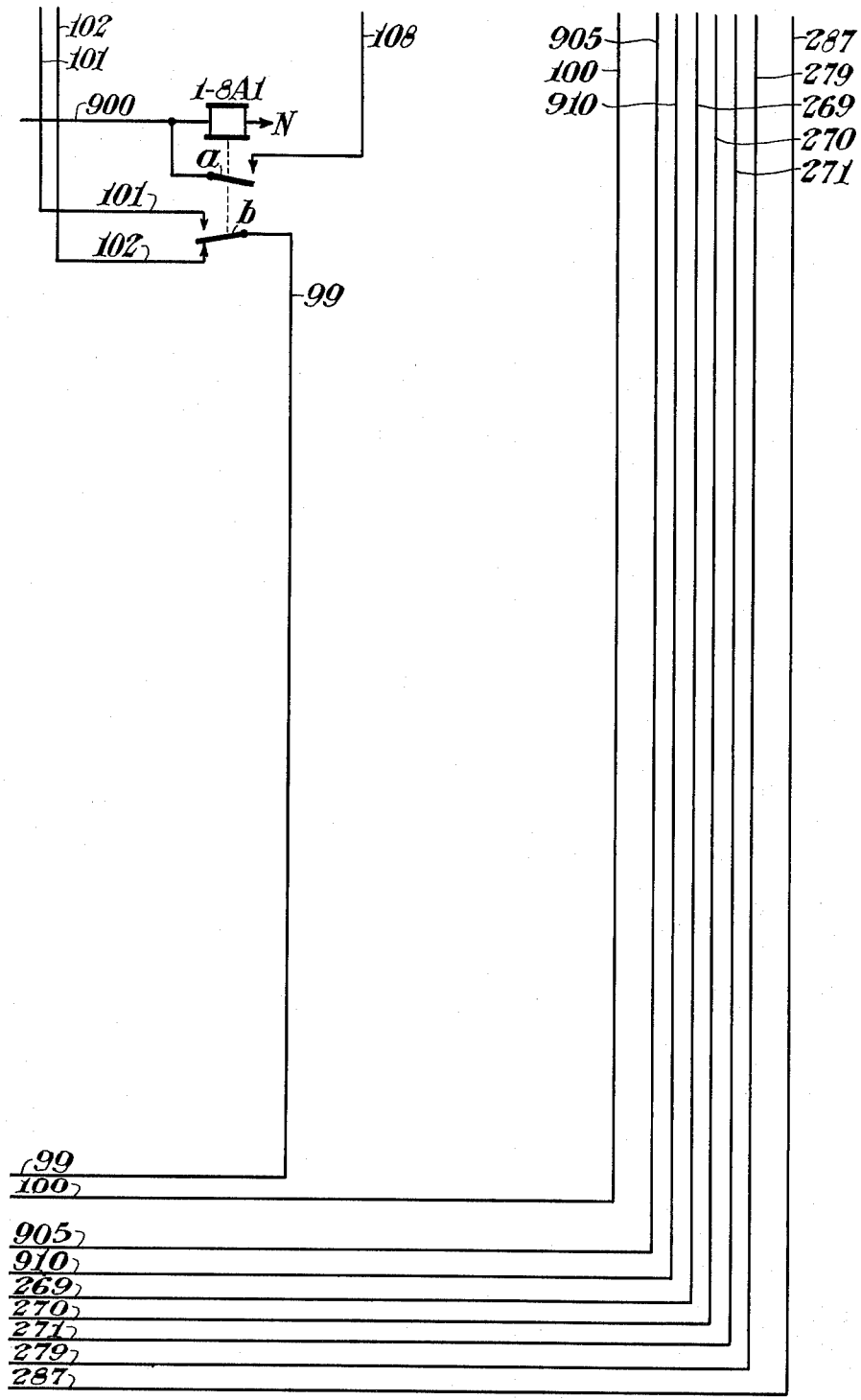

Referring to FIG. 17, there is shown relay 1-8A1, previously mentioned. This relay is the switch control storage repeater relay for switch 1-8W and controls the circuits, previously described, for positioning switch 1-8W to its normal or reverse position accordingly as the relay is released or picked up, respectively. So that the circuits for control of relay 1-8A1 may be more readily followed, I will trace these circuits from the winding of the relay to terminal B of the battery. The other terminal of the winding of the relay is connected to battery terminal N as shown in FIG. 17. The control circuit for relay 1-8A1 extends from the winding of the relay (FIG. 17) over lead 900 (FIGS. 16 and 15), back contact b of relay R2TR (FIG. 15), lead 901, (FIGS. 15 and 16), terminal 8 of A bank 56 (FIG. 16), the back point of contact g of relay 3ATAC, the front point of contact g of relay 2ATAC, back point of contact f of relay 1ATAC, terminal u2 of A bank 56, lead 2RP (u) in FIGS. 15, 14, 13, 12 and 24, terminal u of storage panel 2RP and thence to the front point of contact b of relay 2WS1 (FIG. 24). The route to storage track 4 being over switch 1-8W in the normal position, relay 2WS1 is not energized at this time and, therefore, no energy is applied to the described "read-out" circuit for picking up relay 1-8A1. However, if a cut of cars is destined for one of the storage tracks 5 through 8, relay 2WS1 is picked up, as previously described, and the "read-out" control circuit for relay 1-8A1 is completed over front contact b of relay 2WS1 to terminal N of the battery. It is thus seen that the "read-out" circuit for storage panel 2RP extends over a picked-up and released combination of relays A1TAC through A3TAC in A bank 56 in accordance with the tangent acceleration code 010 for said storage panel. If the storages for the cut of cars are stored in some other storage panel the said TAC relays are picked up or released to produce the proper combination of closed contact points of said relays for the proper panel. This is readily apparent by referring to FIG. 16 of the drawings.

Relay 1-8A1 (FIG. 17) is provided with a stick circuit extending from terminal B of the battery in FIG. 5 over back contact c of relay 1-8TR, lead 108, front contact a of relay 1-8A1 (FIG. 17), and through the winding of the relay to terminal N of the battery. This circuit insures that if relay 1-8A1 is picked up to complete the circuit to direct a reverse movement of the switch, the relay will remain picked up while track section 1-8T is occupied by a cut of cars and until the cut vacates said track section.

It is desired to point out that the "read-out" circuit leads are designated by reference characters which include the reference character for the storage panels to which they connect followed by the terminal reference on said panels to which the leads connect. These terminal references are enclosed in parentheses. For example, as described above, lead 2RP (u) connects to terminal u of storage panel 2RP. This method of designating the "read-out" leads is employed to facilitate the following of the circuits.

When the cut of cars occupies track section MR2T, relay R2TR (FIG. 3) is released, closing its back contact a to pick up relay R2TP (FIG. 2) over lead 902. The pickup of relay R2TP closes front contact m (FIG. 14) of that relay which closes the previously described switch control circuit for positioning switch 1-8W to its normal position. This circuit includes normal control lever 1-8MC (FIG. 5) in its A position, leads 100 and 99, the back point of contact b of relay 1-8A1 (FIG. 17), lead 102, terminal b of switch control unit 1-8WC (FIG. 5) and thence over the previously described circuit for the normal control magnet NW of switch mechanism 1-8SM. Switch 1-8W accordingly moves to its normal position, if not already so positioned.

Relays A1TAC, A2TAC and A3TAC in the A bank 56 of the tangent acceleration code storage banks are maintained picked up, as previously described, by multiple stick circuits over front contacts b and g of relays R2TP and CLV, respectively (FIGS. 2 and 14, respectively). In order to prevent a "read-out" of a switch control storage for switch 1-8W from the improper storage panel when the said ATAC relays release due to the vacating of track section MR2T and consequential opening of contact b of relay R2TP, front contact m (FIG. 14) of relay R2TP is included in the control circuit for switch 1-8W to insure that this control circuit is opened at the same time as the stick circuit for the ATAC relays. The ATAC relays are arranged to be slightly slow in releasing when their control circuits are opened and it is thus insured that the control circuit for switch 1-8W is opened before the ATAC relays release. This arrangement is comparable to the arrangement previously described for preventing a "read-in" of correct leaving velocity information to an improper storage panel.

The cut of cars proceeding towards its destined storage track 4 moves into track section 1-8T and over switch 1-8W in its normal position and vacates track section MR2T. At this time the tangent acceleration code is transferred from the A bank 56 to the B bank of the 1-4 storage unit (FIG. 18).

The control circuit for control relay 1-4BT (FIG. 7), as previously described, includes back contact e of relay GEC (FIG. 2), lead 112 (FIGS. 3, 4 and 5) back contact e of relay 1-8TR, front contact c of relay 1-8NWP, switch 1-8W being in its normal position, lead 113 (FIGS. 5, 6 and 7), and back contact c of relay 1-4BD. Relay 1-4BT is accordingly picked up when the cut of cars occupies track section 1-8T and vacates track section MR2T. The control circuit for control relay 1-4BD, as previously described, includes front contact c of relay 1-4BT and, in multiple, back contacts c and d, respectively, of control relays 1-4AT and 1-4AD in the A bank of 1-4 storage unit (FIG. 7).

The picking up of relay 1-4BD closes at its front contact e (FIG. 7) the tangent acceleration code transfer circuits for the BTAC relays in the B bank of the 1-4 storage unit (FIG. 18). This previously described circuit includes front contact b of relay 2ATAC (FIG. 4), lead 244, cable 246 (FIGS. 4, 5, 6, 7 and 18), back contact a of relay 1-4B2TAC, and lead 241. Relay 1-4B2TAC completes its previously described stick circuit including its own front contact a. The pick-up or released conditions of relays 1-4B1TAC, 1-4B2TAC and 1-4B3TAC now reflect the code 010 for storage panel 2RP. When the slow release period of relay 2ATAC in the A bank 56 (FIG. 4) has expired, that relay will release and that bank is ready for an additional tangent acceleration code storage.

Assuming that the A bank of 1-4 storage unit (FIGS. 7 and 18) is also vacant at this time, the tangent acceleration code is immediately transferred to that bank. When relay 1-4BD picks up as described relay 1-4AT is picked up over its previously described control circuit including front contact b of relay 1-4BD and back contact b of relay 1-4BT. The picking-up of relay 1-4AT closes the previously described pickup circuit for relay 1-4AD including normally closed contact a of cancellation button 1-4ACPB and front contact b of relay 1-4AT.

The pick-up of relay 1-4AT prepares at its closed front contact f the circuit for the pick-up of relay 1-4A2TAC, including front contact b of relay 1-4B2TAC, as previously described. When relay 1-4AD picks up, the pick-up circuit for relay 1-4A2TAC is completed over front contact f of relay 1-4AD and relay 1-4A2-

TAC picks up, completing its stick circuit over its own front contact *a*. The pick-up of relay 1–4AD also opens at its back contact *d* the stick circuit for relay 1–4BD and that relay releases. The release of relay 1–4BD opens at its front contact *b* the stick circuit for relay 1–4AT and that relay releases. The releasing of relay 1–4BD also releases the stick circuit for relay 1–4B2TAC and the B bank of the 1–4 storage unit is read for another tangent acceleration code storage.

The picking-up of relay 1–4AD and relay 1–4A2TAC prepares a "read-out" circuit from a storage panel 2RP to relay 1–4A1 (FIG. 7). This circuit was previously described from the movable portion of contact *c* of relay 1–4A3TAC in FIG. 27 and will now be described from said contact to battery terminal B in said panel 2RP. The circuit extends over the back point of contact *c* of relay 1–4A3TAC, the front point of contact *d* of relay 1–4A2TAC (FIG. 27), the back point of contact *d* of relay 1–4A1TAC (FIG. 27), terminal *v2* of the A bank of the 1–4 storage unit (FIG. 27), lead 2RP(*v*), and multiple conductor cable 905 (FIGS. 27, 18, 7, 6, 5, 17, 16, 15, 14 and 26). Cable 905 again branches into individual leads 1RP(*v*) through 6RP(*v*) in FIG. 26, and lead 2RP(*v*) extends through FIGS. 26, 25, and 24 to terminal *v* of storage panel 2RP (FIG. 24) and front contact *b* of relay 2WS2 to terminal B of the battery. Relay 2WS2 is picked up at this time because the route to storage track 4 requires that switch 1–4W be in the reverse position. Relay 1–4A1 (FIG. 7) accordingly picks up.

The picking-up of relay 1–4A1 closes a circuit for controlling switch 1–4W to its reverse position. This circuit extends from terminal B of the battery in FIG. 7, over normal control lever 1–4MC in its A position, terminal *e* of switch control unit 1–4WC, terminal *w* of the A bank of the 1–4 storage unit, front contact *e* of relay 1–4AD, back contact *d* of relay 1–4AT, the front point of contact *b* of relay 1–4A1, lead 103 to terminal *c* of the A bank of the 1–4 storage unit (FIG. 18) and thence continuing over lead 103 to terminal *c* of unit 1–4WC (FIG. 7), the front point of contact *a* of relay 1–4WP, front contact *a* of relay 1–4TR, assuming that track section 1–4T is unoccupied, one terminal of the reverse control magnet RW of switch movement 1–4SM, and through the magnet to terminal *b* of circuit controller F of 1–4CC and thence over the wiper arm of circuit controller F to terminal N of the battery. Switch 1–4W is thus controlled to its reverse position.

In view of the above description it is apparent how "read-outs" for control of switch 1–4W may be made from any one of the terminals *v* of storage panels 1RP through 6RP over leads 1RP(*v*) through 6RP(*v*), respectively, through the proper combination of the contact points of relays 1–4A1TAC, 1–4A2TAC, and 1–4A3TAC (FIG. 27) to relay 1–4A1. It is apparent by referring to FIG. 27 that similar "read-outs" may be made from panels 1RP through 6RP to similar "read-out" circuits for control of switch 5–8W when the route for a cut of cars leads over this switch. These "read-out" and control circuits for switch 5–8W, for purposes of simplification of this description, are not shown but the leads for these circuits, as noted in FIG. 27, are shown connecting to the leads from terminals *v1* through *v6* of the A bank of the 1–4 storage unit. It will thus be understood that leads 1RP(*v*) through 6RP(*v*) also connect to terminals *v1* through *v6*, respectively, of the A bank of the 5–8 storage unit.

When the cut of cars occupies track section 1–4T in its progress towards storage track 4, a circuit is completed for transferring the tangent acceleration code storage in the A bank of the 1–4 storage unit to the B bank of the 3–4 phantom location shown in FIG. 8. This circuit extends from terminal B of the battery in FIG. 7 over front contact *g* of relay 1–4AD, back contact *e* of relay 1–4AT, back contact *b* of relay 1–4AL, terminal *v* of the A bank of the 1–4 storage unit, terminal *c* of switch control unit 1–4WC, back contact *d* of relay 1–4TR, front contact *c* of relay 1–4RWP, switch 1–4W being in its reverse position, terminal *f* of unit 1–4WC, lead 906, lead 907 (FIG. 8), terminal *b* of the B bank of the 3–4 phantom switch location, bank contact *a* of relay 3–4GRBD, and through the winding of relay 3–4GRBT to terminal N of the battery. A stick circuit is provided for relay 3–4GRBT which extends from terminal B of the battery over front contact *g* of relay 1–4AD (FIG. 7), terminal *t* of the A bank of the 1–4 storage unit, lead 129, lead 130 (FIG. 8), terminal *a* of the B bank of the 3–4 phantom switch location, front contact *a* of relay 3–4GRBT and through the winding of this relay to terminal N of the battery. The control of relay 3–4GRBD in the B bank of the 3–4 phantom location (FIG. 8) is similar to that described above for relay 1–4BD in the B bank of the 1–4 storage unit (FIG. 7), and is also similar to that to be described for relay 1–2GRBD in the 1–2 phantom storage location shown in FIG. 20. Therefore, no control circuits for relay 3–4GRBD are shown. However, it should be pointed out that when relay 3–4GRBD is picked up, one previously described stick circuit for relay 1–4AD extending from terminal *u* of the A bank of 1–4 storage unit (FIG. 7) is opened at back contacts *b* of relays 3–4GRBT and 3–4GRBD (FIG. 8). When relay 3–4BD in the B bank of the 3–4 storage unit picks up, its back contact *b* opens the second stick circuit for relay 1–4AD which releases after its slow release period expires.

When relay 3–4GRBD picks up and before the slow release period of relay 1–4AD expires, the circuits for completing the transfer of the tangent acceleration code to TAC relays in the B bank of the 3–4 phantom location are completed over front contacts of relays 3–4GRBT and 3–4GRBD. Similar circuits have been previously described and no further description thereof is necessary at this point. However, the operation of similar circuits for the TAC relays in the B bank of the 1–2 phantom storage location will be covered later in this description.

It is desired to point out at this time that the previously described circuit from terminal *f* of the 1–4 switch control unit over leads 906 and 907 to terminal *b* of the B bank of 3–4 phantom location also extends over leads 906 and 908 to terminal *b* of the B bank of the 3–4 storage unit. Similarly, the previously described circuit from terminal *t* of the A bank of the 1–4 storage unit over leads 129 and 130 to terminal *a* of the 3–4 phantom location also extends over leads 129, 131 and 133 to terminal *a* of the B bank of the 3–4 storage unit. These circuits operate in the same manner as similar circuits for the 1–2 storage unit, hereinafter described, and no detail description of said circuits is necessary.

I have described above the switch control storage "read-out" circuits for a cut of cars preceding through the yard and destined for storage track 4. This description was made primarily for the purpose of describing the manner in which the "read-out" of a switch control storage to control a switch (1–4W) to its reverse position is accomplished. As previously stated, I will now describe the "read-out" of the switch control storages, the weight classification storages and the correct leaving velocity information storage for the cut of cars moving through the yard and destined for storage track 2. The circuits for this cut of cars operate identically to those previously described, up to the point where the cut of cars enters track section 1–8T and actuates the previously described circuits for a "read-out" of the switch control storage for positioning switch 1–4W to its reverse position. I will now, therefore, assume that relay 2WS2 in panel 2RP is in its released position when the cut enters track section 1–8T and the "read-out" from panel 2RP for controlling switch 1–4W thus will not, as previously described, operate to pick up relay 1–4A1, but switch 1–4 will be controlled to its normal position as described below.

As previously described, with relay 1–4BT released and relay 1–4BD picked up (FIG. 7), a pickup circuit for relay 1–4AT is completed from terminal B of the battery over front contact *b* of relay 1–4BD, back contact *b* of relay 1–4BT, back contact *b* of relay 1–4AD, and through the winding of relay 1–4AT to terminal N of the battery. With relay 1–4AT picked up, it is held up over its previously traced stick circuit including its own front contact *a*, back contact *b* of relay 1–4BT, and front contact *b* of relay 1–4BD.

The previously traced pickup circuit for relay 1–4AD is also completed at this time, extending, it will be recalled, from terminal B of the battery over normally closed contact *a* of cancellation button 1–4ACPB, front contact *b* of relay 1–4AT, through the winding of relay 1–4AD to terminal *u* of the A bank of the 1–4 storage unit, over lead 121 (FIGS. 8, 19, and 20), and from lead 121 over two parallel paths, the first extending over lead 122 to terminal *c* of the 1–2 phantom storage location associated with group retarder 1–2GR, to be described, back contacts *d* of relays 1–2GRBT and 1–2GRBD in multiple, terminal *d* of the 1–2 phantom storage bank, and over lead 124 (FIG. 19) to terminal *c* of the 3–4 phantom storage B bank (FIG. 8), and thence over back contacts *b* of relays 3–4GRBT and 3–4GRBD in multiple to terminal N of the battery. The second circuit path from lead 121 (FIG. 20) extends over lead 123, cable 289, lead 123 (FIG. 9), terminal *e* of the B bank of the 1–2 storage unit, over back contacts *e* of relays 1–2BT and 1–2BD in multiple to terminal *d* of the 1–2 storage unit, over lead 125 to cable 289 and thence to FIG. 20, lead 125 from FIG. 20 through FIG. 19 to terminal *c* of the B bank of the 3–4 storage unit (FIG. 8), and over back contacts *b* of relays 3–4BT and 3–4BD in multiple to terminal N of the battery.

The phantom storage location and the switch storage location following the group retarder associated with each route receive information in parallel from the switch storage unit associated with the group preceding the group retarder in the route. Accordingly, the purpose of the two paths previously traced in the pickup and holding circuits for relay 1–4AD is to insure that both the phantom location and the switch storage location have completed the receipt of the information from the preceding switch location before the D relay, in this case relay 1–4AD, is allowed to release.

With relay 1–4AD picked up (FIG. 7), the previously traced pickup circuits for relays 1–4A1 (FIG. 7) and 1–4A2TAC (FIG. 7) are prepared by the closing of front contact *f* of relay 1–4AD. Since relay 2WS2 in panel 2RP is in its released position (FIG. 24), the "read-out" circuit for relay 1–4A1 will be open at the open front point of contact *b* of relay 2WS2, and relay 1–4A1 will accordingly remain released.

When relay 1–4AD (FIG. 7) picked up as previously described, the previously traced circuit for relay 1–4BD was opened at the open back points of contact *c* of relay 1–4AT and contact *d* of relay 1–4AD. Accordingly, at the end of its predetermined time delay, which is made sufficient to permit the previously described transfer, relay 1–4BD is released. The B bank of the 1–4 storage unit is thus restored to its initial condition, in which it is adapted to receive additional information.

With relay 1–4BD released, the previously traced holding circuit for relay 1–4AT is interrupted at the open front point of contact *b* of relay 1–4BD, and relay 1–4AT is accordingly released.

With relay 1–4AT released and relay 1–4AD held up, a circuit is completed, as previously described, for setting switch 1–4W to its normal position, if not already so positioned. This circuit extends from terminal B of the battery over contact A of manual controller 1–4MC, in its automatic position, to terminal *e* of switch control unit 1–4WC, terminal *w* of the A bank of the 1–4 storage unit, front contact *e* of relay 1–4AD, back contact *d* of relay 1–4AT, the back point of contact *b* of relay 1–4A1, lead 104 (FIG. 18), terminal *b* of the A bank of the 1–4 storage unit (FIG. 18), lead 104, terminal *b* of the 1–4WC unit (FIG. 7), the front point of contact *b* of relay 1–4WP, front contact *c* of relay 1–4TR, through the normal magnet NW of switch mechanism 1–4SM and through circuit controller E to terminal N of the battery unless switch 1–4W is already in its normal position or close enough thereto to be under the control of the spring action of switch machine 1–4SM.

When relay 1–4A2TAC (FIG. 18) picks up, as previously described, a "read-out" circuit for relays 1–2GB1 (FIG. 20) and 1–2B1 (FIG. 9) is prepared. This circuit extends from terminal B of the battery in 2RP storage panel (FIG. 30) over front contact *b* of relay 2WS3, terminal *w* of panel 2RP, lead 2RP(*w*) in FIGS. 24, 25, and 26, multiple conductor cable 910 (FIGS. 26, 14, 15, 16, 17, 5, 6, 7, 18 and 27) lead 2RP(*w*) in FIG. 27, terminal *w*2 of the A bank of the 1–4 storage unit, the back point of contact *e* of relay 1–4A3TAC, the front point of contact *e* of relay 1–4A2TAC, the back point of contact *g* of relay 1–4A1TAC, terminal *s* of the A bank of the 1–4 storage unit, lead 135 (FIG. 18) to FIG. 19 where lead 135 connects to leads 911, 912 and 137; lead 911 connecting to terminal *d* of the B bank of the 3–4 phantom storage location (FIG. 8), lead 912 connecting to terminal *d* of the B bank of the 3–4 storage unit (FIG. 8), and lead 137 extending to FIG. 20 where it connects to leads 139 and 140, lead 139 connecting to terminal *e* of the B bank of the 1–2 phantom storage unit (FIG. 20), and lead 140 extending through cable 289 to FIG. 9 and to terminal *c* of the B bank of the 1–2 storage unit (FIG. 9).

The picking up of relay 1–4A2TAC (FIG. 18), as previously described, also prepares a circuit for the transfer of the tangent acceleration code 010 for panel 2RP to the B bank of the 1–2 phantom storage unit (FIG. 20). This circuit extends from terminal B of the battery in the A bank of the 1–4 storage unit (FIG. 18) over front contact *b* of relay 1–4A2TAC, terminal *q* of said A bank, lead 262 (FIG. 19), lead 264 (FIG. 19), and to terminal *g* of the B bank of the 1–2 phantom storage unit. Lead 262 in FIG. 19 also connects to lead 263 which extends through cable 260 to FIG. 8 where cable 263 (not shown) connects to terminal *g* of the B bank of 3–4 phantom location.

When the cut occupies detector track section 1–4T (FIG. 7), relay 1–4TR is released. Since switch 1–4W is in its normal position, it is desired to energize the T relay in the B banks of the 1–2 switch storage location and the 1–2 phantom storage location associated with group retarder 1–2GR. The circuit for this purpose extends from terminal B of the battery over front contact *g* of relay 1–4AD, back contact *e* of relay 1–4AT, back contact *b* of relay 1–4AL, terminal *v* of the A bank of the 1–4 storage location, terminal *c* of unit 1–4WC, back contact *d* of relay 1–4TR, front contact *c* of normal repeater relay 1–4NWP, terminal *g* of unit 1–4WC, lead 126 (FIGS. 8 and 19), and over a first branch (FIG. 20) including lead 127, terminal *b* of the B bank of the 1–2 phantom storage unit, back contact *c* of relay 1–2GRBD, and through the winding of relay 1–2GRBT to terminal N of the battery; and over a second path from lead 126 including lead 128, cable 289, lead 128 (FIG. 9), terminal *b* of the B bank of the 1–2 storage location, back contact *b* of relay 1–2BD, and through the winding of relay 1–2BT to terminal N of the battery. Relays 1–2GRBT and 1–2BT accordingly pick up.

With relay 1–2GRBT picked up (FIG. 20), the previously traced pickup circuit for relay 1–2GRBD is completed, which circuit extends from terminal B of the battery over front contact *c* of relay 1–2GRBT, through the winding of relay 1–2GRBD, lead 948, and over either back contact *c* of relay 1–2GRAT or back contact *d* of relay 1–2GRAD (FIG. 21) to terminal N of the battery.

With relays 1–2GRBT and 1–2GRBD picked up, the circuit is completed for the transfer of information to route storage relay 1–2GB1 (FIG. 20). This circuit extends from terminal B of the battery in storage panel 2RP to terminal e of the B bank of the 1–2 phantom storage location, as previously described, and thence over front contact e of relay 1–2GRBT, through the winding of relay 1–2GB1, and over front contact e of relay 1–2GRBD to terminal N of the battery. Relay 1–2GB1 is thus picked up, and is held up over its previously traced stick circuit including its front contact a and front contact e of relay 1–2GRBD.

With relay 1–2BT (FIG. 9) picked up in the B bank of the 1–2 storage location, the previously traced circuit for relay 1–2BD, including front contact b of relay 1–2BT, the winding of relay 1–2BD, and back contact c of relay 1–2AT and back contact d of relay 1–2AD in multiple, is completed and relay 1–2BD is picked up. When picked up, relay 1–2BD is held up over its previously traced stick circuit including its own front contact a and either back contact c of relay 1–2AT or back contact d of relay 1–2AD.

With relays 1–2BT and 1–2BD both up, a circuit is completed for the transfer of information to storage relay 1–2B1. This circuit extends from terminal B of the battery in 2RP storage panel to terminal c of the B bank of the 1–2 storage location, as previously described, and thence over front contact c of relay 1–2BT, through the winding of relay 1–2B1, and over front contact c of relay 1–2BD to terminal N of the battery. Relay 1–2B1 accordingly picks up and is held up over its stick circuit including its own front contact a and front contact c of relay 1–2BD.

With relays 1–2GRBT and 1–2GRBD both up, as described above, the circuit is also completed for transfer of the tangent acceleration code 010 to the B bank of the 1–2 phantom storage location. This circuit extends from terminal B of the battery in the A bank of the 1–4 storage unit to terminal g of the B bank of the 1–2 phantom storage unit in FIG. 20, as described above, over front contact g of relay 1–2GRBT, through the winding of relay 1–2B2TAC, and over front contact e of relay 1–2GRBD to terminal N of the battery. Relay 1–2B2TAC accordingly picks up and is held up over its stick circuit including its own front contact a and front contact e of relay 1–2GRBD.

As soon as relays 1–2BT and 1–2BD in the 1–2 storage location (FIG. 9) and relays 1–2GRBT and 1–2GRBD in the 1–2 phantom storage location (FIG. 20) are all up, the previously traced holding circuit for relay 1–4AD (FIG. 7) is interrupted at the open back contacts e of relays 1–2BT and 1–2BD, and is interrupted in the parrallel branch at the open back points of contacts d of relays 1–2GRBT and 1–2GRBD. Accordingly, at the end of its predetermined time delay, which is made long enough to permit the previously described transfers, relay 1–4AD is released.

With relay 1–4AD released, the circuits for relays 1–4A1 and 1–4A2TAC (FIGS. 7 and 18) are interrupted at the open front point of contact f of relay 1–4AD (FIG. 7), and these relays are released.

If section 1–4T is still occupied when relay 1–4AD is released, which would be a normal condition, relay 1–4AL (FIG. 7) will pick up over a circuit extending from terminal B of the battery in unit 1–4WC (FIG. 7), over back contact b of relay 1–4TR, to terminal d of unit 1–4WC and terminal x of the A bank of the 1–4 storage unit, and thence over back contact c of slow release relay 1–4AD and through the winding of relay 1–4AL to terminal N of the battery. Relay 1–4AL will then hold up over a stick circuit which is the same as its previously traced pickup circuit except that it includes its own back contact a in shunt around contact c of relay 1–4AD.

It will be recalled that back contact b of relay 1–4AL was in the pickup circuits for the succeeding T relays of the phantom storage locations and switch storage locations. Accordingly, the pickup of relay 1–4AL will prevent a second transfer to these units as long as section 1–4T is occupied. As soon as section 1–4T becomes unoccupied, the circuit for relay 1–4AL will be interrupted at the open back point of contact b of relay 1–4TR, and at the end of its predetermined time delay, relay 1–4AL will be released and the A bank of the 1–4 storage location will be restored to its normal condition and become available for a subsequent transfer of information to succeeding units. It should be noted that the A bank of the 1–4 storage location is available for a storage input even though relay 1–4AL remains picked up, but the transfer of the stored information to succeeding storage locations cannot be made with relay 1–4AL picked up.

After relay 1–4AD is released, the previously traced stick circuits for relay 1–2GRBT in the phantom storage location (FIG. 20) and 1–2BT in the 1–2 switch storage location (FIG. 7) are interrupted. It will be recalled that the stick circuit for relay 1–2GRBT extends from terminal B of the battery in the A bank of the 1–4 storage location (FIG. 7) over front contact g of relay 1–4AD, terminal t of the A bank of the 1–4 location, over leads 129, 131 (FIG. 8), 132 (FIG. 19), and 134 (FIG. 20) to terminal a of the 1–2 phantom location, and thence over front contact a of relay 1–2GRBT and through the winding of the relay to terminal N of the battery. The corresponding stick circuit for relay 1–2BT extends from terminal B of the battery in the A bank of the 1–4 storage location over front contact g of relay 1–4AD (FIG. 7) to terminal t of the A bank and thence over leads 129, 131 (FIG. 8), 132 (FIG. 19), and 294 (FIG. 20), cable 289, lead 294 (FIG. 9), to terminal a of the B bank of the 1–2 storage location, and from terminal a over front contact a of relay 1–2BT and through the winding of the relay to terminal N of the battery. As soon as relay 1–4AD releases, the previously traced stick circuits for relays 1–2GRBT in the phantom location and 1–2BT in the switch storage location are interrupted at the open front point of contact g of relay 1–4AD in the A bank of the 1–4 storage unit. Accordingly both these relays are released.

With relay 1–2GRBT released and relay 1–2GRBD energized (FIG. 20), relay 1–2GRAT (FIG. 21) can pick up over its previously traced circuit extending from terminal B of the battery over front contact b of relay 1–2GRBD (FIG. 20), back contact b of relay 1–2GRBT, lead 949, back contact b of relay 1–2GRAD, and through the winding of relay 1–2GRAT to terminal N of the battery. As soon as relay 1–2GRAT picks up, it is held up over its stick circuit including its own front contact a, back contact b of relay 1–2GRBT, and front contact b of relay 1–2GRBD.

With relay 1–2GRAT picked up, relay 1–2GRAD (FIG. 21) can pick up over its previously traced circuit extending from terminal B of the battery over normally closed contact a of cancellation button 1–2GACB, front contact b of relay 1–2GRAT, through the winding of the relay 1–2GRAD and over back contact a of relay 1–2GRADP to terminal N of the battery.

With relays 1–2GRAT and 1–2GRAD both up, the previously traced circuit for relay 1–2GRBD (FIG. 20) interrupted at the open back point of contact c of relay 1–2GRAT (FIG. 21) and the open back point of contact d of relay 1–2GRAD, but relay 1–2GRBD does not release until the end of its predetermined time delay. In the meantime, the circuits for relays 1–2GA1 and 1–2A2TAC (FIG. 21) are completed. The first circuit extends from terminal B of the battery over front contact e of relay 1–2GRAT, lead 268, front contact b of relay 1–2GB1 (FIG. 20), lead 468, front contact d of relay 1–2GRAT, the winding of relay 1–2GA1, and over front contact e of relay 1–2GRAD to terminal N of the battery. Relay 1–2GA1 is accordingly picked up and held up over its stick circuit including its own front contact

*a* and front contact *e* of relay 1–2GRAD. The second circuit extends from terminal B of the battery over front contact *e* of relay 1–2GRAT, lead 268, front contact *b* of relay 1–2B2TAC (FIG. 20), lead 373, the winding of relay 1–2A2TAC (FIG. 21), and over front contact *e* of relay 1–2GRAD to terminal N of the battery. Relay 1–2A2TAC is accordingly picked up and held up over its stick circuit including its own front contact *a* and front contact *e* of relay 1–2GRAD.

At the end of its predetermined time delay, relay 1–2GRBD is released, opening the stick circuits for relays 1–2GB1 and 1–2B2TAC at its contact *e* and opening the stick circuit for relay 1–2GRAT at front contact *b* of relay 1–2GRBD. These relays accordingly release. With the release of relay 1–2GRBD, the B bank of the 1–2 phantom storage unit is restored to its initial condition and is adapted to receive an additional transfer.

When the cut occupies section CL4T (FIG. 8), relay CL4TR is released and relay CL4TP (FIG. 21) is picked up over an obvious circuit including back contact *a* of track relay CL4TR and lead 920. When relay CL4TP is picked up, it completes the second previously traced stick circuit for relay 1–2GRAD (FIG. 21) at the front point of contact *a* of relay CL4TP (FIG. 21). The stored information in the A bank is thus retained as long as section CL4T is occupied.

The information represented by the energized or de-energized condition of terminal *g* of the A bank of the 1–2 phantom location is supplied to apparatus for directing the operation of the computer during the occupancy of section CL4T, as described in aforesaid copending application, Serial No. 676,370, which apparatus forms no part of my present invention. After section CL4T has been vacated, the A bank is restored to its initial condition.

Returning now to the 1–2 storage unit (FIG. 9), with relay 1–2BT down and relay 1–2BD up, as previously described, relay 1–2AT is energized over its previously traced pickup circuit extending from terminal B of the battery over front contact *d* of relay 1–2BD, back contact *d* of relay 1–2BT, back contact *f* of relay 1–2AD, and through the winding of relay 1–2AT to terminal N of the battery. Once relay 1–2AT is picked up, it is held up over its previously traced stick circuit including its own front contact *e*, back contact *d* of relay 1–2BT, and front contact *d* of relay 1–2BD.

With relay 1–2AT up, the previously traced pickup circuit for relay 1–2AD is completed. This circuit extends from terminal B of the battery over normally closed contact *a* of cancellation button 1–2CB, front contact *a* of relay 1–2AT, the winding of relay 1–2AD, terminal *c* of the A bank of the 1–2 storage unit, terminal *f* of unit 1–2WC, and over front contact *e* of relay 1–2TR to terminal N of the battery. When relay 1–2AD picks up, it is held up over its first stick circuit which is the same as its pickup circuit except that it includes its own front contact *a* in shunt around contact *a* of relay 1–2AT.

With relays 1–2AT and 1–2AD both up, the previously traced stick circuit for relay 1–2BD is interrupted at the open back points of contact *c* of relay 1–2AT and contact *d* of relay 1–2AD. However, relay 1–2BD will not release until the end of its predetermined time delay period. In the meantime, relay 1–2A1 is picked up over its previously traced transfer circuit including front contact *b* of relay 1–2B1, front contact *d* of relay 1–2AT, the winding of the relay, and front contact *e* of relay 1–2AD. Relay 1–2A1 is then held up over its stick circuit including its own front contact *a* and front contact *e* of relay 1–2AD.

When relay 1–2BD drops away, relay 1–2B1 is released due to the opening of its stick circuit at front contact *c* of relay 1–2BD and relay 1–2AT is released due to the opening of its stick circuit at front contact *d* of relay 1–2BD.

With relay 1–2AT released, relay 1–2AD picked up, and relay 1–2A1 picked up, the previously traced circuit for insuring that switch 1–2W is in its reverse position is completed from terminal B of the battery over terminal A of manual control 1–2MC in its automatic position, terminal *e* of switch control unit 1–2WC and terminal *d* of the A bank of the 1–2 storage unit, front contact *b* of relay 1–2AD, back contact *b* of relay 1–2AT, front contact *b* of relay 1–2A1, terminal *b* of the A bank of the 1–2 storage unit, terminal *b* of switch control unit 1–2WC, front contact *a* of relay 1–2WP, front contact *b* of relay 1–2TR, the winding of reverse magnet RW, and through circuit controller F to terminal N of the battery until the switch is moved to the position at which the spring action of switch machine 1–2SM will complete its movement to the reverse position. Reverse repeater relay 1–2RWP will then be picked up over its previously traced circuit which extends from terminal B of the battery through a suitable resistor, the upper winding of relay 1–2RWP, and over contact *a* of circuit controller F to terminal N of the battery. The picked up condition of relay 1–2RWP serves to actuate suitable indication circuits not shown.

When section 1–2T is occupied by the cut, the previously traced stick circuit for relay 1–2AD is interrupted at the open front point of contact *e* of relay 1–2TR. Relay 1–2AD accordingly releases at the end of its predetermined time delay period. Relay 1–2A1 is then released due to the interruption of its stick circuit at the open front point of contact *e* of relay 1–2AD.

If section 1–2T is still occupied when relay 1–2AD is released, which is the normal condition, relay 1–2AL is picked up over its previously traced circuit extending from terminal B of the battery over back contact *c* of track relay 1–2TR, terminal *d* of unit 1–2WC, terminal *e* of the A bank of the 1–2 storage unit, back contact *c* of relay 1–2AD, and through the winding of relay 1–2AL to terminal N of the battery. When relay 1–2AL is picked up, it is held up over its stick circuit, which is the same as its pickup circut except that its front contact *a* shunts contact *c* of relay 1–2AD.

With relay 1–2AL picked up, a second circuit for relay 1–2AD is prepared over front contact *b* of relay 1–2AL, permitting relay 1–2AD to be picked up while section 1–2T is still occupied but preventing its release until section 1–2T has been unoccupied for a time in excess of the time delay of relay 1–2AL and again reoccupied. When section 1–2T becomes unoccupied, the apparatus is again restored to its initial condition.

Since there is no cut ahead of the cut under consideration, the transfer of information from the B to the A bank of the 1–2 phantom storage location takes place at once when the cut of cars occupies track section 1–4T. As previously described, relays 1–2GRAT and 1–2GRAD (FIG. 21) are picked up, and relays 1–2A2TAC and 1–2GA1 are then picked up. With relay 1–2A2TAC (FIG. 21) picked up to establish the code combination 010 for associating the cut of cars with panel 2RP, a circuit is completed for energizing relay 1–2ART2 (FIG. 22) which extends from terminal B of the battery over front contact *b* of relay 1–2A2TAC to terminal *j* of the A bank of the 1–2 phantom storage location, lead 891, and through the winding of relay 1–2ART2 to terminal N of the battery. Relays 1–2ART1 and 1–2ART3 have similar pickup circuits which, however, are interrupted at the open front points of contacts *b* of relays 1–2A1TAC and 1–2A3TAC, respectively.

The picking up of relay 1–2ART2 completes a "read-out" circuit from unit 2ES (FIG. 24) in panel 2RP to the V3 computer 22 shown in FIG. 22, for supplying the value of rolling resistance stored in unit 2ES to said computer; completes a storage cancellation circuit (FIG. 22) for energizing relay 2RO (FIG. 23) in panel 2RP, and also completes "read-out" circuits (FIG. 28) for "reading-out" of storage panel 2RP the weight classification storages and correct leaving velocity storage for the cut of cars approaching group retarder 1–2GR, as described below.

Figure 25:
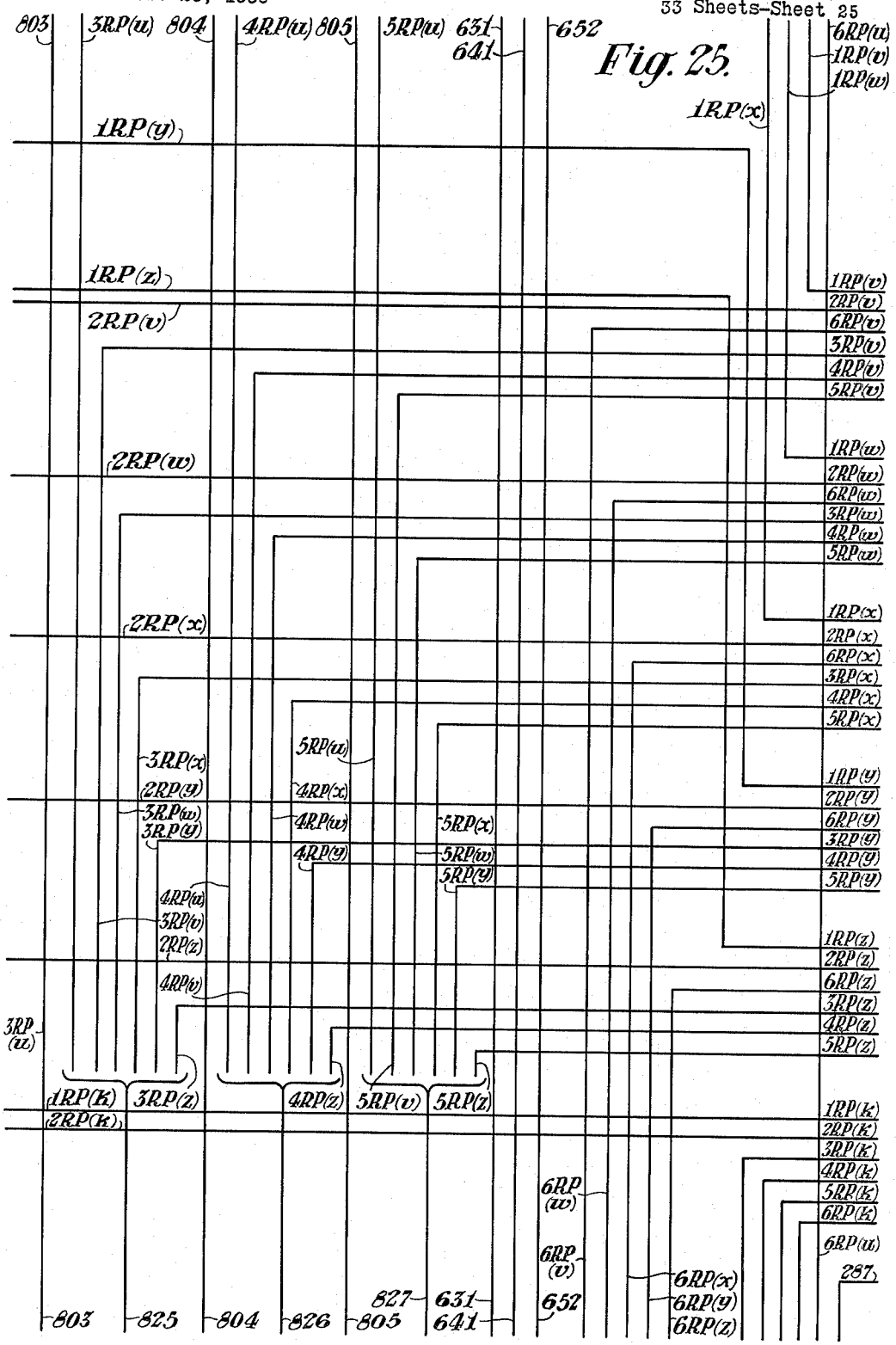
Figure 26:
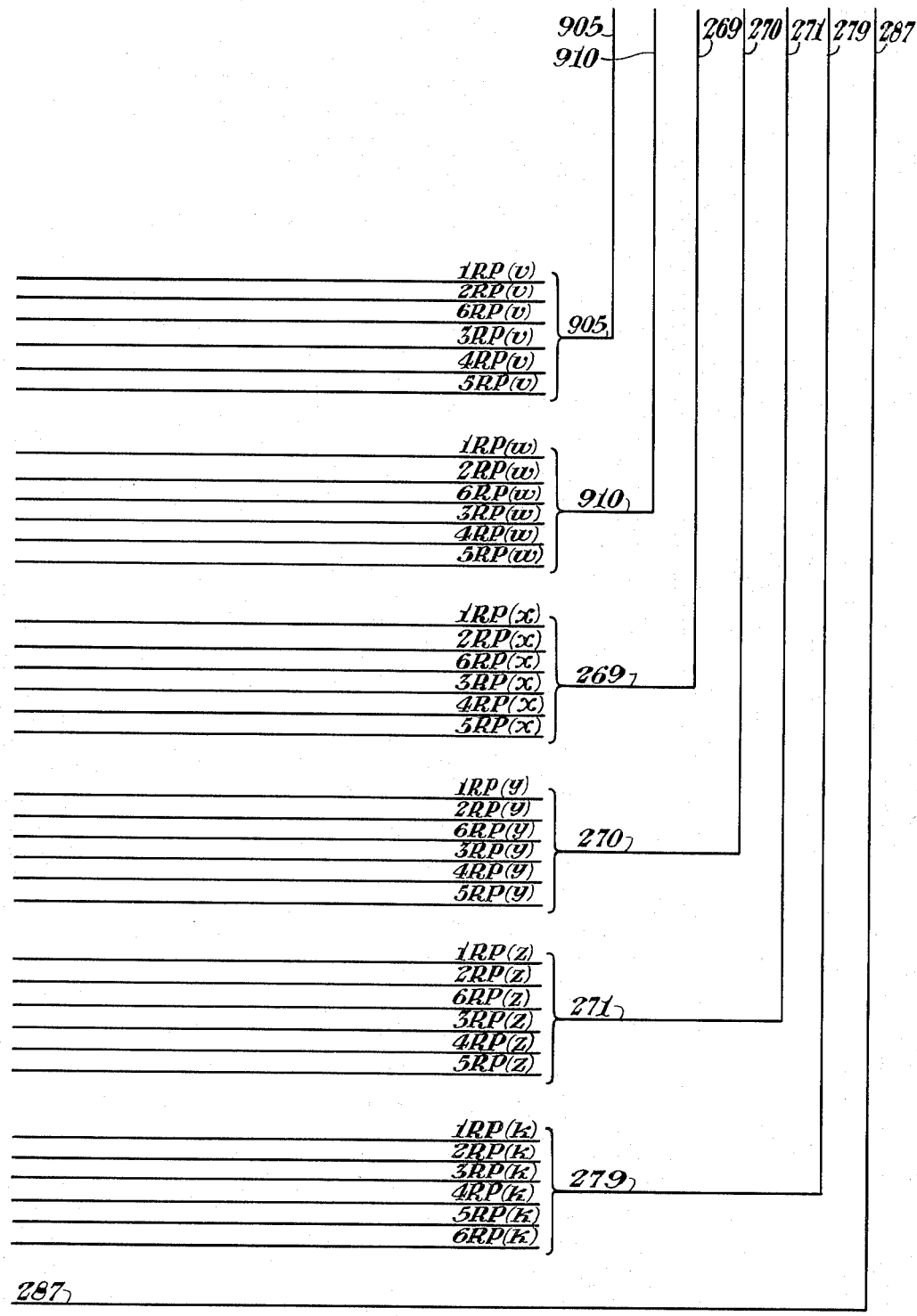

The rolling resistance "read-out" circuit for the cut of cars extends from terminal c of storage unit 2ES (FIG. 24), leads 220 and 223, front contact g of relay 2B (FIG. 23), lead 346, terminal k of storage panel 2RP (FIG. 24), lead 2RP(k) in FIGS. 24, 25 and 26; multiple conductor cable 279 in FIGS. 26, 14, 15, 16, 17, 5, 6, 7, 18, 19, 20, 21 and 22; lead 2RP(k) (FIG. 22), the back point of contact c of relay 1–2ART1, the front point of contact b of relay 1–2ART2, the back point of contact a of relay 1–2ART3, lead 272, computer 22 to grounded lead 302, and thence to the grounded lead from terminal d of storage unit 2ES in FIG. 24. The signal thus supplied actuates the computer in a manner which is described in detail in aforesaid copending application, Serial No. 676,730.

With relays 1–2ART1 and 1–2ART3 released and relay 1–2ART2 picked up (FIG. 22), a circuit is completed for picking up relay 2RO (FIG. 23) which extends from terminal B of the battery in FIG. 22 over the back point of contact b of relay 1–2ART3, the front point of contact d of relay 1–2ART2, the back point of contact g of relay 1–2ART1, lead 2RP(a), cable 287 (FIGS. 22, 21, 20, 19, 18, 7, 6, 5, 17, 16, 15, 14, 26, 25, 31, 30, 33, 32 and 29), lead 2RP(a) in FIGS. 29 and 23, terminal a of storage panel 2RP and through the winding of relay 2RO to terminal N of the battery. Relay 2RO accordingly picks up and opens the previously described stick circuit for relay 2B at the open back point of contact b of relay 2RO. However, the pickup circuit for relay 2B from terminal a of panel 2RP is completed and relay 2B remains picked up as long as terminal B of the battery is connected to terminal a of panel 2RP over the pickup circuit for relay 2RO described above. When battery terminal B is no longer connected to said terminal a, as will be hereinafter described, relay 2B will release before relay 2RO can again close its back contact b, due to the slow release characteristic of relay 2RO.

Assuming that the cut of cars has a medium weight classification and its velocity when leaving the master retarder is correct, relays 2RHS, 2RLS, and 2CLVS in panel 2RP (FIG. 30) will be picked up, as previously described. It will be remembered that for a cut of cars having a medium weight classification both relays 2RHS and 2RLS are picked up and, therefore, two "read-out" circuits are completed at this time. The "read-out" circuit for relay 1–2RHP (FIG. 28) extends from terminal B of the battery in panel 2RP (FIG. 30) over front contact b of relay 2RHS, terminal x of panel 2RP, lead 2RP(x) in FIGS. 30, 24, 25, and 26; cable 269 in FIGS. 26, 14, 15, 16, 17, 5, 6, 7, 18, 27, 19, 20, 21, 22 and 28; lead 2RP(x), the back point of contact d of relay 1–2ART3, the front point of contact e of relay 1–2ART2 and the back point of contact k of relay 1–2ART1 to the winding of relay 1–2RHP. As previously mentioned, the winding of relay 1–2RHP is shown by dotted lines as the circuits controlled thereby form no part of my present invention, and it is sufficient for purposes of this description to point out that relay 1–2RHP corresponds to relay AHP shown in FIG. 43 of aforementioned copending application, Serial No. 676,730.

The "read-out" circuit relay 1–2RLP (FIG. 28) extends from terminal B of the battery in panel 2RP (FIG. 30) over front contact b of relay 2RLS, terminal y of panel 2RP, lead 2RP(y) in FIGS. 30, 24, 25 and 26; cable 270 in FIGS. 26, 14, 15, 16, 17, 5, 6, 7, 18, 27, 19, 20, 21, 22 and 28; lead 2RP(y), the back point of contact h of relay 1–2ART3, the front point of contact g of relay 1–2ART2, and the back point of contact l of relay 1–2ART1 to the winding of relay 1–2RLP. The winding of relay 1–2RLP is also shown by dotted lines as the circuits controlled thereby form no part of my present invention, and it is sufficient for purposes of this description to point out that relay 1–2RLP corresponds to relay ALP shown in FIG. 43 of aforementioned copending application, Serial No. 676,730.

The "read-out" circuit for relay 1–2CLVP (FIG. 28) extends from terminal B of the battery in panel 2RP (FIG. 30) over front contact b of relay 2CLVS, terminal z of panel 2RP, lead 2RP(z) in FIGS. 30, 24, 25 and 26; cable 271 in FIGS. 26, 14, 15, 16, 17, 5, 6, 7, 18, 27, 19, 20, 21 22 and 28; lead 2RP(z), the back point of contact n of relay 1–2ART1, the front point of contact l of relay 1–2ART2, and the back point of contact m of relay 1–2ART3 to the winding of relay 1–2CLVP. The winding of relay 1–2CLVP is shown by dotted lines similar to and for the same purpose as relays 1–2RHP and 1–2RLP, and relay 1–2CLVP corresponds to relay A1VL shown in said FIG. 43 of said copending application, Serial No. 676,730.

When the cut occupies section CL4T (FIG. 8), relay CL4TP (FIG. 21) is picked up and the circuit for picking up relay 1–2GRADP is completed over front contact b of relay CL4TP. The stick circuit for relay 1–2GRAD is interrupted at back contact a of relay 1–2GRADP but the multiple stick circuit for relay 1–2GRAD is completed over front contact a of relay CL4TP and relay 1–2GRAD remains picked up. Both relays 1–2GRAD and 1–2GRADP remain energized, therefore, during the period CL4T is occupied by the cut. When the cut vacates track section CL4T the stick circuit for relay 1–2GRAD is opened at front contact a of relay CL4TP and relay 1–2GRAD is released. Relay 1–2GRAD releasing opens, at its front contact c, and the pickup circuits for relay 1–2GRADP which releases. The release of relay 1–2GRAD also interrupts the circuits for relay 1–2A2TAC in FIG. 21 at the open front point of contact e of relay 1–2GRAD. With relay 1–2A2TAC released, the circuit for relay 1–2ART2 (FIG. 22) is interrupted at the open front point of contact b of relay 1–2A2TAC and relay 1–2ART2 is accordingly released, restoring this portion of the apparatus to its initial condition.

The release of relay 1–2ART2 opens the previously described pickup circuits for relays 2RO and 2B (FIG. 23) at the open front point of contact c of relay 1–2ART2. Relay 2B accordingly releases immediately and relay 2RO subsequently releases after the effects of its slow releast characteristic, have dissipated, unless at this time storage panel 1RP already contains storages and relays ATP and RI in FIG. 2 are picked up to select a storage panel for a "read-in" of a value of rolling resistance for another cut of cars occupying track section AT. If relays ATP and RI are picked up and, therefore, are connecting terminal B of the battery to lead 208 and thence over the front point of contact b of relay 1B (FIG. 11) to lead 470 to rectifier 218 and front contact a of relay 2RO (FIG. 23), relays 2RO and 2B will be maintained picked up until said circuit is opened by the release of relay RI (FIG. 2) and the opening of the front point of contact c of that relay. This circuit arrangement prevents the selecting of one storage panel for storages for the said other cut of cars occupying track section AT, and then also selecting panel 2RP for storages for said cut. In other words, if a panel following panel 2RP is selected for storages for another cut of cars occupying track section AT, the storages in panel 2RP cannot be cancelled while the said other cut occupies track section AT and is not as yet occupying track section MR1T to thereby complete the selection of its storage panel by the release of relay RI (FIG. 2), thereby deenergizing leads 208 and 470.

Assuming that there is no other cut of cars occupying track section AT when the described pickup circuits for relays 2RO and 2B are opened by the release of relay 1–2ART2, relay 2B will release followed by the release of relay 2RO. The release of relay 2B opens at the open front point of contact h of relay 2B (FIG. 23) the stick circuits for relay 2WS3, (FIG. 24) and relays 2RLS, 2RHS and 2CLVS (FIG. 30) and these relays release. Relay 2H (FIG. 24) is also released by the opening of front contact *d* of relay 2B (FIG. 23) and storage panel 2RP is returned to its normal condition and in readiness to receive storages for another cut of cars.

It should be pointed out that the switch control storages for switches following the group retarders are "read-out" of their respective storage panels 1RP through 6RP and are stored at each respective switch location when the tangent acceleration code for the associated cut of cars is transferred to the A bank of the next preceding switch location, as denoted by the picked up or released condition of the TAC relays in each said A bank. For example, for the aforesaid cut of cars destined for storage track 2, the switch control storage for controlling switch 1–2W to its reverse position is "read-out" from storage panel 2RP and transferred to the 1–2 storage unit when relay 1–4A2TAC in the A bank of the 1–4 storage unit is picked up. This "read-out" circuit, as previously described, includes front contact *b* of relay 2WS3 (FIG. 30), terminal *w* of panel 2RP (FIG. 30), lead 2RP(*w*), cable 910, terminal *w2* of the A bank of 1–4 storage unit (FIG. 27), back point of contact *e* of relay 1–4A3TAC, front point of contact *e* of relay 1–4A2TAC, back point of contact *g* of relay 1–4A1TAC, terminal *s* of the A bank of the 1–4 storage unit, leads 135, 137 and 140; cable 289, terminal *c* of the B bank of 1–2 storage unit (FIG. 9), front contact *c* of relay 1–2BT, the winding of relay 1–2B1 and front contact *c* of relay 1–2BD. This "read-out" of the switch control storage from panel 2RP for switch 1–2W and the storage thereof at the switch location is performed at this time because the tangent acceleration code is no longer necessary after said cut of cars has entered group retarder 1–2GR and, therefore, the tangent acceleration code (TAC) relays provided at said retarder location are the last such relays in the route to storage track 2. The "read-out" of the switch control storage for switch 1–2W is, therefore, made and transferred to and stored at switch 1–2W location, as previously described, before the storages in panel 2RP are cancelled by the picking up of relay 2RO and releasing of relay 2B in panel 2RP, as previously set forth. It is to be noted that two switch control storage relays 1–2B1 and 1–2A1 (FIG. 9) are provided at switch 1–2W location to store switch control storages for two cuts of cars approaching said switch. If it is possible that more than two cuts of cars may be in the track sections between 1–4T (FIG. 7) and 1–2T (FIG. 9), additional storage banks would, of necessity, be provided at switch 1–2W location.

It is apparent that the above description applies similarly to all switch locations following group retarders.

Referring to FIGS. 22, 27 and 28, it is believed obvious how "read-outs" and cancellations of storages for cuts of cars destined for storage tracks 1 or 2, and having their storages in storage panels other than 2RP, is accomplished over a combination of front and back points of contacts of ART or TAC relays. For example, referring to FIGS. 12, 24, 30 and 33, leads 1RP(*k*), 2RP(*k*), 3RP(*k*), 4RP(*k*), 5RP(*k*), and 6RP(*k*), from terminal *k* of panels 1RP through 6RP, respectively, merge into a multiple conductor cable 279 in FIG. 26 which again branches into said individual leads in FIG. 22. Lead 1RP(*k*) from terminal *k* of panel 1RP is connected to computer input lead 272 over the back point of contact *b* of relay 1–2ART1, the back point of contact *a* of relay 1–2ART2 and the front point of contact *a* of relay 1–2ART3, which, it will be recalled, corresponds to the code combination 001 which is assigned to panel 1RP. Similarly, lead 2RP(*k*) from panel 2RP is connected to lead 272 in the code combination 010 over the back point of contact *c* of relay 1–2ART1, the front point of contact *b* of relay 1–2ART2, and the back point of contact *a* of relay 1–2ART3. Lead 3RP(*k*) from panel 3RP is connected to lead 272 in the code combination 011 over back contact *a* of relay 1–2ART1, the front point of contact *a* of relay 1–2ART2 and the front point of contact *a* of relay 1–2ART3. Lead 4RP(*k*) from panel 4RP is connected to output lead 272 in the code combination 100 over front contact *d* of relay 1–2ART1, the back point of contact *b* of relay 1–2ART2 and the back point of contact *a* of relay 1–2ART3. Lead 5RP(*k*) from panel 5RP is connected to lead 272 in the code combination 101 over the front point of contact *b* of relay 1–2ART1, the back point of contact *a* of relay 1–2ART2 and the front point of contact *a* of relay 1–2ART3. Lead 6RP(*k*) from panel 6RP is connected to lead 272 in the code combination 110 over the front point of contact *c* of relay 1–2ART1, the front point of contact *b* of relay 1–2ART2 and the back point of contact *a* of relay 1–2ART3.

For a second example, relays 1–2ART1 through 1–2ART3 (FIG. 22) control a second group of circuits for connecting terminal B of the battery to "read-out" terminals *a* of panels 1RP through 6RP. Referring now to FIGS. 11, 23 and 29, terminals *a* of panels 1RP through 6RP are connected to leads 1RP(*a*), 2RP(*a*), 3RP(*a*), 4RP(*a*), 5RP(*a*), and 6RP(*a*), respectively, and thence over cable 287 (FIG. 26) to FIG. 22 where the cable is branched and the original leads are produced. These leads are connected to terminal B of the battery over relays 1–2ART1 through 1–2ART3 in the same code combinations as the leads previously described for the "read-out" of the tangent track rolling resistance values. Thus, lead 1RP(*a*) is connected to terminal B of the battery over the back point of contact *f* of relay 1–2ART1, the back point of contact *c* of relay 1–2ART2 and the front point of contact *b* of relay 1–2ART3. Lead 2RP(*a*) from panel 2RP is connected to terminal B of the battery over the back point of contact *g* of relay 1–2ART1, the front point of contact *d* of relay 1–2ART2 and the back point of contact *b* of relay 1–2ART3. Lead 3RP(*a*) from panel 3RP is connected to terminal B of the battery over back contact *e* of relay 1–2ART1, the front point of contact *c* of relay 1–2ART2 and the front point of contact *b* of relay 1–2ART3. Lead 4RP(*a*) from panel 4RP is connected to terminal B of the battery over front contact *h* of relay 1–2ART1, the back point of contact *d* of relay 1–2ART2, and the back point of contact *b* of relay 1–2ART3. Lead 5RP(*a*) from panel 5RP is connected to terminal B of the battery over the front point of contact *f* of relay 1–2ART1, the back point of contact *c* of relay 1–2ART2, and the front point of contact *b* of relay 1–2ART3. Lead 6RP(*a*) from panel 6RP is connected to terminal B of the battery over the front point of contact *g* of relay 1–2ART1, the front point of contact *d* of relay 1–2ART2, and the back point of contact *b* of relay 1–2ART3.

In view of the above examples, it is readily apparent how "read-outs" of other storages in panels 1RP through 6RP for cuts of cars destined for a storage track 1 through 4 are accomplished over the TAC relay contacts as shown in FIGS. 27 and 28.

Referring further to FIGS. 22, 27 and 28, the manner in which "read-outs" from storage panels 1RP through 6RP, for cuts of cars destined for storage tracks 5 through 8, is accomplished is obvious, and these "read-out" network circuits which extend over contacts of ART and TAC relays (not shown) are not shown for purposes of simplification of the specification. It is sufficient to point out that said network circuits operate in a manner similar to those already described for cuts of cars destined for storage in track 2.

While I have thus described the operation of the apparatus of my invention for but several cuts of cars proceeding from the hump over a series of track switches to classification tracks in the yard, it will be apparent from the description that the apparatus will operate similarly, to store and transfer necessary information for a series of cuts moving from the hump toward their destined classification tracks.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In a signal storage system, in combination, a series of signal storage devices, means for storing in the first and each succeeding device of said series of devices void of a stored signal one of a series of consecutive signals in analog form from a single source; means for storing in each device only when it contains a signal storage in analog form an associated group of signals in digital form, and means for reading out at any time any said signal from its respective storage device regardless of the order in which said signals were stored.

2. In a railway car classification yard comprising a plurality of traffic diverging track switches, a track section for each switch, an information handling system including a series of central storage panels, means for selecting a different one of the panels for each cut of cars entering the yard, means for producing a binary code for identifying each selected panel, means for transferring each code along the route of its associated cut of cars as each cut progresses through the yard, and relay means at each switch for interpreting each code; the combination, a series of route information storage relays in each panel, circuit means for energizing at least one relay of the series of storage relays in each selected panel in accordance with route information pertaining to the cut of cars associated with the selected panel, a plurality of repeater relays, a plurality of circuit means each including contacts of the interpreting relay means at one of said switches and a contact of an information storage relay in a selected panel associated with a cut of cars for controlling one of the repeater relays, and circuits including contacts of the repeater relays for controlling selected track in the yard in accordance with the route information pertaining to the cut of cars.

3. In an information storage and transfer system for a railway car classification yard, in combination, a series of cenral storage panels, at least one normally deenergized information storage relay in each panel, circuit means controlled by the entrance of a cut of cars into the yard for selecting one of the panels, circuit means for energizing one or more information storage relays in the selected panel in accordance with route information pertaining to the cut of cars entering the yard, circuit means for producing a binary code for identifying the selected panel, circuit means for identifying the code with said cut of cars, circuit means for successively transferring the code to a successive preselected point in the yard as the cut of cars progresses through the yard, relay means at each said preselected point in the yard for interpreting the transferred code, a repeater relay for each information storage relay in the selected panel, a plurality of circuit means each including contacts of one of said interpreting relay means and a contact of one of said information storage relays for controlling the associated repeater relay, and a circuit including a contact of said repeater relay for controlling track switch apparatus in the yard in accordance with the route information pertaining to the cut of cars.

4. In a railway track layout including a plurality of track switches for controlling the alignment of routes for trains entering and leaving the track layout at preselected entrance and exit points, in combination, a plurality of central storage panels, circuit means for selecting a vacant one of the panels for each train entering the track layout, means for storing in each selected panel in digital form a switch control storage for each switch in the route for the train for which the panel is selected, circuit means for deriving a binary code for identifying each selected panel, circuit means for transferring the code identifying a selected storage panel to each next succeeding switch in the route for the train for which the panel is selected when the train traverses each preceding switch in its route, first relay means at each switch for interpreting the transferred code, circuit network means controlled by said first relay means for reselecting the panel identified in accordance with the interpreted code and reading out from the reselected panel the switch control storage for the next succeeding switch, second relay means at each switch for interpreting each readout of a switch control storage, and circuit means controlled by the second relay means at each switch for directing the movements of the respective switch for the alignment of routes through the track layout.

5. In a railway track layout including a plurality of track switches for controlling the alignment of routes for trains entering and leaving said track layout at preselected entrance and exit points, in combination, a series of storage panels, a normally deenergized control relay and a succession of normally deenergized switch control storage relays in each panel, circuit means for selecting a vacant one of the panels for a train entering the track layout and energizing the control relay in the selected panel; circuit means including a contact of the energized control relay for energizing the first relay of the succession of switch control storage relays in the selected panel only when the alignment of the route for said train through the track layout to the preselected exit point of the train requires that the first track switch in the route be controlled to a first position, circuit means including contacts of the energized control relay for energizing each next respective succeeding relay of the succession of relays in the selected panel only when the alignment of the route for the train through the track layout to the preselected exit point of the train requires that each next respective succeeding switch in said route be controlled to a first position, circuit means including one or more contacts of the energized control relay for establishing a distinct binary code for identifying the selected panel, a group of code storage relays at each switch location, circuit means for energizing one or more of the code storage relays at the first switch location in the route for said train in accordance with the established binary code, a switch control relay at the first switch location, circuit network means including contacts of the code storage relays at the first switch location in the route for the train for connecting the switch control relay with a contact of the first switch contol storage relay in said selected panel and for energizing the switch control relay only when the first switch control storage relay is energized; circuit means including contacts of the switch control relay for controlling said first switch in the route for the train to a first or a second position according as the switch control relay is energized or deenergized, circuit means including contacts of said code storage relays at each preceding switch location in the route for the train for transferring said code to each next succeeding switch location in the route for the train when the train traverses each preceding switch and for energizing one or more of the code storage relays at said each next succeeding switch location, a switch control relay at said each succeeding switch location, circuit network means at said each succeeding switch location including contacts of the code storage relays at the respective location for connecting the switch control relay at said location with a contact of the respective switch control storage relay in the selected storage panel and for energizing said switch control relay only when said respective switch control storage relay is energized; circuit means including contacts of each respective switch control relay for controlling the respective switch to a first or a second position according as the switch control relay is energized or deenergized; and circuit network means for deenergizing the energized switch control storage relays in the selected storage panel when the train traverses the switch preceding the last switch in the route for the train and after the switch control relay at said last switch is connected to its respective switch control storage relay in the selected panel to determine the energized or de-energized condition of the switch control storage relay, said circuit network means including contacts of the group of code storage relays at said switch location preceding the last switch location in the route for the train.

6. In a railway track layout including a plurality of track switches having first positions and second positions, in combination, a routing arrangement for automatically controlling the switches to selected ones of said positions for aligning routes through the layout, said routing arrangement comprising, a series of central storage panels each including a succession of switch control storage relays, circuit means for selecting one of the panels for storing a selected route to be aligned through said layout, circuit means for selecting each successive relay in the selected panel for each successive switch in the selected route and for energizing each selected relay only when its associated switch is to be controlled to its second position for aligning the selected route, circuit means for establishing a distinct code for identifying the selected panel, code storage relay means at the panel location and at each switch location for storing said code, circuit means for successively transferring the code from the code storage relay means at the preceding location in the selected route to the next succeeding location in the route, circuit network means including contacts of said relay means at each switch location for reselecting the selected panel and including a front contact of the respective switch control storage relay selected in said panel for the switch at the location, a switch control relay connected to each said circuit network means, a circuit at each switch location including a back contact of the respective switch control relay at the location for controlling the switch at the location to its said first position, and a circuit at each switch location including a front contact of the respective switch control relay at the location for controlling the respective switch at the location to its said second position.

7. In a control system for railway car retarders in a gravity type classification yard, said yard comprising, a plurality of diverging track switches, a track section for each switch and a group retarder for each route diverging from said switches; in combination, means for deriving an analog signal representative of the rolling resistance of each cut of railway cars traversing a straight track section in the yard, means for deriving digital signals representing the weight of each cut of cars traversing a weighing device in the yard, means for deriving another digital signal for each cut of cars only when each respective cut vacates a preselected track section in the yard at a proper velocity, means for storing each signal at a central storage location, means for transferring the signals associated with each cut of cars to control apparatus for the group retarder located in the route to the selected classification track for the cut when the cut occupies the track section associated with the switch first in advance of said retarder, and means for setting the retardation pressure of said group retarder in accordance with the signals for the cut of cars transferred to the control apparatus for said group retarder.

8. In an information handling system, in combination, a series of signal storage devices, means for selecting the first vacant device of said series when one of a succession of analog signals is available for storage and storing in the selected device the available analog signal, means for storing in the selected device a group of digital signals associated with said stored analog signal only when the analog signal has previously been stored, means operating when the analog signal is stored for deriving a code identifying the selected device, and means responsive to interpretation of said code for reselecting the selected device and reading out the signals stored therein.

9. In an information storage and transfer system, in combination, a series of information storage devices, means operating to select a vacant one of said devices when a bit of information in analog form from a predetermined source is to be stored, means operating to store said bit of information in said device when the device is selected, means operating to establish a binary code identifying the selected device only when the device is selected, means operating in response to the established binary code to store in the selected device additional bits of information in digital form, means operating to interpret the binary code when the selected device is to be interrogated as to signal storages, and means responsive to the interpreting means for reading out of the selected device at different predetermined times selected ones of the bits of information stored therein.

10. In combination with a storage system for storing an analog bit of information for each cut of cars entering a railway car classification yard, said system including, a plurality of central storage panels, means for selecting one of the panels for each cut of cars entering the yard, means for storing in each selected panel the analog bit of information pertaining to the cut of cars associated with the panel, means for establishing a distinct binary code identifying each panel, means for transferring each code along with its associated cut of cars as the cut progresses from switch to switch in the yard, and means for reading out from the associated panel the stored analog bit of information for each respective cut of cars when the information is required for control of apparatus in the yard; an automatic switching system for controlling the switches in said yard for routing each cut of cars to its selected classification track, said switching system comprising, a relay in each storage panel for each switch in the route in the yard having the greatest number of switches, means controlled by said selecting means for controlling each said relay in a selected panel in accordance with the position to which the switch associated with the relay is to operate for aligning said route, means controlled by the binary code identifying the last mentioned selected panel for reselecting the panel and determining the controlled condition of the relay in the panel for each next switch in said route previous to the time the cut of cars associated with the panel arrives at the switch, and means for controlling each switch in said route in accordance with the controlled condition of said relay associated with the switch.

11. A system for storing information for controlling the positions of switches in a railway classification yard for routing cuts of cars to their selected storage tracks, said system comprising, a plurality of centrally located storage devices, a first storage relay in each device for all first switches in all routes to the storage tracks in the yard, a second storage relay in each device for all second switches in all routes to the storage tracks, a respective consecutive storage relay in each device for each remaining respective consecutive switch in the routes to said storage tracks, means for selecting one of the devices for each cut of cars entering the yard, means for controlling each consecutive storage relay in a selected device to first or second positions according as the respective consecutive switch in the route for the cut of cars associated with the device is to be operated to first or second positions for alignment of said route, means for establishing a code identifying the selected device, means for transferring said code to points in circuit networks corresponding to the switches in the route for said cut of cars and as the cut progresses from switch to switch in the yard, means for interpreting the transferred code at each said point and reading out from the selected device the position of the storage relay associated with each switch when said cut of cars traverses the preceding switch, and means for operating each switch according to the readout of the position of the storage relay associated with the switch.

12. In a railway track layout comprising a plurality of track switches for aligning routes for trains entering the layout at preselected entrance points, in combination, a plurality of centrally located storage panels, means for selecting a vacant one of the panels when a train enters the layout at one of the entrance points, means for storing in the selected panel in digital form a switch control storage for each switch in the route through the layout for said train when the train enters the layout, means for deriving a binary code when said panel is selected for identifying the panel, means for transferring the code to each next succeeding switch in the route for the train when the train traverses the preceding switch in its route, means at each switch for interpreting the transferred code when the code is transferred to the switch, means for reselecting the selected panel when the transferred code is interpreted and for reading out from the identified panel the switch control storage for the respective switch, and means at each switch responsive to each said read out for directing the movements of the respective switch in accordance with the switch control storage.

13. In an automatic switch control system for controlling the track switches in a classification yard, in combination, a succession of groups of storage relays, a control relay for each group, means operating when a cut of cars enters the yard to energize the control relay for the first of said succession of groups in which all the storage relays are deenergized, means operating when said contorl relay is energized to establish a distinctive binary code identifying the group of storage relays, means operating when said control relay is energized to control the group of storage relays to store controls for operating each switch in the route for the cut of cars, means operating as the cut of cars progresses through the yard to transfer the established binary code to each next succeeding switch in the route for the cut, and means operating when the code is transferred to each next succeeding switch to transfer the switch control storage for the switch from the identified group of storage relays to the location of the respective switch.

14. In a railway track layout including a plurality of track switches having first and second positions, in combination, a routing arrangement for automatically controlling the switches to selected ones of said positions for aligning selected routes through the layout, said routing arrangement comprising, a series of central storage panels each including a succession of switch control storage relays, means for selecting one of the panels for each selected route through the layout, means for selecting each successive relay in a selected panel and energizing the relay only when the respective route requires that the respective successive switch be controlled to its second position for aligning the route, means for establishing a distinct code for identifying the selected panel, means at the storage panel location and at each switch location for storing the established code, means for successively transferring the code from each code storage means at each preceding location in the respective route to the next succeeding location in the route, means controlled by the code storage means at each location for reselecting the selected panel, a switch control relay for each switch, a circuit including a front contact of the proper switch control storage relay in the reselected panel for controlling the energiaztion of each respective switch control relay, and a circuit including a contact of the switch control relay at each switch location for controlling the switch at the location to its first or second position according as the control relay is energized or deenergized.

15. A signal storage panel comprising a control relay, an analog signal storage device, a plurality of digital signal storage devices, means for energizing the control relay only when an analog signal is supplied to the panel for storage, means for storing said analog signal in the analog signal storage device when and only when the control relay is energized, means for storing each of a plurality of digital signals supplied to the panel in a different one of said plurality of digital signal storage devices when and only when the control relay is energized, and means for deenergizing the control relay when the storages are complete.

16. A panel for storing information for controlling apparatus in a railway car classification yard, said panel comprising, a device for storing a bit of information in analog form, a series of storage relays for storing bits of information in digital form, a control relay, means for energizing the control relay when a cut of railway cars enters the yard, means for storing in said device a bit of information representative of the rolling resistance of the cut of cars when the control relay is energized, means for storing in each storage relay a different bit of "yes-no" information when the control relay is energized, means for deenergizing the control relay when the storages are complete, a second control relay, means for energizing the second control relay when the first control relay is energized, means for controlling each storage relay to retain its said bit of "yes-no" information when the first control relay is deenergized and the second control relay is energized, means for controlling the device to retain said bit of information in analog form when the second control relay is energized, and means for deenergizing the second control relay when all of the stored information has been transferred to its respective apparatus in the yard.

17. A system for automatically controlling the track switches in a railway car classification yard for aligning the routes through the yard to the several classification tracks, said system comprising, a series of storage panels, means operating when a cut of cars enters the yard for selecting one of the panels for the cut and storing therein a switch control storage for each switch in the route for the cut through the yard, means operating when said selection is made for establishing a code identifying the selected storage panel, means operating as the cut of cars advances through the yard for transferring said code over circuit paths to interpreting apparatus associated with each next switch in the route for the cut, means operating when each interpreting apparatus identifies the selected panel for transferring the switch control storage for the switch associated with that apparatus, and means operating when the last mentioned transfer is made for controlling the respective switch to a position for aligning the route for the cut of cars.

18. Switch control storage and transfer apparatus for a classification yard having a plurality of storage tracks each approached by a route from a lead track through a plurality of traffic diverging switches, said apparatus comprising, in combination, a plurality of centrally located storage panels, means for selecting a vacant one of the panels for a cut of cars traversing said lead track, means for storing in the selected panel a switch control storage for each switch in the route for the cut of cars to its preselected storage track, means for associating with the cut a distinct binary code identifying the selected panel, means for transferring said code to each next switch in the route for the cut as the cut approaches the switch, means responsive to each transfer of the code for identifying the selected panel and reading out therefrom the switch control storage for the respective switch, and means for controlling the switch in accordance with said read-out of the switch control storage.

19. Railway switch control storage and transfer apparatus comprising, in combination, a series of centrally located storage panels, means for selecting one of the panels and storing therein switch control storages for aligning a route for a train to a selected destination, means for associating a code identifying the selected panel with said train, means controlled by the code for reading out from the selected panel each switch control storage prior to the arrival of the train at the switch associated with the storage, and means for controlling each switch in accordance with the respective read-out.

20. In a storage system for storing bits of information pertaining to cuts of cars entering a railway car classification yard, said system comprising, a plurality of central storage panels, means for selecting a vacant one of the panels for each cut entering the yard and storing therein first bits of information pertaining to the cut, means for deriving a distinct binary code identifying each selected panel, means for associating each code with the cut of cars associated with the respective selected panel, means for transferring each code to preselected points in circuit networks in accordance with the progress of the associated cut of cars through the yard to a predetermined storage track, and means responsive to the transfer of each code to the preselected points in said networks for interpreting the transferred code associated with the respective cut and identifying the panel associated with the cut; the combination of, means responsive to the code interpreting means at first predetermined ones of the preselected points in said networks for supplying second bits of information pertaining to each respective cut to its identified associated panel, means in each panel for storing each second bit of information supplied thereto, and means responsive to the code interpreting means at second predetermined ones of the preselected points in said networks for reading out from each identified panel one or more stored bits of information pertaining to the cut of cars associated with the identified panel.

21. An automatic switching system for a railway car classification yard having a plurality of routes including switches, said system comprising, a plurality of central storage panels, a storage unit associated with each switch, means controlled by each switch for indicating its position, route storing means for selecting and storing in one of the storage panels information identifying one of said routes, means controlled by the route storing means for generating a signal identifying the selected panel, means controlled by said generating means for storing said signal in the storage unit for the first switch in the identified route, means controlled by the indicating means for each switch and the storage unit associated with the switch for transferring said signal to the storage unit associated with the next switch in the identified route, switch control means for positioning each switch, and means controlled by said signal for supplying information stored in the panel identified by the signal to each switch control means for each switch in the identified route to position the switches to set up the route.

References Cited by the Examiner

UNITED STATES PATENTS

| | | | |
|---|---|---|---|
| 1,586,989 | 6/1926 | Haines | 104—26 |
| 2,819,682 | 1/1958 | Falkowski | 246—182 |
| 2,863,991 | 12/1958 | Mishelevich | 246—2 |
| 2,914,750 | 11/1959 | Cook | 340—173 |
| 2,918,656 | 12/1959 | Nolde | 340—173 |
| 2,922,985 | 1/1960 | Crawford | 340—173 |
| 2,989,731 | 6/1961 | Albanes | 230—172.5 |
| 3,034,719 | 5/1962 | Anfenger et al. | 235—150 |
| 3,056,022 | 9/1962 | Phelps | 246—182 |

ARTHUR L. LA POINT, *Primary Examiner.*

LEO QUACKENBUSH, JAMES S. SHANK, *Examiners.*

UNITED STATES PATENT OFFICE
CERTIFICATE OF CORRECTION

Patent No. 3,225,190                        December 21, 1965

William A. Robison, Jr.

It is hereby certified that error appears in the above numbered patent requiring correction and that the said Letters Patent should read as corrected below.

Column 53, line 39, after "track" insert -- switches --; column 54, lines 47 and 48, for "contol" read -- control --; column 57, lines 28 and 29, for "contorl" read -- control --; line 64, for "energiaztion" read -- energization --.

Signed and sealed this 7th day of June 1966.

(SEAL)
Attest:

ERNEST W. SWIDER
Attesting Officer

EDWARD J. BRENNER
Commissioner of Patents